United States Patent
Motoyama et al.

(10) Patent No.: US 7,610,374 B2
(45) Date of Patent: Oct. 27, 2009

(54) METHOD OF INITIALIZING A DATA PROCESSING OBJECT ASSOCIATED WITH A COMMUNICATION PROTOCOL USED TO EXTRACT STATUS INFORMATION RELATED TO A MONITORED DEVICE

(75) Inventors: Tetsuro Motoyama, Cupertino, CA (US); Avery Fong, Castro Valley, CA (US)

(73) Assignee: Ricoh Company Ltd., Tokyo (JP)

( * ) Notice: Subject to any disclaimer, the term of this patent is extended or adjusted under 35 U.S.C. 154(b) by 375 days.

(21) Appl. No.: 10/927,283

(22) Filed: Aug. 27, 2004

(65) Prior Publication Data

US 2006/0069767 A1 Mar. 30, 2006

(51) Int. Cl.
*G06F 15/173* (2006.01)
(52) U.S. Cl. ............... 709/224; 709/223; 709/230; 709/249; 370/252; 370/254; 714/39
(58) Field of Classification Search ............ 709/223, 709/224, 249, 220, 230; 370/252, 254; 714/39
See application file for complete search history.

(56) References Cited

U.S. PATENT DOCUMENTS

| | | | | |
|---|---|---|---|---|
| 5,655,081 | A | * | 8/1997 | Bonnell et al. ............ 709/202 |
| 5,935,217 | A | * | 8/1999 | Sakai et al. ............... 709/249 |
| 5,987,513 | A | * | 11/1999 | Prithviraj et al. .......... 709/223 |
| 6,122,639 | A | * | 9/2000 | Babu et al. .............. 707/103 R |
| 6,192,403 | B1 | * | 2/2001 | Jong et al. ................ 709/224 |
| 6,317,848 | B1 | | 11/2001 | Sorens et al. |
| 6,349,306 | B1 | | 2/2002 | Malik et al. |
| 6,363,421 | B2 | * | 3/2002 | Barker et al. ............. 709/223 |
| 6,374,296 | B1 | * | 4/2002 | Lim et al. ................ 709/225 |
| 6,631,247 | B1 | | 10/2003 | Motoyama et al. |
| 6,889,264 | B2 | | 5/2005 | Clough et al. |
| 7,053,767 | B2 | | 5/2006 | Petite et al. |
| 7,155,403 | B2 | * | 12/2006 | Cirulli et al. .............. 705/17 |
| 7,296,079 | B2 | * | 11/2007 | Motoyama et al. ......... 709/230 |

(Continued)

FOREIGN PATENT DOCUMENTS

EP 1 367 766 A2 12/2003

(Continued)

OTHER PUBLICATIONS

U.S. Appl. No. 12/030,623, filed Feb. 13, 2008, Motoyama, et al.

*Primary Examiner*—Thu Ha T Nguyen
(74) *Attorney, Agent, or Firm*—Oblon, Spivak, McClelland, Maier & Neustadt, L.L.P.

(57) ABSTRACT

A method, system, and computer program product for initializing at least one data processing object associated with a communication protocol used to extract status information related to a monitored device communicatively coupled to a network, including accessing the monitored device to obtain vendor information related to the monitored device; obtaining, from a support memory, information related to an access function for extracting the status information using the communication protocol from an accessible data file on the monitored device, the accessible data file having a respective data file type; storing the vendor information and the access function information in a respective data processing object of the at least one data processing object; and repeating the preceding obtaining and storing steps for each of the at least one data processing object.

11 Claims, 66 Drawing Sheets

U.S. PATENT DOCUMENTS

| | | | |
|---|---|---|---|
| 2003/0084176 A1* | 5/2003 | Tewari et al. | 709/230 |
| 2003/0177227 A1 | 9/2003 | Motoyama et al. | |
| 2003/0229686 A1* | 12/2003 | Kortright | 709/220 |
| 2004/0128315 A1 | 7/2004 | Motoyama et al. | |
| 2004/0172469 A1* | 9/2004 | Takahashi et al. | 709/224 |

FOREIGN PATENT DOCUMENTS

| | | |
|---|---|---|
| EP | 1 519 513 A1 | 3/2005 |

* cited by examiner

Vector of CAbsProtocol*
500

| CAbsProtocol* 502 | CAbsProtocol* 504 | CAbsProtocol* 506 | ... |
|---|---|---|---|

FIG. 27A std::map<std::string, std::map<std::string, std::vector<std::pair<SOIDinfoType, int> > > >
510

| string 512 | map 514 ||
| | string 516 | vector 518 |
|---|---|---|
| Ricoh | GENERIC | < (SOIDinfoType1, int1), (SOIDinfoType2, int2) > |
|  | Aficio 1224C | < (SOIDinfoType3, int3) > |
|  |  |  |
| Xerox | GENERIC | < (SOIDinfoType4, int4), (SOIDinfoType5, int5) > |
|  | DocuPrint NC60 | < (SOIDinfoType5, int5) > |
|  |  |  |

FIG. 27B std::map<std::string, std::map<std::string, std::vector<SWebPageInfo> > >
520

| string 522 | map 524 | |
|---|---|---|
| | string 526 | vector 528 |
| Ricoh | Aficio X | Vector of `struct SWebPageInfo { std::string m_sWebPage; std::vector<std::pair<SKeyValueInfo, int> > m_KeyValueInfoVector; };` |
| | | |
| Xerox | N4025 | |

FIG. 27C std::map<std::string, std::map<std::string, std::vector<SDirFileStatusInfo> > >
530

| string 532 | map 534 | |
|---|---|---|
| | string 536 | vector 538 |
| Ricoh | Aficio | vector of `struct SDirFileStatusInfo { std::string m_sDirectory; std::string m_sFile; std::vector<std::pair<SKeyInfoType, int> > m_KeyInfoTypeVector; };` |
| | | |
| Xerox | N4025 | |

FIG. 27D

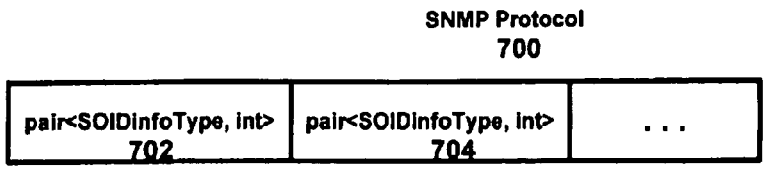
FIG. 29A
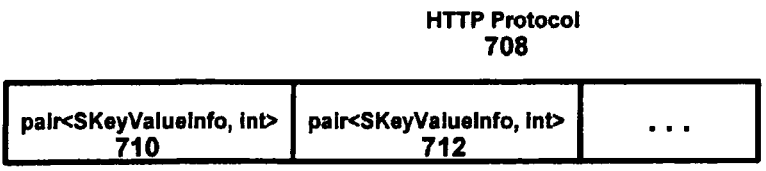
FIG. 29B
FIG. 29C
Status Information Map
724
| 726 | 728 |
|---|---|
| InfoType | pair<string, int> |
| InfoType | pair<string, int> |
| InfoType | pair<string, int> |
| . . . | . . . |
FIG. 29D std::map<std::string, std::map<std::string, std::vector<SDirFileStatusInfo> > >
800

| | | |
|---|---|---|
| Ricoh | Aficio 120 | <SDirFileStatusInfo1, SDirFileStatusInfo2, SDirFileStatusInfo3> |
| | | |
| | | |

802

| |
|---|
| /pub |
| status.txt |
| <(SKeyInfoType1, 1000), (SKeyInfoType2, 5000), (SKeyInfoType3, 10000), (SKeyInfoType4, 7500), (SKeyInfoType5, 625)> |

SKeyInfoType1 corresponds to the InfoType 600, SKeyInfoType2 corresponds to the InfoType 610, SKeyInfoType3 corresponds to the InfoType 620, SKeyInfoType4 corresponds to the InfoType 700, and SKeyInfoType5 corresponds to the InfoType 710

Status Information Map
804

| | |
|---|---|
| 600 | ("Low Paper", 500) |
| 610 | ("24321", 10000) |
| 700 | ("OK", 2500) |

FTP Protocol
806

| (SKeyInfoType1, 1000) | (SKeyInfoType3, 10000) | (SKeyInfoType4, 7500) | (SKeyInfoType5, 625) |
|---|---|---|---|

FIG. 30

Vendor Model Support Map
3200

| 3202 | 3204 |
|---|---|
| string | int |
| string | int |
| string | int |
| string | int |
| . . . | . . . |

FIG. 32A

Sample Vendor Model Support Map
3206

| 3208 | 3210 |
|---|---|
| Xerox%%%%NC60 | 1 |
| Xerox%%%%N4025 | 1 |
| HP%%%%LaserJet 9000 | 1 |
| HP%%%%LaserJet 4550 | 1 |
| . . . | . . . |

FIG. 32B

Protocol Parameter Map
1400

| 1402 | 1404 |
|---|---|
| string | vector<SParameter> |
| string | vector<SParameter> |
| string | vector<SParameter> |
| string | vector<SParameter> |
| . . . | . . . |

1406

```
struct SParameter {
    std::string m_sParName;
    std::string m_sParValue;
    SParameter ();
    ~SParameter ();
    void clear();
};
```

| SNMP | <(COMMUNITY, private)> |
|---|---|
| FTP | <(USERNAME, abc), (PASSWORD, xyz)> |

FIG. 36B

```
(Input Tray)
No.  Name                          Page Size              Status
-------------------------------------------------------------------------------
  1  Tray 1                        11 x 8 1/2"            Normal.
  2  Tray 2                        8 1/2 x 11"            Normal.
  3  Tray 3                        11 x 8 1/2"            Normal.
  4  Tray 4                        8 1/2 x 14"            Normal.
  5  Bypass Tray                   8 x 13"                PaperEnd.

(Output Tray)
No.  Name                          Status
-------------------------------------------------------------------------------
  1  Internal Tray 1               Normal.
  2  Internal Tray 2               Normal.

(Printer Language)
No.  Name                          Version
-------------------------------------------------------------------------------
  1  Automatic Language Switching  2.08
  2  Customized PJL                2.08
  3  RPCS                          1.00.38
  4  PCL 5e Emulation              1.00
  5  PCL XL Emulation              1.00
  6  Adobe PostScript 3            1.04
```

FIG. 38A

| ID  | User | Page | Result   | Time              |
|-----|------|------|----------|-------------------|
| 190 |      | 1    | Finished | 03/10/03 11:33    |
| 191 |      | 2    | Finished | 03/10/03 11:47    |
| 192 |      | 3    | Finished | 03/10/03 12:04    |
| 193 |      | 3    | Finished | 03/10/03 15:17    |
| 194 |      | 2    | Finished | 03/10/03 15:26    |
| 195 |      | 2    | Finished | 03/10/03 15:28    |
| 196 |      | 2    | Finished | 03/10/03 15:45    |
| 197 |      | 2    | Finished | 03/10/03 15:36    |
| 198 |      | 2    | Finished | 03/10/03 15:37    |
| 199 |      | 2    | Finished | 03/10/03 17:40    |
| 200 |      | 2    | Finished | 03/10/03 17:39    |
| 201 |      | 2    | Finished | 03/10/03 17:44    |
| 202 |      | 1    | Finished | 03/10/03 17:59    |
| 203 |      | 2    | Finished | 03/10/03 19:24    |
| 204 |      | 2    | Finished | 03/10/03 19:30    |
| 205 |      | 2    | Finished | 03/10/03 19:29    |

FIG. 38B

```
#[ncsd(11)]04/03/03 13:42:24 LANIER 5645   5.25   INFO:
#[ncsd(11)]04/03/03 13:42:24 Network Control Service   1.82   INFO:
#[ncsd(11)]04/03/03 13:42:24 Copyright (C) 1994-2002 RICOH CO.,LTD.   INFO:
#[ncsd(11)]04/03/03 13:42:25 Current Interface Speed : 100Mbps(half-duplex)   INFO:
#[inetd(22)]04/03/03 13:42:25 inetd start.   INFO:
#[snmpd(23)]04/03/03 13:42:25 Snmpd Start.   INFO:
#[snmpd(23)]04/03/03 13:42:25 add_sess_ipx: bad trap addr: 00:00:00:00:00:00,
                              community: RICOHTRAPS   WARNING:
#[httpd(24)]04/03/03 13:42:25 httpd start.   INFO:
#[win2kspd(27)]04/03/03 13:42:27 win2kspd started.   INFO:
#[diprintd(28)]04/03/03 13:42:27 started.   INFO:
#[lpd(29)]04/03/03 13:42:27 restarted   INFO:
#[multid(25)]04/03/03 13:42:28 multid start.   INFO:
#[nbstart(30)]04/03/03 13:42:28 nbstart start. (NetBEUI)   INFO:
#[nwstart(33)]04/03/03 13:42:29 nwstart start. (NetWare)   INFO:
#[nwpserver(34)]04/03/03 13:42:29 pserver start. (NetWare)   INFO:
#[nwpserver(34)]04/03/03 13:42:29 Set context to QA   INFO:
#[papserver(37)]04/03/03 13:42:29 papd start. (AppleTalk)   INFO:
#[papserver(36)]04/03/03 13:42:29 anpd start. (AppleTalk)   INFO:
#[smbserver(31)]04/03/03 13:42:32 NetBEUI Computer Name=RNP621AFA   INFO:
#[smbserver(31)]04/03/03 13:42:32 smbd start. (NetBEUI)   INFO:
#[smbserver(42)]04/03/03 13:42:32 nmsd start. (NetBEUI)   INFO:
#[nwstart(33)]04/03/03 13:42:33 Required file server(GRANDE) not found   INFO:
#[nwstart(33)]04/03/03 13:42:33 Attach FileServer=GRANDE   INFO:
#[nwstart(33)]04/03/03 13:42:33 Frametype=Ethernet802.2   INFO:
#[nwstart(33)]04/03/03 13:42:33 Current IPX address 00008022:000074621AFA   INFO:
#[smbserver(31)]04/03/03 13:42:33 Start smbd direct print mode (NetBEUI)   INFO:
#[nwpserver(34)]04/03/03 13:42:34 sap : GRANDE, 02C69EFD:000000000001 hop= 1   INFO:
#[nwstart(33)]04/03/03 13:42:34 sap enable. saptype=0x0594, sapname=RNP621AFA
INFO:
#[snmpd(23)]04/03/03 13:42:36 Snmp over ip is ready.   INFO:
#[snmpd(23)]04/03/03 13:42:36 Snmp over ipx is ready.   INFO:
#[httpd(24)]04/03/03 13:42:37 ipp enable.   INFO:
#[papserver(37)]04/03/03 13:42:44 nbp_register(LANIER 5645:LaserWriter@*)   INFO:
#[nwpserver(34)]04/03/03 13:43:27 File server not found in my network (89fb)   ERR:
#[nwpserver(34)]04/03/03 13:43:27 Exit pserver   INFO:
```

FIG. 38C

CAbsDevDataProcess Class Specification

1 Base Class

None

2 Function List public:
```
    CAbsDevDataProcess();
    virtual ~CAbsDevDataProcess();
    virtual bool transformData(std::string & out_sValue, infoType & out_nInfoType,
        const std::string in_sString) = 0;
    virtual void putParameters(const std::string in_sString,
        const infoType in_InfoType)=0;
    virtual bool end(const std::string in_sString, const infoType & in_InfoType);
```

3 Defined Type List

None

4 Class Attributes

None

5 Function Definitions

```
///////////////////////////////////////////////////////////////////////
// Function:        CAbsDevDataProcess()
// Description:     Constructor
// Preconditions:   None.
// Postconditions:  None.
// Algorithm:       Default.
///////////////////////////////////////////////////////////////////////
///////////////////////////////////////////////////////////////////////
// Function:        ~CAbsDevDataProcess()
// Description:     Destructor
// Preconditions:   None.
// Postconditions:  None.
// Algorithm:       Default.
///////////////////////////////////////////////////////////////////////
///////////////////////////////////////////////////////////////////////
// Function:        end(std::string & out_sValue, infoType & out_nInfoType)
// Description:     This function perform the final processing of data
//                  after the last call to transformData(). This function
//                  will return true, a data string, and an infoType if
//                  there is any final data to return. This function
//                  does nothing but returns false, an empty data string,
//                  and eNotDefine for the infoType. The derived classes
//                  can override this function.
// Preconditions:   None.
// Postconditions:  None.
// Algorithm:       1. clear out_sValue and set out_nInfoType to
//                     eNotDefine.
//                  2. return false.
///////////////////////////////////////////////////////////////////////
```

FIG. 39 m_VendorModelSupportMap std::map<std::string, std::vector<std::string> >

| Vendor | Vector of strings for Models |
|---|---|
| Xerox | <N4025, NC60> |
| Ricoh | <Aficio AP3800C, Color_AP204, Laser AP2610N> |
| HP | <LaserJet 4550, LaserJet 900> |
|  |  |
|  |  |
|  |  |
|  |  |

This is to store vendor and model supported. If the same FTP processing for the vendor, "GENERIC" will be inserted in addition to the model name.

FIG. 43 m_VendorInfoVector std::vector<SVendorInfo>

| |
|---|
| Vector of SVendorInfo<br><br>struct SVendorInfo {<br>        std::string m_sVendor;<br>        std::string m_sModelDir;<br>        std::string m_sModelFile;<br>        std::string m_sUniqueIDDir;<br>        std::string m_sUniqueIDFile;<br>        CAbsDevDataProcess * m_pAbsDevDataProcess;<br>}; |
| |
| |
| |
| |

This stores information used to obtain the model name and unique ID of the device.

FIG. 44 m_SupportStatusInfoMap std::map<std::string, std::map<std::string, std::vector<SDirFileStatusInfo> > >

| Vendor | Map (key = Model, Value = Vector of SDirFileStatusInfo) | |
|---|---|---|
| Ricoh | Model | Vector of SDirFileStatusInfo<br>struct SDirFileStatusInfo {<br>   std::string m_sDirectory;<br>   std::string m_sFile;<br>   std::map<infoType, int> m_InfoTypeMap;<br>   CAbsDevDataProcess * m_pAbsDevDataProcess;<br>}; |
|  | Aficio |  |
|  |  |  |
|  |  |  |
|  |  |  |
| Xerox | Model | Vector of SDirFileStatusInfo<br>struct SDirFileStatusInfo {<br>   std::string m_sDirectory;<br>   std::string m_sFile;<br>   std::map<infoType, int> m_InfoTypeMap;<br>   CAbsDevDataProcess * m_pAbsDevDataProcess;<br>}; |
|  | N4025 |  |
|  |  |  |
|  |  |  |
|  |  |  |

This stores information used to obtain status information for devices of a given vendor and model.

FIG. 45 m_VendorModelSupportMap std::map<std::string, std::map<std::string, std::vector<SDirFileIDInfo> > >

| Vendor | Map (key = Model, Value = Vector of SDirFileIDInfo) ||
|---|---|---|
| Ricoh | Model | Vector of SDirFileIDInfo<br><br>struct SDirFileIDInfo {<br>    std::string m_sDirectory;<br>    std::string m_sFile;<br>    int m_nDirectoryFileID;<br>}; |
| | Aficio | |
| | | |
| | | |
| | | |
| Xerox | Model | Vector of SDirFileIDInfo<br><br>struct SDirFileIDInfo {<br>    std::string m_sDirectory;<br>    std::string m_sFile;<br>    int m_nDirectoryFileID;<br>}; |
| | N4025 | |
| | | |
| | | |
| | | |

This stores information used to obtain status information for devices of a given vendor and model.

FIG. 46 m_DirFileIDVector std::vector<SDirFileIDInfo>

| Vector of SDirFileIDInfo |
|---|
| struct SDirFileIDInfo { <br>     std::string m_sDirectory; <br>     std::string m_sFile; <br>     int m_nDirectoryFileID; <br> }; |
|  |
|  |
|  |
|  |
|  |

This stores information about the directory, file, and directory-file ID where status information can be found.

FIG. 47 m_VendorModelMap std::map<std::string, int>

| Vendor + separator + Model | int |
|---|---|
| Ricoh%%%%Aficio X | 1 |
| Xerox%%%%N4025 | 1 |
| Lexmark%%%%T616 | 1 |
| | |
| | |
| | |
| | |

This is to store vendor and model supported.

FIG. 48 typedef CAbsDevDataProcess * (*createFunc)(void);

m_createFunctionMap
std::map<std::string, createFunc>

| | |
|---|---|
| RICOH%GENERIC%%info | createInfo |
| RICOH%GENERIC%%pmlog | createPmlog |
| RICOH%GENERIC%%stat | createStat |
| RICOH%GENERIC%%syslog | createSyslog |
| SUN%SUNBlade 100%pub%stat.txt | createCSVFormat |
| SUN%SUNBlade 150%pub%stat.txt | createCSVFormat |
| SUN%pub%stat.txt%pub%stat.txt | createCSVFormat |

FIG. 49 m_DirFileInfoDevDataProcessMap
std::map<std::string, std::pair<CAbsDevDataProcess *, std::map<infoType, int>> >

| | |
|---|---|
| RICOH%GENERIC%%info | <CInfoDevDataProcess *, InfoTypeWeightMap> |
| RICOH%GENERIC%%pmlog | <CPmlogDevDataProcess *, InfoTypeWeightMap> |
| RICOH%GENERIC%%stat | <CStatDevDataProcess *, InfoTypeWeightMap> |
| RICOH%GENERIC%%syslog | <CSyslogDevDataProcess *, InfoTypeWeightMap> |
| SUN%SUNBlade 100%pub%stat.txt | <CCSVFormatDevDataProcess *, InfoTypeWeightMap> |
| SUN%SUNBlade 150%pub%stat.txt | <CCSVFormatDevDataProcess *, InfoTypeWeightMap> |
| | |

FIG. 50 m_VendorDevDataProcessMap
std::map<std::string, CAbsDevDataProcess * >

| SUN%pub%stat.txt%pub%stat.txt | CCSVFormatDevDataProcess * |
|---|---|
| | |
| | |
| | |
| | |
| | |

FIG. 51

METHOD OF INITIALIZING A DATA PROCESSING OBJECT ASSOCIATED WITH A COMMUNICATION PROTOCOL USED TO EXTRACT STATUS INFORMATION RELATED TO A MONITORED DEVICE

CROSS-REFERENCE TO RELATED APPLICATIONS

This application is related to the following commonly owned co-pending U.S. patent applications:

1. Ser. No. 09/453,937 entitled "Method and System of Remote Diagnostic, Control, and Information Collection using a Dynamic Linked Library of Multiple Formats and Multiple Protocols with Intelligent Formatter," filed May 17, 2000;

2. Ser. No. 09/756,120 entitled "Method and System of Remote Support of Device Using Email," filed Jan. 9, 2001;

3. Ser. No. 09/782,064 entitled "Method and System of Remote Diagnostic, Control, and Information Collection using a Dynamic Linked Library of Multiple Formats and Multiple Protocols with Three-Level Formatting," filed Feb. 14, 2001;

4. Ser. No. 09/921,707 entitled "Universal Controller in The Wireless Networked Environment," filed Aug. 6, 2001;

5. Ser. No. 09/953,358 entitled "Method and System of Remote Support of Device Using Email Through Data Transfer Module," filed Sep. 17, 2001;

6. Ser. No. 09/953,359 entitled "Method and System for Remote Support of Device using Email for Sending Information Related to a Monitored Device," filed Sep. 17, 2001;

7. Ser. No. 09/975,935 entitled "Method and System for Remote Support of Device Using Email Based Upon Pop3 With Decryption Capability Through Virtual Function," filed Oct. 15, 2001;

8. Ser. No. 10/068,861 entitled "Method and Apparatus Utilizing Communication Means Hierarchy to Configure or Monitor an Interface Device," filed Feb. 11, 2002;

9. Ser. No. 10/142,989 entitled "Verification Scheme for Email Message Containing Information About Remotely Monitored Devices," filed May 13, 2002;

10. Ser. No. 10/142,992 entitled "Method for Scrambling Information about Network Devices That is Placed in Email Message," filed May 13, 2002;

11. Ser. No. 10/157,903 entitled "Method and Apparatus for Modifying Remote Devices Monitored by a Monitoring System," filed May 31, 2002;

12. Ser. No. 10/162,402 entitled "Method and System to Use HTTP and Html/Xml for Monitoring the Devices," filed Jun. 5, 2002;

13. Ser. No. 10/167,497 entitled "Method and System of Remote Position Reporting Device," filed Jun. 13, 2002, which is a continuation of Ser. No. 09/575,702 (U.S. Patent No. 6,421,608);

14. Ser. No. 10/225,290 entitled "Method and System for Monitoring Network Connected Devices with Multiple Protocols," filed Aug. 22, 2002;

15. Ser. No. 10/328,003 entitled "Method of Accessing Information from Database to be used to Obtain Status Information from the Web Pages of Remotely Monitored Devices," filed Dec. 26, 2002;

16. Ser. No. 10/328,008 entitled "Method of using Internal Structure to Store Database Information for Multiple Vendor and Model Support for Remotely Monitored Devices," filed Dec. 26, 2002;

17. Ser. No. 10/328,026 entitled "Method of using Vectors of Structures for Extracting Information from the Web Pages of Remotely Monitored Devices," filed Dec. 26, 2002;

18. Ser. No. 10/372,939 entitled "Method and System for Monitoring Network Connected Devices with Multiple Protocols," filed Feb. 26, 2003;

19. Ser. No. 10/460,150 entitled "Method for Efficiently Storing Information used to Extract Status Information from a Device Coupled to a Network in a Multi-Protocol Remote Monitoring System," filed Jun. 13, 2003;

20. Ser. No. 10/460,151 entitled "Method for Efficiently Extracting Status Information Related to a Device Coupled to a Network in a Multi-Protocol Remote Monitoring System," filed Jun. 13, 2003;

21. Ser. No. 10/460,404 entitled "Method for Parsing an Information String to Extract Requested Information Related to a Device Coupled to a Network in a Multi-Protocol Remote Monitoring System," filed Jun. 13, 2003;

22. Ser. No. 10/460,408 entitled "Method and System for Extracting Vendor and Model Information in a Multi-Protocol Remote Monitoring System," filed Jun. 13, 2003;

23. Ser. Number 10/670,505 entitled "Method and System for Extracting Information from Networked Devices in a Multi-Protocol Remote Monitoring System," filed Sep. 26, 2003;

24. Ser. Number 10/670,604 entitled "Method and System for Supporting Multiple Protocols Used to Monitor Networked Devices in a Remote Monitoring System," filed Sep. 26, 2003;

25. Ser. Number 10/764,582 entitled "Method and System for Initializing Protocol Information Used to Extract Status Information from Networked Devices," filed Jan. 27, 2004;

26. Ser. Number 10/764,467 entitled "Method and System for Determining the Type of Status Information to Extract from Networked Devices in a Multi-Protocol Remote Monitoring System," filed Jan. 27, 2004;

27. Ser. Number 10/764,569 entitled "Method and System for Managing Vendor and Model Information in a Multi-Protocol Remote Monitoring System," filed Jan. 27, 2004; and 28. Ser. Number 10/764,527 entitled "Method and System for Managing Protocols Used to Obtain Status Information from a Network Device," filed Jan. 27, 2004. The disclosures of each of the above U.S. patents and patent applications are incorporated herein by reference in their entirety.

The present invention includes the use of various technologies referenced and described in the references identified in the following LIST OF REFERENCES by the author(s) and year of publication of the reference:

LIST OF REFERENCES

[1] Goldfart, C., *The SGML Handbook*. Clarendon Press (1990);

[2] Castro, E., *HTML for the World Wide Web*, Peachpit Press, Berkeley (1996); and

[3] Megginson, D., *Structuring XML Documents*, Prentice Hall, NJ (1998).

The entire contents of each reference listed in the LIST OF REFERENCES are incorporated herein by reference.

BACKGROUND OF THE INVENTION

1. Field of the Invention

This invention relates to the monitoring of devices connected to a network. More particularly, it relates to a method, system, and computer program product for the remote monitoring of network-connected devices using multiple protocols.

2. Discussion of the Background

As is generally known, computer systems include hardware and software. Software includes a list of instructions that are created to operate and manage hardware components that make up a computer system. Typically, computer systems include a variety of hardware components/devices that interface with one another. The computer system can be a stand-alone type or a networked type. In a networked-type computer system, a plurality of distinct devices are connected to a network and thus communication between these distinct devices is enabled via the network.

Further, software for operating the hardware devices must be configured in order to allow communication between the hardware devices so that the hardware devices are enabled to function cooperatively. Further, in order to facilitate such a communication, it is also desirable for hardware devices to be monitored and the status of each hardware device identified in order to ensure that each hardware device is functioning in an efficient manner.

For the purposes of this patent application, the inventor has determined that a hardware device that is controlling, configuring, or monitoring the plurality of distinct devices or hardware devices would be referred to as a monitoring device and the hardware devices that are being controlled, configured, or monitored by the monitoring device would be referred to as "monitored devices."

For hardware devices that are located on a network, it is desirable for these devices to be monitored for maintenance, usage, or other purposes. However, in view of manufacturer differences relating to hardware devices and interfaces, it may be difficult for a monitoring device to communicate with various other devices connected to a network. Such a disadvantage most likely prevents network administrators from obtaining crucial information about the performance and efficiency of the devices connected to the network.

The Simple Network Management Protocol (SNMP) is today a de-facto industry standard for the monitoring and management of devices on data communication networks, telecommunication systems and other globally reachable devices. Practically every organization dealing with computers and related devices expects to be able to centrally monitor, diagnose, and configure each such device across local- and wide-area networks. SNMP is the protocol that enables this interaction.

In order for a device to respond to SNMP requests, it is desirable to equip the device with the software that enables it to properly interpret an SNMP request, perform the actions required by that request, and produce an SNMP reply. The SNMP agent software is typically a subsystem software module residing in a network entity.

The collection of objects implemented by a system is generally referred to as a Management Information Base (MIB). An MIB may also be a database with information related to the monitoring of devices. Examples of other MIB's include Ethernet MIB, which focuses on Ethernet interfaces; Bridge MIB, which defines objects for the management of 802.1D bridges, to name a few.

Using SNMP for monitoring devices is difficult as private MIB's include values that are hard to decipher without a valid key. A company using SNMP for monitoring various devices connected to its network creates a unique identifier/key that is maintained as proprietary information of the company. For the most part, the results are displayed as binary or integer values. Thus, using SNMP, results received from the devices that are being monitored ("monitored devices") fail to provide a user with the status of the monitored devices in a user comprehensible manner.

Further, using SNMP, it is difficult for one to obtain detailed information about a monitored device without a valid key or access to a private MIB to decipher the results obtained as binary or integer values. In addition, a given protocol (e.g., SNMP or HTTP/HTML) may fail for various reasons, such as time out or lost packets. Also, some information extracted from a given device using the multiple protocols may be duplicated for each protocol. Accordingly, if the extraction of data from the device is not properly managed in such situations, time and memory inefficiencies result since some protocols require more resources than other protocols. In addition, information extraction using some protocols may require much less processing and memory than using others. Furthermore, some information obtained through one protocol may be more useful for the monitoring device than the one obtained through another protocol.

In current monitoring systems, it is assumed that each protocol (e.g., SNMP, FTP, HTTP) used a single method corresponding to a single format to extract data from a monitored device. For example, the SNMP protocol gets the value corresponding to the Object identifier (OID) through the SNMP command GetNext. Moreover, the HTTP protocol using HTML gets the value using a Key Value, a position relative to the Key Value, and an In-line position relative to the delimiter. However, the present inventors have discovered that this assumption does not hold for the FTP protocol and for XML. For example, the data that should be extracted from a monitored device may be different depending upon the vendor and the particular FTP file. For XML, tags from various vendors may have different tag names.

FIGS. 38A-C show examples of the above problems with FTP files (samples 1-3). Samples 1-3 are examples of different files that can be obtained through the FTP protocol for devices from a particular vendor. Different methods are needed to extract information from each of these files. In the previous inventions, all the information for a given protocol is assumed to be in the same format. SNMP and HTTP/HTML follow the same method to extract the relevant information. However, just like FTP, it is possible that the different methods may be required to process HTTP/XML data because different manufacturers or different models of the same manufacturer may have different data structures for XML formatted data.

FIG. 38A shows an example FTP file containing information about the input trays, output trays, and printer languages of a network printer. A need exists for a monitoring system to extract information only from the lines containing information about each tray and each printer language. Such a system should determine what type of information is being extracted by looking for the text "Input Tray", "Output Tray", or "Printer Language". After determining the type of information, the system should extract the status information following the column heading (i.e. dashed line). Each line following the column heading should be considered as a single piece of information until the end of the table is reached.

FIG. 38B shows an example FTP file containing information about a printer's print jobs. A monitoring system should consider the type of information in this file as a print job and should extract the status information following the column heading. Each line following the column heading should be considered as a single piece of information until the end of the table is reached. Unlike the FTP file of FIG. 38A, there is no need to determine the type of information since this FTP contains one type of information.

FIG. 38C shows an example FTP file containing information about a printer's system logs. A monitoring system should determine what information is being extracted by looking for the key text on each line (e.g. ncsd, inetd, snmpd, papserver, or any text between "[" and "(xx)]"). For each type of information, the system should treat the line corresponding to the key text as the status information for the type. In some cases, the status information for a type may extend over multiple lines such as the following lines of FIG. 38C show:

[snmpd(23)]04/03/03 13:42:25 add_sess_ipx: bad
        trap addr: 00:00:00:00:00:00, community:
        RICOHTRAPS WARNING:

In such case, the system should treat the two lines as the status information for the type snmpd. From the discussion of FIGS. 38A-C, there is an apparent need to process the FTP files differently to obtain status information from a monitored device.

SUMMARY OF THE INVENTION

The system and method of the present invention addresses solutions to the above-identified problems by enabling monitoring of devices that are connected to a network. Accordingly, a method of monitoring a device among distinct devices communicatively coupled to a network is described.

The method includes accessing a first database via a hardware access module, the first database being configured to support a plurality of communication protocols. The first database is stored with information used by the plurality of communication protocols in order to obtain various information, such as manufacturer and model information of a monitored device. A communication protocol is selected from among a plurality of communication protocols, and the selected communication protocol is configured to receive status information from the monitored device. The method further includes accessing the monitored device using the selected communication protocol and information from the first database, receiving status information from the accessed device, and storing the received status information in a second database (DeviceODBC).

In another embodiment, the present invention provides a method of monitoring a device among distinct devices communicatively coupled to a network. A plurality of communication protocols may be used to retrieve information from a monitored device. For example, an SNMP protocol is first selected to access a monitored device, and device information that is configured to be efficiently retrieved using the SNMP protocol is obtained. Subsequently, HTTP and FTP protocols are selected to obtain information that was incapable of efficient retrieval using the SNMP protocol if the device supports the additional protocols. The selection of protocols is performed by a protocol manager in conjunction with support information stored in a database.

In the present invention, a monitoring system enables the monitoring of at least one device (monitored device) connected to a network, such as, for example, a LAN or a WAN. The monitored device is configured to have a unique IP address. The IP address allocated to the monitored device, and the details of the vendor/manufacturer for the monitored device, are stored in a database. By scanning the network and interrogating the devices the IP addresses of the devices can be obtained. Such methods are known. Therefore, it is assumed that IP addresses of the devices to be monitored are already acquired and stored in a database.

The present invention specifies how to extract necessary information from the HTML information received from a monitored device. Once a web page location of the monitored device is accessed (i.e., through the IP address and the specified port), a specific web page corresponding to the monitored device is displayed. Information in the web page is in the form of key and value pairs. For example, the toner level may be shown as "Black 100%" in the color printer web page. An HTML/XML parser is used to parse the page in order to retrieve required information from the information in the web page. The required information and parameter values extracted from the web page using the HTML/XML parser are stored in the DeviceODBC database.

The present invention also identifies various vendors of monitored devices and the device models that are supported by the monitoring system as described herein. Since various vendors of the monitored devices present information about a monitored device in a vendor-specific manner, the present invention enables the identification of the vendor and model of the monitored device to determine the operational status of the monitored device.

According to the present invention, there is provided a method, system, and computer program product for initializing at least one data processing object associated with a communication protocol used to extract status information related to a monitored device communicatively coupled to a network, including (1) accessing the monitored device to obtain vendor information related to the monitored device; (2) obtaining, from a support memory, information related to an access function for extracting the status information using the communication protocol from an accessible data file on the monitored device, the accessible data file having a respective data file type; (3) storing the vendor information and the access function information in a respective data processing object of the at least one data processing object; and (4) repeating the preceding obtaining and storing steps for each of the at least one data processing object.

According to the present invention there is provided a method, system, and computer program product for creating a data processing object associated with a communication protocol used to extract status information related to a monitored device communicatively coupled to a network, comprising: (1) accessing the monitored device using the communication protocol to obtain at least vendor information related to the monitored device; (2) obtaining, from a first memory, information related to an access function for extracting the status information from an accessible data file on the monitored device; (3) generating a string using the obtained vendor information and the obtained access function information; (4) obtaining, from a second memory, information related to a creation function corresponding to the generated string; and (5) creating the data processing object using the obtained creation function.

According to the present invention, there is provided a method, system, and computer program product for extracting, for a selected communication protocol, status information related to a monitored device communicatively coupled to a network, comprising: (1) accessing the monitored device using the selected communication protocol to obtain at least vendor information related to the monitored device; (2) obtaining, from a first memory, information identifying an access function for extracting the status information from an accessible data file on the monitored device; (3) generating a string based on the obtained vendor information and the obtained access function information; (4) retrieving, from a second memory in correspondence to the generated string, information of a data processing object associated with the access function, and an information map that includes at least a type of status information to be extracted from the monitored device and a weight associated with the status information; and (5) accessing the monitored device using the access function, the information map, and the selected communication protocol to obtain the status information.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIGS. 27A-27D illustrate the data structures used in the HWaccess module of FIG. 23 to maintain information necessary to access the monitored devices and to obtain status information from the monitored devices according to the present invention;

FIGS. 29A-29D illustrate the data structures used to obtain the status information of a monitored device of a specific vendor and model for each protocol according to the present invention;

FIG. 30 illustrates an example of sample data for the data structures of FIGS. 27D, 29C, and 29D that will be used to obtain status information from a monitored device using the FTP protocol according to the present invention;

FIG. 32A shows the data structure used to maintain information about the vendors and models of monitored devices supported by a given protocol according to the present invention;

FIG. 32B shows an example of the data structure shown in FIG. 32A;

FIG. 36A shows the data structure used by the software objects representing the monitored devices to determine which protocols are used to access a monitored device according to the present invention;

FIG. 36B shows sample data in the data structure of FIG. 36A;

FIGS. 38A-C show examples of the need to be able to extract different types of data from different types of files using FTP;

FIG. 39 shows an abstract class that defines the interface to the object used to process the extraction of the infoType and the corresponding value from the information obtained from the monitored device;

FIGS. 43 through 45 describe the data structures m_VendorModelSupportMap, mVendorInfoVector, and m_SupportStatusInfoMap, respectively, in the CFTPProtocol class;

FIGS. 46 through 51 describe the data structures used in CFTPODBC;

DETAILED DESCRIPTION OF THE PREFERRED EMBODIMENTS

Figure 1:
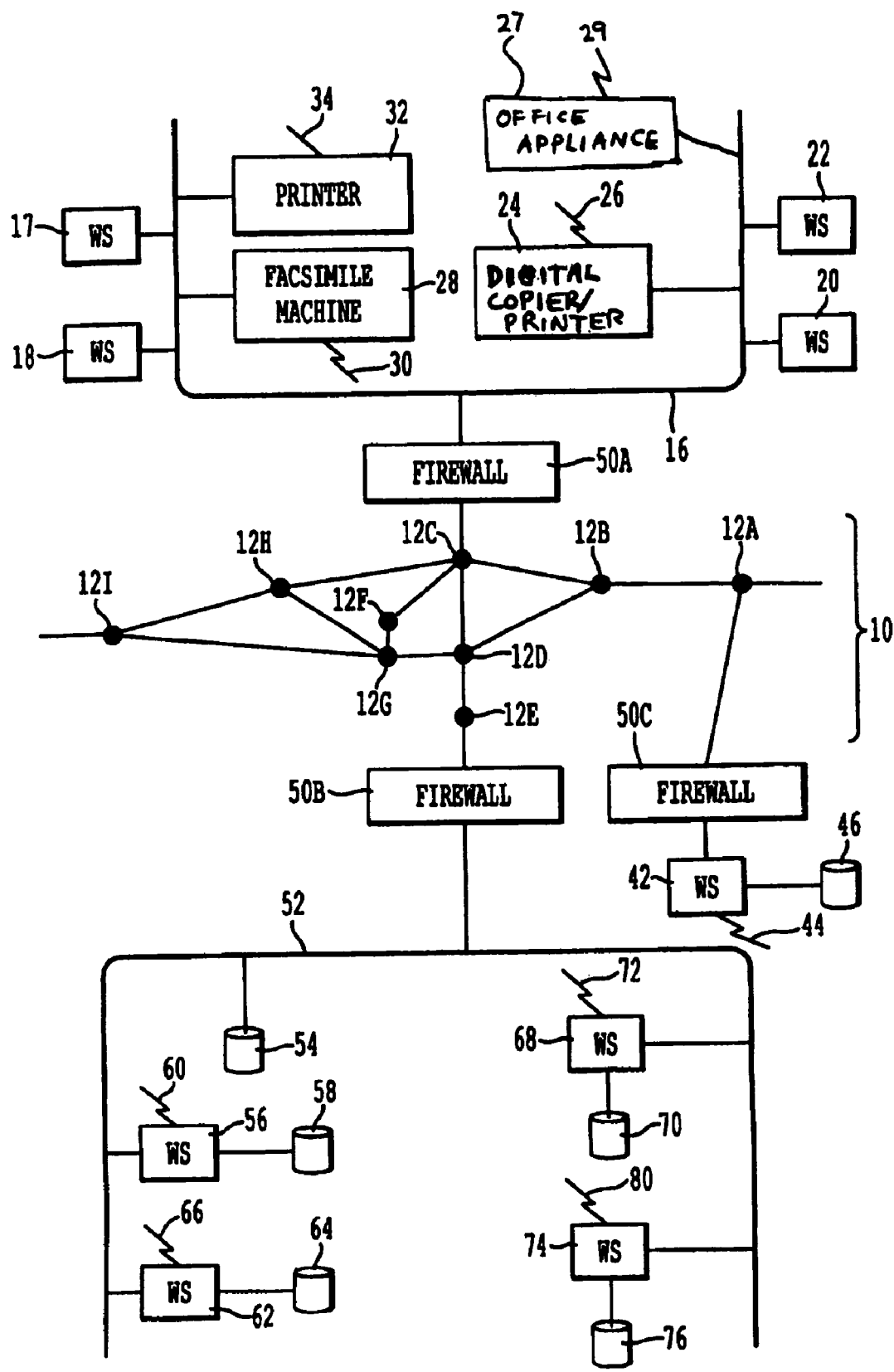
FIG. 1 illustrates three networked business office devices connected to a network of computers and databases through the Internet.

FIG. 1 illustrates a schematic having various devices and computers for monitoring, diagnosing, and controlling the operation of the devices. Specifically, FIG. 1 includes a first network 16, such as a Local Area Network (LAN) connected to computer workstations 17, 18, 20, and 22. The workstations can be any type of computers including, e.g., Personal Computer devices, Unix-based computers, Linux-based computers, or Apple Macintoshes. Also connected to the network 16 are a digital copier/printer 24, a facsimile machine 28, and a printer 32. The digital copier/printer can also function as a network scanner. As would be appreciated by one of ordinary skill in the art, two or more of the components of the digital copier/printer 24 and the facsimile machine 28 can be combined into a unified "image forming apparatus." For example, the copier/printer 24, facsimile machine 28, the printer 32, and the workstations 17, 18, 20, and 22 may be referred to as machines or monitored devices. In some configurations, one or more workstations may be converted to business office appliances. In addition, any network business office appliance/device can be attached to the network 16. Also, any workstation 17, 18, 20, and 22, and office appliance 27 can function as an intermediate monitoring device to poll the monitored devices on the network 16 and to send the collected data to the monitoring device.

One example of such a business office appliance is eCabinet® from Ricoh Corporation. Also, a facsimile server (not illustrated) may be connected to the network 16 and have a telephone, cable, or wireless connection. Each of the digital copier/printer 24, facsimile machine 28, and printer 32, in addition to being connected to the network 16, may also include conventional telephone and/or cable and/or wireless connections 26, 30, and 34, respectively. As explained below, the monitored devices 24, 28, and 32, communicate with a remote monitoring, diagnosis, and control station, also referred to as a monitoring device, through, for example, the Internet via the network 16 or by a direct telephone, wireless, or cable connection.

In another exemplary business environment, monitored devices may include such devices as a multi-function imaging device, a scanner, a projector, a conferencing system, and a shredder. In another application, the network 16 may be a home network where monitored devices are meters (electricity, gas, water) or appliances such as, for example, microwave oven, washer, dryer, dishwasher, home entertainment system, refrigerator, rice cooker, heater, air condition, water heater, security camera.

In FIG. 1, a wide area network (WAN) (e.g., the Internet or its successor) is generally designated by 10. The WAN 10 can be either a private WAN, a public WAN, or a hybrid type. The WAN 10 includes a plurality of interconnected computers and routers designated by 12A-12I. The manner of communicating over a WAN is known through a series of Request for Comments (RFC) documents available from the Internet Engineering Task Force (IETF) at www.ietf.org/rfc.html, including RFC 821, entitled "Simple Mail Transfer Protocol"; RFC 822, entitled "Standard for the Format of ARPA Internet Text Message"; RFC 959, entitled "File Transfer Protocol (FTP)"; RFC 2045, entitled "Multipurpose Internet Mail Extensions (MIME) Part One: Format of Internet Message Bodies"; RFC 1894, entitled "An Extensible Message Format for Delivery Status Notifications"; RFC 1939, entitled "Post Office protocol—Version 3"; RFC 2068, "Hypertext Transfer Protocol—HTTP/1.1"; and RFC 2298, entitled "An Extensible Message Format for Message Disposition Notifications." The contents of each of these references are incorporated herein by reference.

Transmission Control Protocol/Internet Protocol (TCP/IP) related communication is described, for example, in the book "TCP/IP Illustrated," Vol. 1, The Protocols, by W. R. Stevens, from Addison-Wesley Publishing Company, 1994, the entire contents of which is incorporated herein by reference. Volumes 1-3 of "Internetworking with TCP/IP" by Comer and Stevens are also incorporated herein by reference in their entirety.

Continuing to refer to FIG. 1, a firewall 50A is connected between the WAN 10 and the network 16. A firewall is a device that allows only authorized computers on one side of the firewall to access a network, computers, or individual parts on the other side of the firewall. Firewalls are known and commercially available devices and/or software (e.g., ZoneAlarm from Zone Labs). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, AddisonWesley Publishing, and "Building Internet Firewalls" by D. B. Chapman and E. D. Zwicky, 1995, O'Reilly & Associates, Inc. The entire contents of those two references are incorporated herein by reference.

The network 52 is a conventional network and includes a plurality of workstations 56, 62, 68, and 74. These workstations may be located in a distributed fashion within different departments (e.g., sales, order processing, accounting, billing, marketing, manufacturing, design engineering, and customer service departments) within a single company. In addition to the workstations connected via the network 52, a workstation 42 that is not directly connected to the network 52 is also provided. Information in a database stored in a disk 46 connected to the workstation 42 may be shared using proper encryption and protocols over the WAN 10 to the workstations connected directly to the network 52. Also, the workstation 42 includes a direct connection to a telephone line and/or a cable network and/or a wireless network 44, and the database in disk 46 may be accessed through the telephone line, the cable network, or via the wireless network 44. The cable network used by this invention may be implemented using a cable network that is typically used to carry television programming, a cable that provides for high-speed communication of digital data typically used with computers or the like, or any other desired type of cable.

In another embodiment, the workstation 42 can be a laptop computer, a PDA, a palm top computer, or a cellular phone with network capability. These devices may be used to access information stored in the database stored in the disk 46.

Information related to digital copier/printer 24, office appliance 27, facsimile machine 28, or printer 32, respectively, may be stored in one or more of the databases stored in the disks 46, 54, 58, 64, 70, and 76. Known databases include (1) SQL databases by Microsoft, IBM, Oracle, and Sybase; (2) other relational databases; and (3) non-relational databases (including object-oriented databases from Objectivity, JYD Software Engineering, and Orient Technologies). Each of the sales, order processing, accounting, billing, customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. For example, disk 64 may be stored with a marketing database, disk 58 may be stored with a manufacturing database, disk 70 may be stored with an engineering database, and disk 76 may be stored with a customer service database. Alternatively, the disks 54 and 46 may be stored with one or more of the databases.

In addition to the workstations 56, 62, 68, 74, and 42 being connected to the WAN 10, these workstations may also include a connection to a telephone line, cable, or wireless networks for providing a secure connection to a machine/device being monitored, diagnosed, and/or controlled. Additionally, if one of the communication media is not operating properly, one of the others may be automatically used, as a backup, for communication.

A feature of the present invention is the use of a "store-and-forward" mode of communication (e.g., Internet electronic mail, also referred to herein as e-mail) or transmission between a machine and a computer/monitoring system for diagnosing and controlling the machine. Alternatively, the message which is transmitted may be implemented using a mode of communication that makes direct, end-to-end connections (e.g., using a socket connection to the ultimate destination) such as FTP and Hyper Text Transfer Protocol (HTTP).

Figure 2:
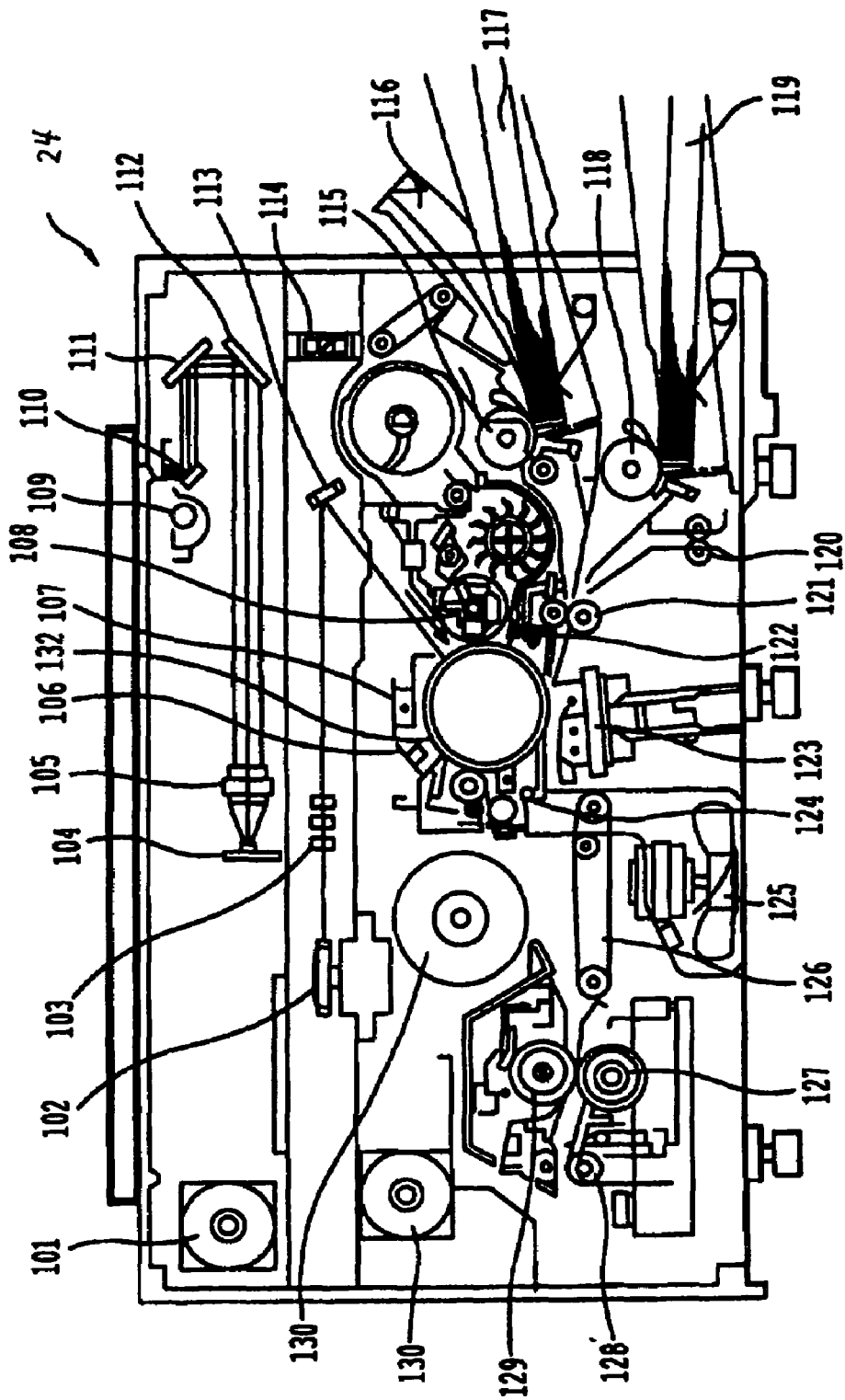
FIG. 2 illustrates the components of a digital image forming apparatus.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner. Reference numeral 105 designates a lens for focusing light from the scanner onto the sensor 104, and reference numeral 106 designates a quenching lamp used to erase images on the photoconductive drum 132. There is a charging corona unit 107 and a developing roller 108. Reference numeral 109 designates a lamp used to illustrate a document to be scanned and elements 110, 111, and 112 designate mirrors for reflecting light onto the sensor 104. A drum mirror 113 is provided to reflect light to the photoconductive drum 132 originating from the polygon mirror 102. A fan 114 is used to cool the charging area of the digital image forming apparatus, and a first paper feed roller 115 is used for feeding paper from the first paper cassette 117, and a reference numeral 116 designates a manual feed table. Similarly, a second feed paper feed roller 118 is used in conjunction with the second cassette 119. Reference numeral 120 designates a relay roller, 121 designates a registration roller, 122 designates an image density sensor, and 123 designates a transfer/separation corona unit. Reference numeral 124 designates a cleaning unit, 125 designates a vacuum fan, 126 designates a transport belt, 127 designates a pressure roller; and 128 designates an exit roller. A hot roller 129 is used to fix toner onto the paper, 130 designates an exhaust fan, and a main motor 131 is used to drive the digital copier/printer 24.

Figure 3:
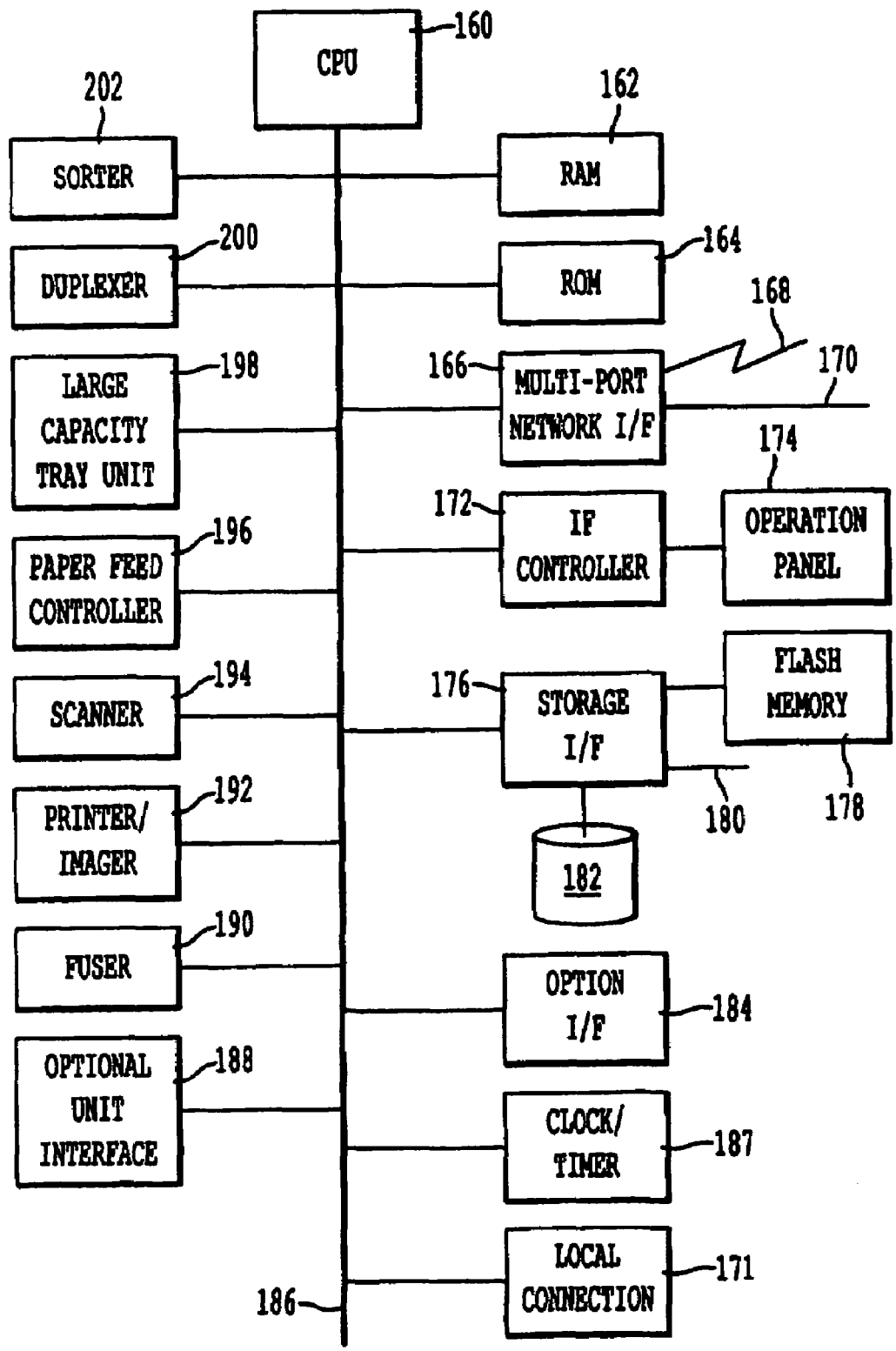
FIG. 3 illustrates the electronic components of the digital image forming apparatus illustrated in FIG. 2.

FIG. 3 is a block diagram illustrating the electronic components of the digital copier/printer 24 of FIG. 2, wherein CPU 160 is a microprocessor that acts as a controller of the apparatus. Random access memory (RAM) 162 stores dynamically changing information including operating parameters of the digital copier/printer 24. A non-volatile memory (e.g., a read only memory (ROM) 164 or a Flash Memory) stores program code used to run the digital copier/printer as well as static-state data, describing the copier/printer 24 (e.g., the model name, model number, serial number of the device, and default parameters).

A multi-port network interface 166 is provided to enable the digital copier/printer 24 to communicate with external devices through at least one communication network. Reference number 168 represents a telephone, wireless or cable line, and numeral 170 represents another type of network different from the network identified at 168. Additional details of the multi-port network interface are set forth with respect to FIG. 4. An interface controller 172 is used to connect an operation panel 174 to a system bus 186. The operation panel 174 includes standard input and output devices found on a digital copier/printer 24 including a copy button, keys to control the operation of the image forming apparatus such as, for example, number of copies, reduction/enlargement, darkness/lightness, etc. Additionally, a liquid crystal display may be included within the operation panel 174 to display parameters and messages of the digital copier/printer 24 to a user.

A local connection interface 171 is a connection through local ports such as RS232, the parallel printer port, USB, and IEEE 1394. FireWire (IEEE 1394) is described in Wickelgren, I., "The Facts About" FireWire", IEEE Spectrum, April 1997, Vol. 34, Number 4, pp. 19-25, the entire contents of which are incorporated herein by reference. Preferably, a "reliable" communication protocol is used which includes error detection and retransmission.

A storage interface 176 connects storage devices to the system bus 186. For example, the storage devices include a flash memory 178, which can be substituted by a conventional Electrically Erasable Programmable Read Only Memory (EEPROM), and a disk 182. The disk 182 may be a hard disk, optical disk, and/or a floppy disk drive. Additional memory devices may be connected to the digital copier/printer 24 via connection 180. The flash memory 178 is used to store semi-static state data that describes parameters of the digital copier/printer 24 that infrequently change over the life of the apparatus 24. Such parameters include, for example, the options and configuration of the digital copier/printer. An option interface 184 allows additional hardware, such as an external interface, to be connected to the digital copier/printer 24. A clock/timer 187 is utilized to keep track of both the time and date and also to measure elapsed time.

FIG. 3 also illustrates the various sections making up the digital copier/printer 24. Reference numeral 202 designates a sorter and contains sensors and actuators that are used to sort the output of the digital copier/printer 24. A duplexer 200 allows performance of a duplex operation. The duplexer 200 includes conventional sensors and actuators. A large capacity tray unit 198 is provided for allowing paper trays holding a large number of sheets. As with the duplexer 200, the tray unit 198 includes conventional sensors and actuators as well.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used such as a home position sensor to determine that the scanner is in the home position, and a lamp thermistor is used to ensure proper operation of the scanning lamp. A printer/imager 192 prints the output of the digital image forming device, and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device. Other elements include a GPS unit that can identify the location of the device.

Figure 4:
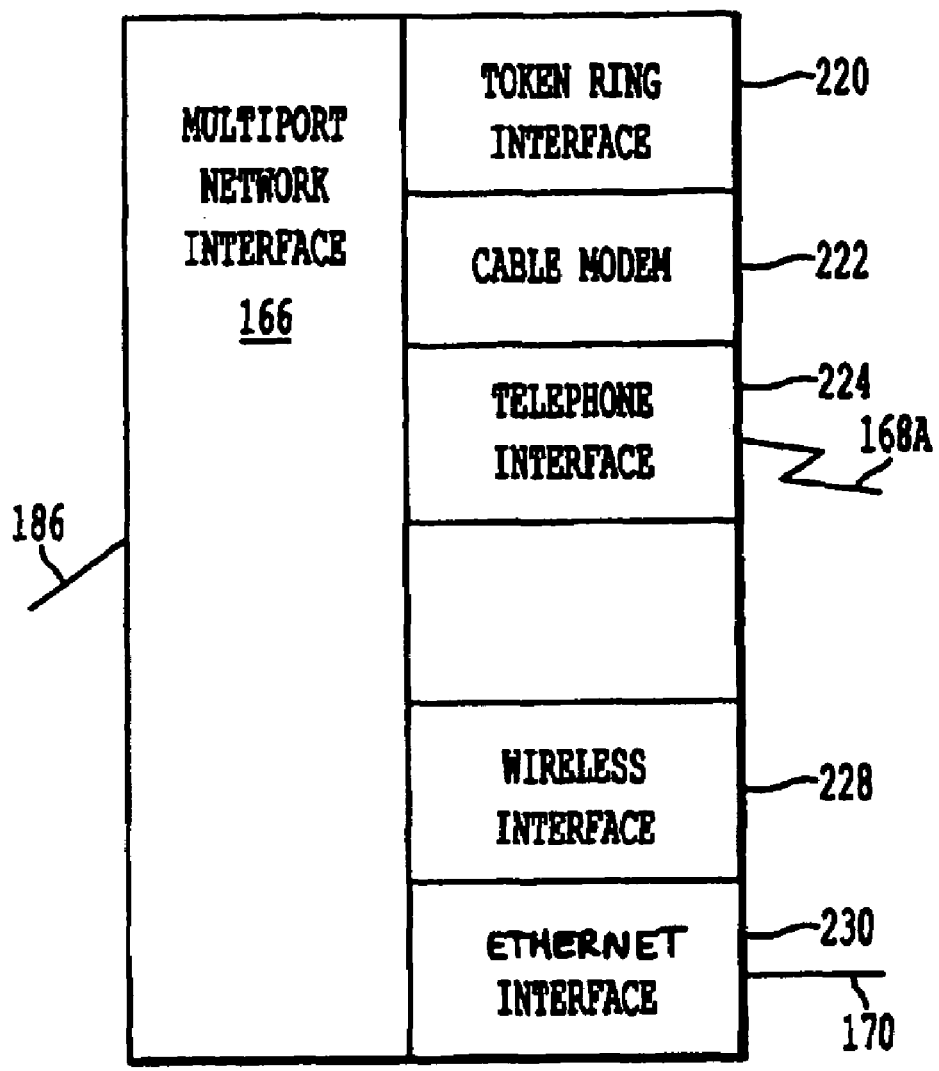
FIG. 4 illustrates details of a multi-port communication interface illustrated in FIG. 3.

FIG. 4 illustrates details of the multi-port network interface 166. The digital image forming device may communicate to external devices through a token ring interface 220, a cable modem unit 222, which has a high speed connection over cable, a conventional telephone interface 224, which connects to a telephone line 168A, a wireless interface 228, or an Ethernet interface 230, which connects to a LAN 170. Other interfaces may include, but are not limited to, a Digital Subscriber Line (DSL) (original DSL, concentric DSL, and asymmetric DSL). A single device which connects to both a Local Area Network and a telephone line is commercially available from Intel and is known as Intel Pro 10/100+Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device, and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162, the flash memory 178, or disk 182). Additionally, the static state memory may be a device other than the ROM 164 such as a non-volatile memory including either of the flash memory 178 or disk 182.

The above details have been described with respect to a digital image forming device, but the present invention is equally applicable to other business office machines or devices such as an analog copier, a facsimile machine, a scanner, a printer, a facsimile server, projector, conferencing equipment, shredder, or other business office machines, a business office appliance, or other appliances (e.g., a microwave oven, VCR, DVD, digital camera, cellular phone, palm top computer). Additionally, the present invention includes other types of devices that operate using store-and-forward or direct connection-based communication. Such devices include metering systems (including gas, water, or electricity metering systems), vending machines, or any mechanical device (e.g., automobiles, washer, dryer) that needs to be monitored during operation or remote diagnosis. In addition to monitoring special purpose machines and computers, the invention can be used to monitor, control, and diagnose a general purpose computer that would be the monitored and/or controlled device.

Figure 5:
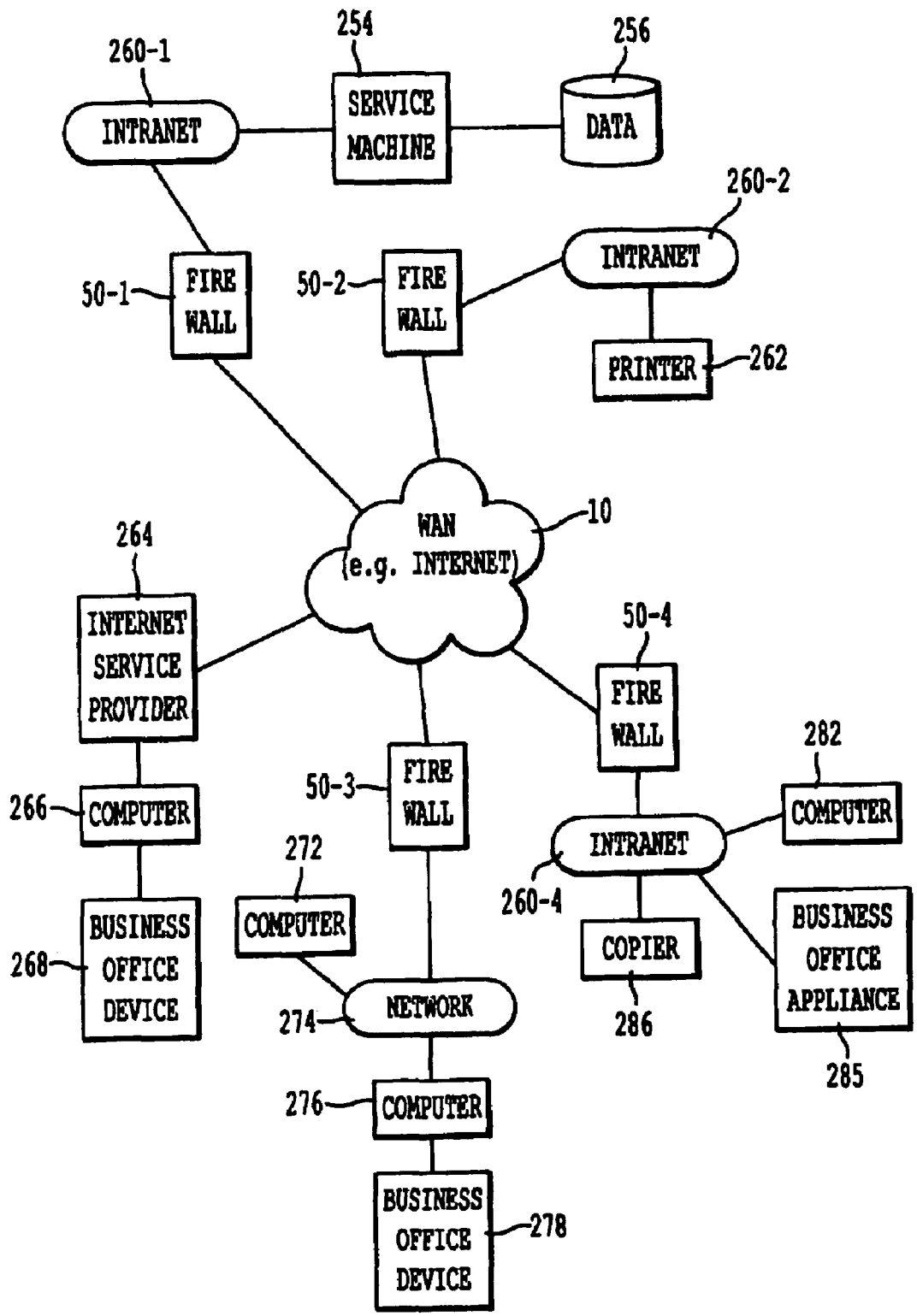
FIG. 5 illustrates an alternative system configuration in which business office devices are either connected directly to the network or connected to a computer which is connected to the network.

FIG. 5 illustrates an alternative system diagram of the present invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein, or has connected thereto, data 256 that may be stored in a database format. The data 256 includes history, performance, malfunction, and any other information such as statistical information of the operation or failure or set-up of the monitored devices, or configuration information such as which components or optional equipment is included with the monitored devices. The service machine 254 may be implemented as the device or computer that requests the monitored devices to transmit data, or that requests that remote control and/or diagnostic tests be performed on the monitored devices. The service machine 254 may be implemented as any type of device, and is preferably implemented using a computerized device such as a general purpose computer. Also, Service Machine 254 may consist of multiple computers over the network with diverse database including billing, accounting, service processing, parts tracking and reports.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet Service Provider 264, which may be any type of Internet Service Provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an Asymmetric Digital Subscriber Line (ADSL), modems that use frame relay communication, wireless modems such as a radio frequency modem, a fiber optic modem, or a device that uses infrared light waves). Further, a business office device 268 is connected to the computer 266. As an alternative to the business office device 268 (or any other device illustrated in FIG. 5), a different type of machine may be monitored or controlled such as a digital copier, any type of appliance, security system, or utility meter, such as an electrical, water, or gas utility meter, or any other device discussed herein.

Also illustrated in FIG. 5 is a firewall 50-3 connected to a network 274. The network 274 may be implemented as any type of computer network, (e.g., an Ethernet or token ring network). Networking software that may be used to control the network includes any desired networking software including software commercially available from Novell or Microsoft. The network 274 may be implemented as an intranet, if desired. A computer 272 connected to the network 274 may be used to obtain information from a business office device 278 and generate reports such as reports showing problems that occurred in various machines connected to the network, and a monthly usage report of the devices connected to the network 274. In this embodiment, a computer 276 is connected between the business office device 278 and the network 274. This computer receives communications from the network and forwards the appropriate commands or data, or any other information, to the business office device 278.

Communication between the business office device 278 and the computer 276 may be accomplished using wire-based or wireless methods including, but not limited to, radio frequency connections, electrical connections, and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique disclosed in the Bluetooth Specification (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable, but optional equipment, and therefore, the invention may be operated without the use of firewalls, if desired. For the monitoring and controlling of the networked equipment, any computers (266, 272, or 282) can be used instead of 254. In addition, any computer may access 254 to retrieve necessary device information or usage information through the web.

Figure 6A:
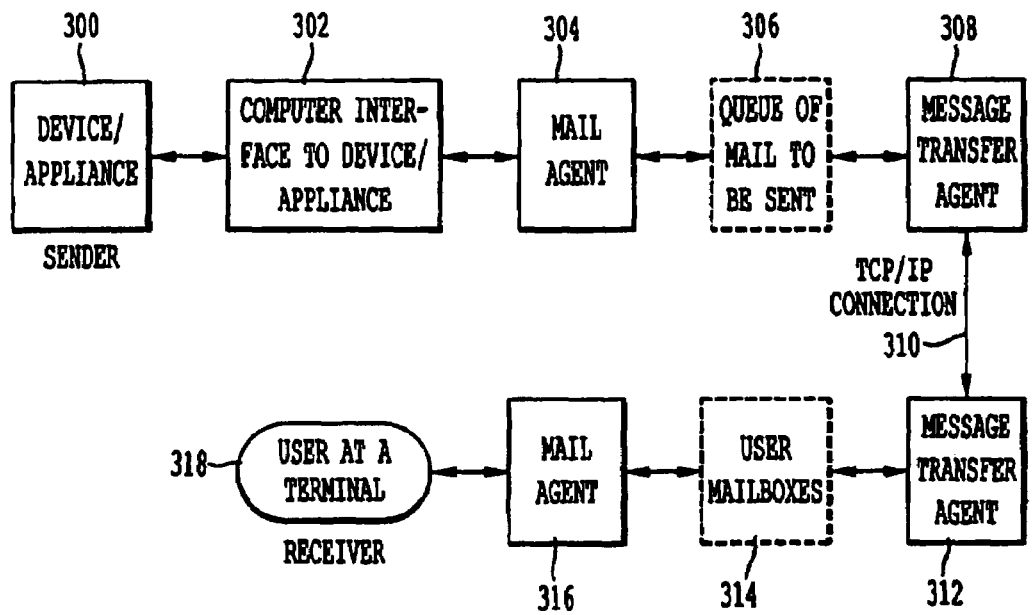
FIG. 6A is a block diagram illustrating a flow of information to and from an application unit using electronic mail.
Figure 28:
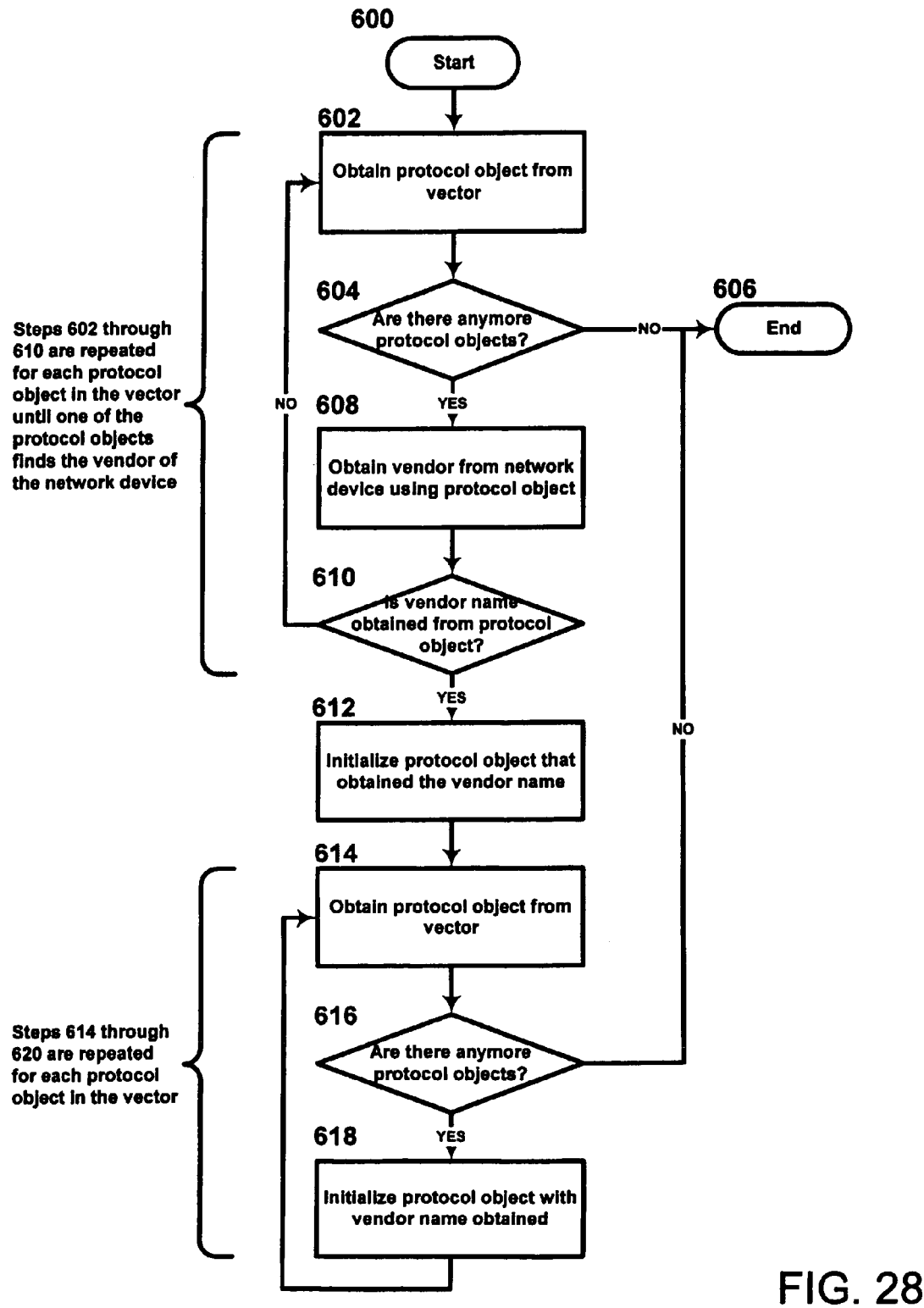
FIG. 28 shows a flowchart describing the process of initializing the protocol objects with vendor information of a monitored device according to the present invention.

FIG. 6A illustrates a device/appliance 300 connected to a typical e-mail exchange system, which includes components 302, 304, 306, 308, 310, 312, 314, 316, and 318, which may be implemented in a conventional manner, and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not need to interface with the device/appliance 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may use any communication protocol. In one embodiment the present invention, elements 302 and 304 of FIG. 6A reside in the library to monitor the usage of the application unit.

From the message transfer agent 312, e-mail messages are stored in user mailboxes 314, which are transferred to the mail agent 316 and ultimately transmitted to the user at a terminal 318 which functions as a receiving terminal.

This "store-and-forward" process relieves the sending mail agent 304 from having to wait until a direct connection is established with the mail recipient. Because of network delays, the communication could require a substantial amount of time during which the application would be unresponsive. Such delays in responsiveness may generally be unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include Telnet, File Transfer Protocol (FTP), and Hyper Text Transfer Protocol (HTTP).

Public WANs, such as the Internet, are generally not considered to be secure. Therefore, if it is desired to keep messages confidential, messages transmitted over the public WANs (and multi-company private WANs) can be encrypted. Encryption mechanisms are known and commercially available and may be used with the present invention. For example, a C++ library function, crypt( ), is available from Sun Microsystems for use with the Unix operating system. Encryption and decryption software packages are known and commercially available and may also be used with this invention. One such package is PGP available from PGP Corporation.

Figure 6B:
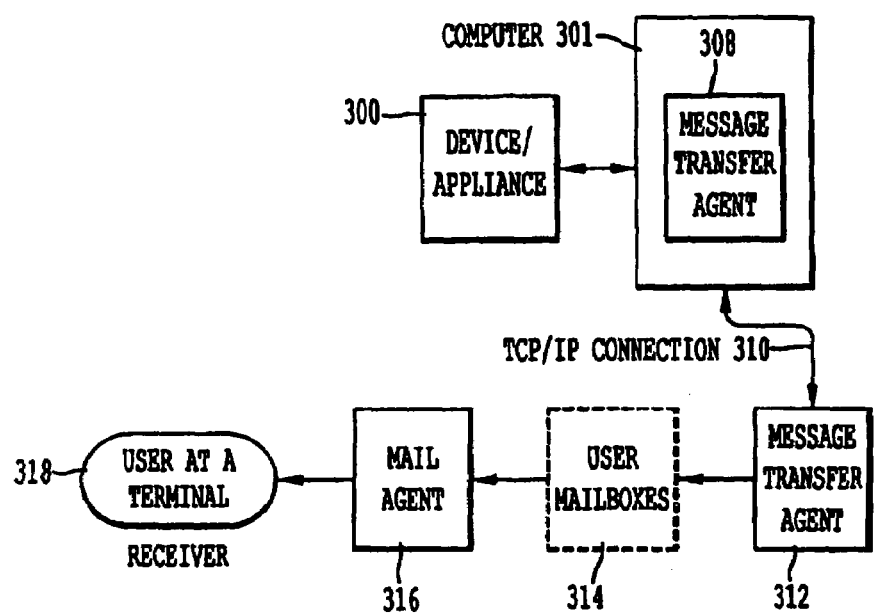
FIG. 6B illustrates an alternative way of communicating using electronic mail in which a computer that is connected to the application unit also serves as a Message Transfer Agent (MTA)

As an alternative to the general structure of FIG. 6A, a single computer that functions as the computer interface 302, the mail agent 304, the mail queue 306, and the message transfer agent 308 may be used. As illustrated in FIG. 6B, the device/appliance 300 is connected to a computer 301, which includes the message transfer agent 308.

Figure 6C:
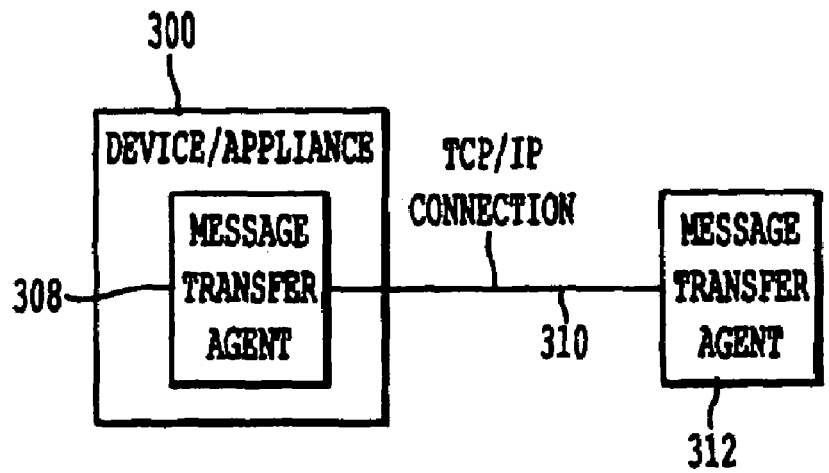
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 with an e-mail capability. One use of the embodiment of FIG. 6C includes using a facsimile machine with an e-mail capability (e.g., as defined in RFC 2305 (a simple mode of facsimile using Internet mail)) as the device/appliance 300.

Figure 6D:
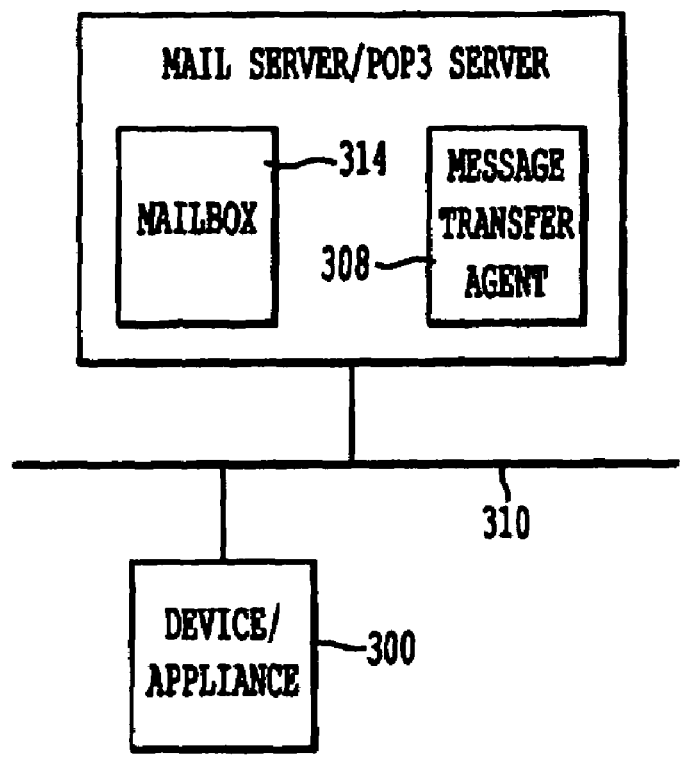
FIG. 6D illustrates an alternative way of communicating using electronic mail in which a mail server acts as a POP3 server to receive mail for an appliance/device and as an Simple Mail Transfer Protocol (SMTP) server to send mail for the appliance/device.

FIG. 6D illustrates a system in which a device/appliance 300 does not by itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
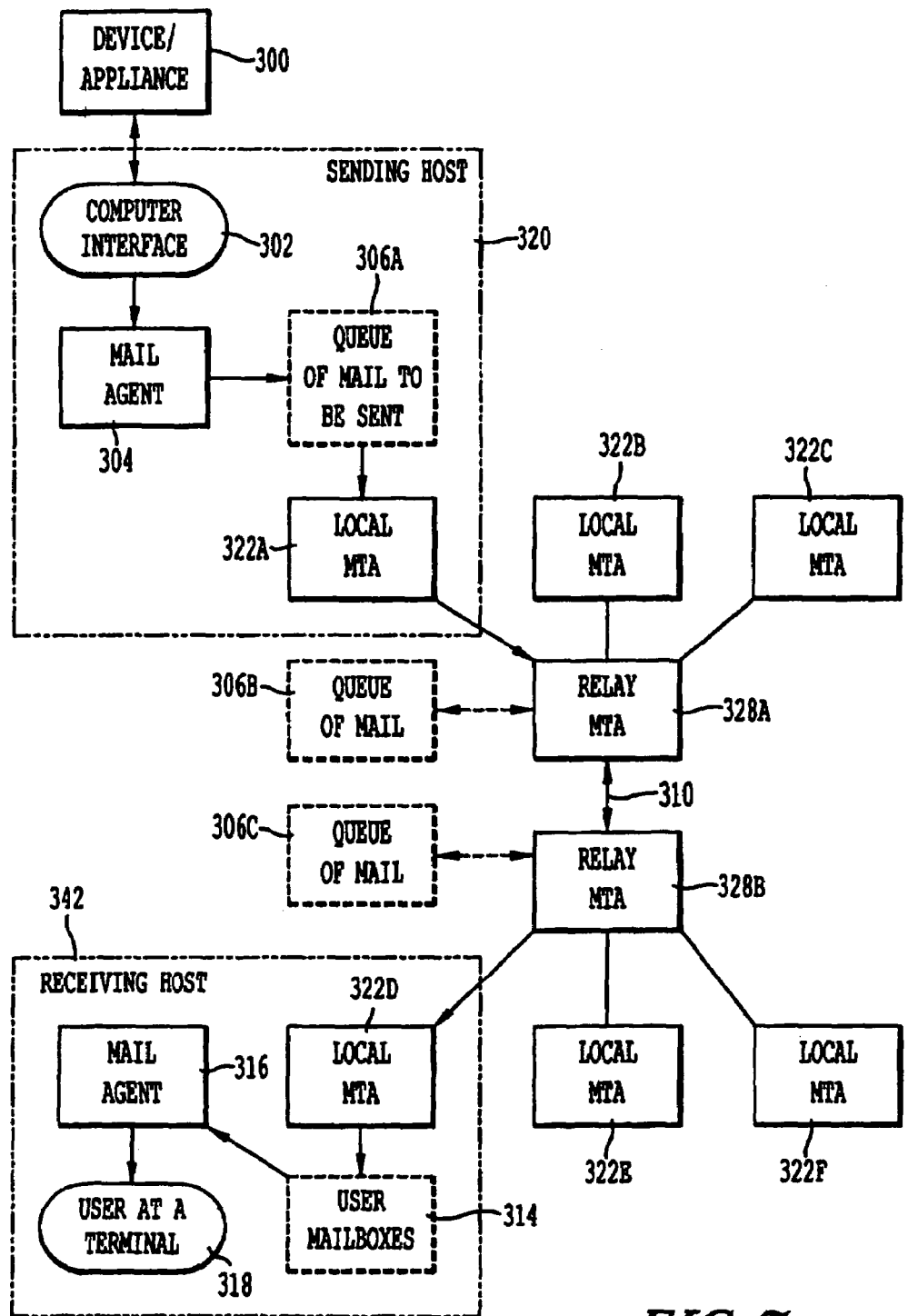
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/appliance 300. Other local MTAs 322B, 322C, 322E, and 322F may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316, and finally forwarded to the user at a terminal 318. If desired, the mail may be directly forwarded to the terminal without user interaction.

Figure 8:
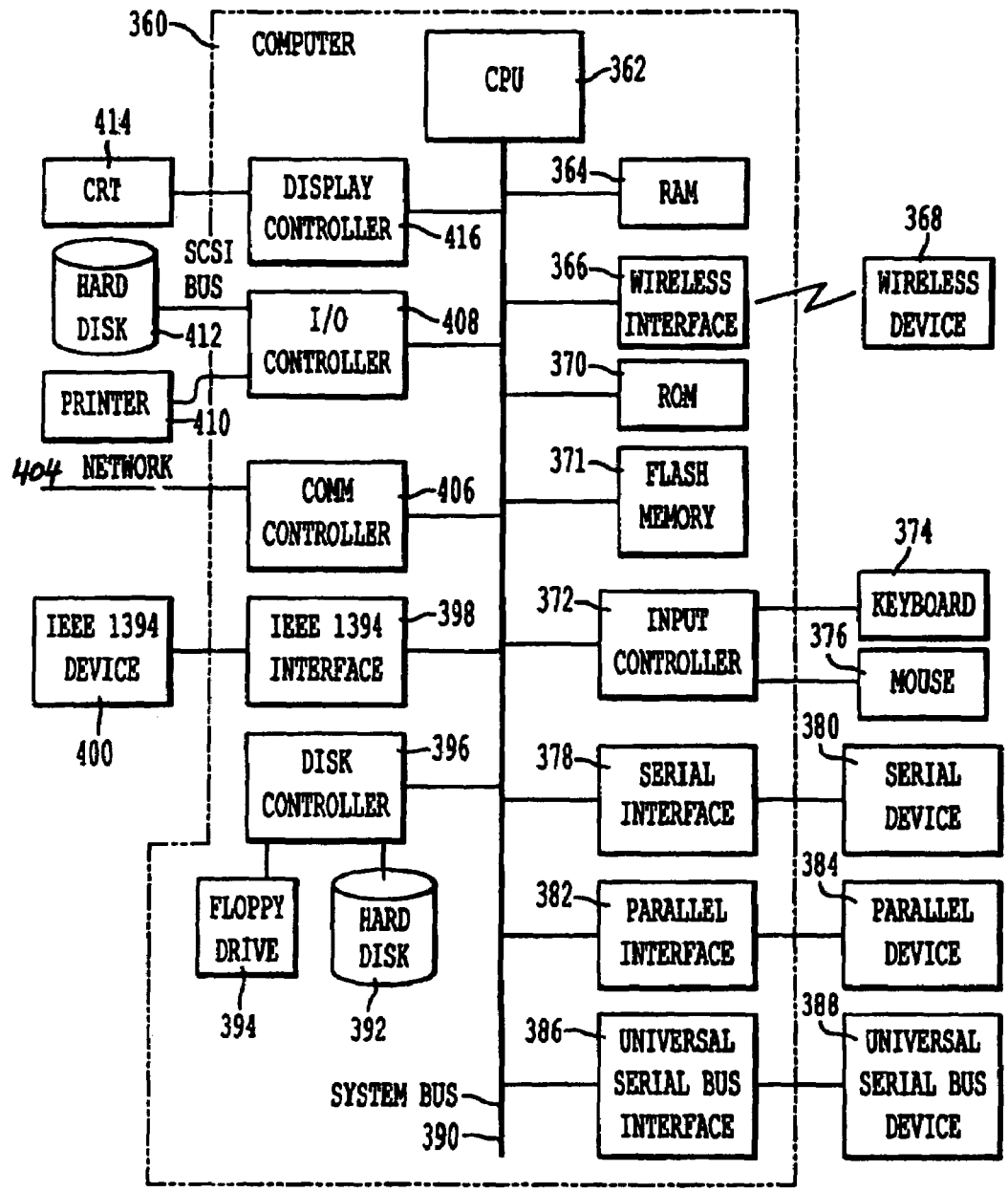
FIG. 8 illustrates an exemplary computer which may be connected to an appliance/device and used to communicate electronic mail messages.

The various computers used in the present invention, including the computers 266 and 276 of FIG. 5, may be implemented as illustrated in FIG. 8. Further, any other computer used in this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 that communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

Computer 360 includes a ROM 370 and a flash memory 371, although any other type of non-volatile memory (e.g., Erasable Programmable ROM, or an EEPROM) may be used in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. A system bus 390 connects the various elements of the computer 360. A disk controller 396 is connected to a floppy disk drive 394 and a hard disk drive 392. A communication controller 406 allows the computer 360 to communicate with other computers (e.g., by sending e-mail messages) over a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
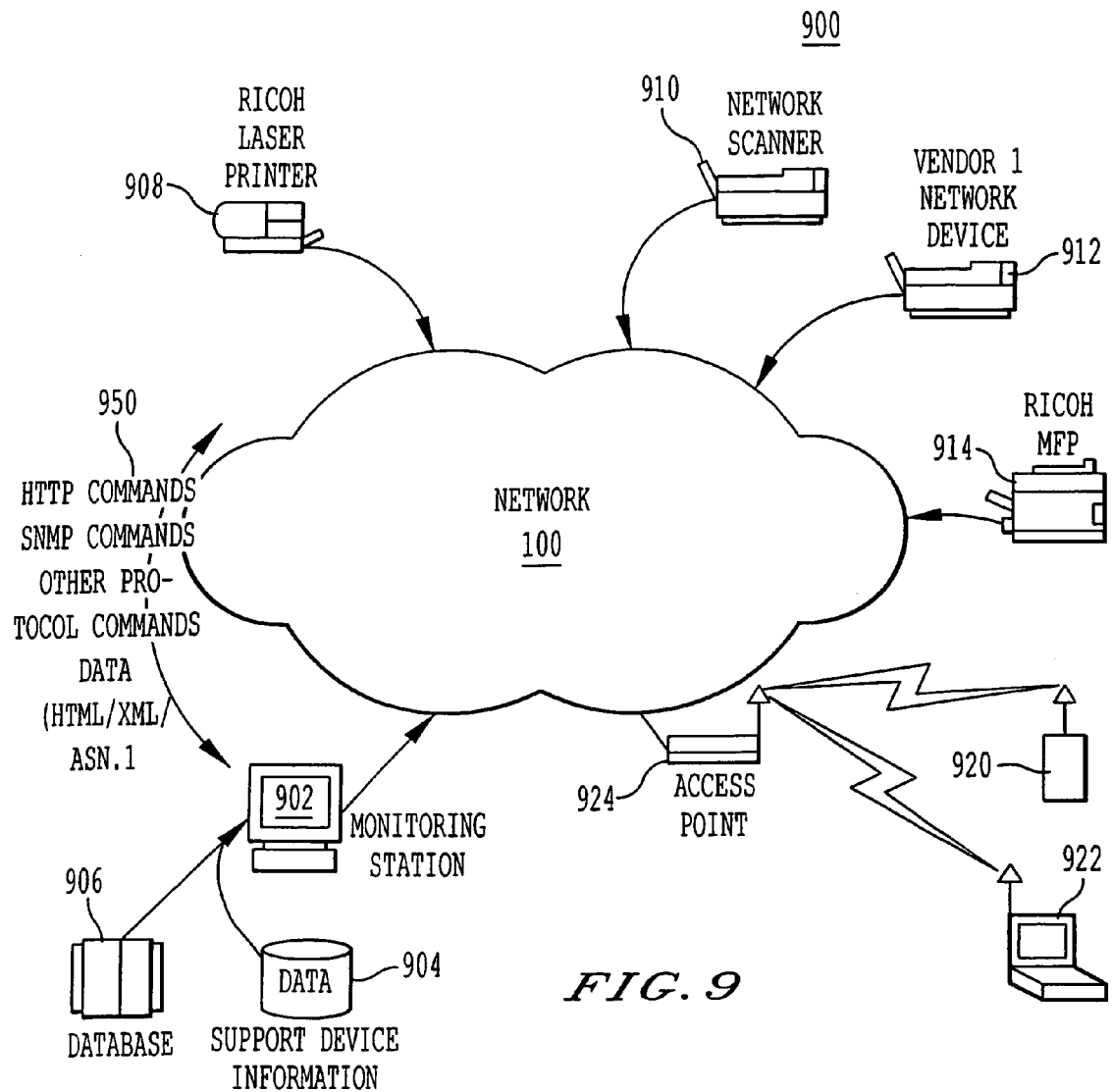
FIG. 9 is a schematic representation of the overall system in accordance with an exemplary embodiment of the present invention.

Referring now to FIG. 9, there is shown a schematic representation of the overall system 900 in accordance with an exemplary embodiment of the present invention. System 900 is shown to include a plurality of devices, for example, a laser printer 908, a scanner 910, a network device 912, and a multi-function printer 914, all connected to a network 100. These plurality of devices are generally referred to herein as "monitored devices." The system 900 also includes a workstation/monitoring system 902 (hereinafter referred to as a controller 902), connected to the network 100 for monitoring and controlling the monitored devices 908, 910, 912, and 914. Each of the monitored devices 908, 910, 912, and 914 are given a unique address. For example, an IP address assigned to a device serves as a unique address for the device. Thus, a user at controller 902 is able to access a respective device among the monitored devices 908-914 by accessing the unique IP address assigned to the respective monitored device. It will be appreciated that the present invention is not limited to using IP addresses to uniquely identify devices connected to a network.

The controller 902, upon accessing a device among the monitored devices 908-914, obtains various information through SNMP or/and HTTP protocols. Such information includes detailed information about the operational status of the device including troubleshooting information. For example, controller 902 accesses and obtains the jam location of a particular device and sends a message to the person in charge of the device to clear the jam. The operational status/details of the laser printer 908 include such details as toner level, indication of paper jam, quantity of print paper in printer trays, etc.

It will be appreciated that the controller 902 may be either physically connected or wirelessly coupled to the network 100. For example, a personal digital assistant (PDA) 920 or a laptop computer 922, shown to be wirelessly coupled to the network 100, may also be used as a controller 902. An access point 924 acts as an interface to enable wireless communications between the network 100 and PDA 922 or laptop computer 922. Henceforth, the present invention will be described with the assumption that the controller 902 will be controlling and monitoring the status of the monitored devices connected to the network.

The network 100 facilitates communication between the controller 902 and the monitored devices 908-914 to enable monitoring and control of such monitored devices. The number of devices that are connected to the network is not limiting of the present invention. It will be appreciated that the network 100 may be a local area network (LAN) or a wide area network (WAN). Likewise, the monitored devices 908, 910, 912, and 914 are shown to be merely exemplary.

The controller 902 is communicatively coupled to a storage device 904 and a database 906. The storage device 904 includes a hard disk, optical disk, and/or an external disk drive. The database 906 is communicatively linked to the storage device 904, and includes a Relational Database Management System (RDBMS) for easy search and retrieval of data stored in the storage device 904. The storage device 904 preferably stores detailed information about each of the monitored devices 908-914. For example, detailed information, such as the make, model, and various functions and trouble-shooting details of the laser printer 908 are stored in the storage device 904. Also, deviation values about the operational status of the laser printer compared to predetermined reference values may also be stored in the storage device 904. Although the database 906 and the storage device 904 are described to be communicatively coupled to the controller 902, it will be appreciated that the controller 902 may be built with the storage device and the database installed therein. In such a case, the storage device 906 and the database 904 would be depicted as being internal to the controller 902.

The controller 902 is installed with software in order to facilitate monitoring and control of the plurality, of devices 908-914. Simple Network Management Protocol (SNMP), File Transfer Protocol (FTP) and Hyper Text Transfer Protocol (HTTP) are used by the controller 902 for monitoring the plurality of devices 908-914 and the data received from the plurality of devices 908-914 is presented in the form of ASN.1 Binary format or HTML or XML formats, as shown in 950.

Although FIG. 9 illustrates only the imaging devices, the network for communicating information between the monitoring device and the plurality of monitored devices may include the home network where the appliances and meters are connected to the network. It will be appreciated that data collected by the controller/workstation 902 can be sent through e-mail, FTP, or any other communication protocol means to a remote device for further processing. Though the workstation 902, PDA 920, or the laptop 922 can be the controller that collects the data and stores the data or sends the data through a communication protocol, it will be appreciated that the controller can be any of the devices connected to the network. Any of the network devices (e.g. printers) can contain the monitoring system capable of monitoring the status of other devices in the network, storing the collected data and/or sending the collected data through any other communication protocol means (e.g., e-mail, FTP). The Xerox Document 4025 and HP LaserJet 9000 are both capable of sending e-mail.

Monitoring System Architecture

Figure 10:
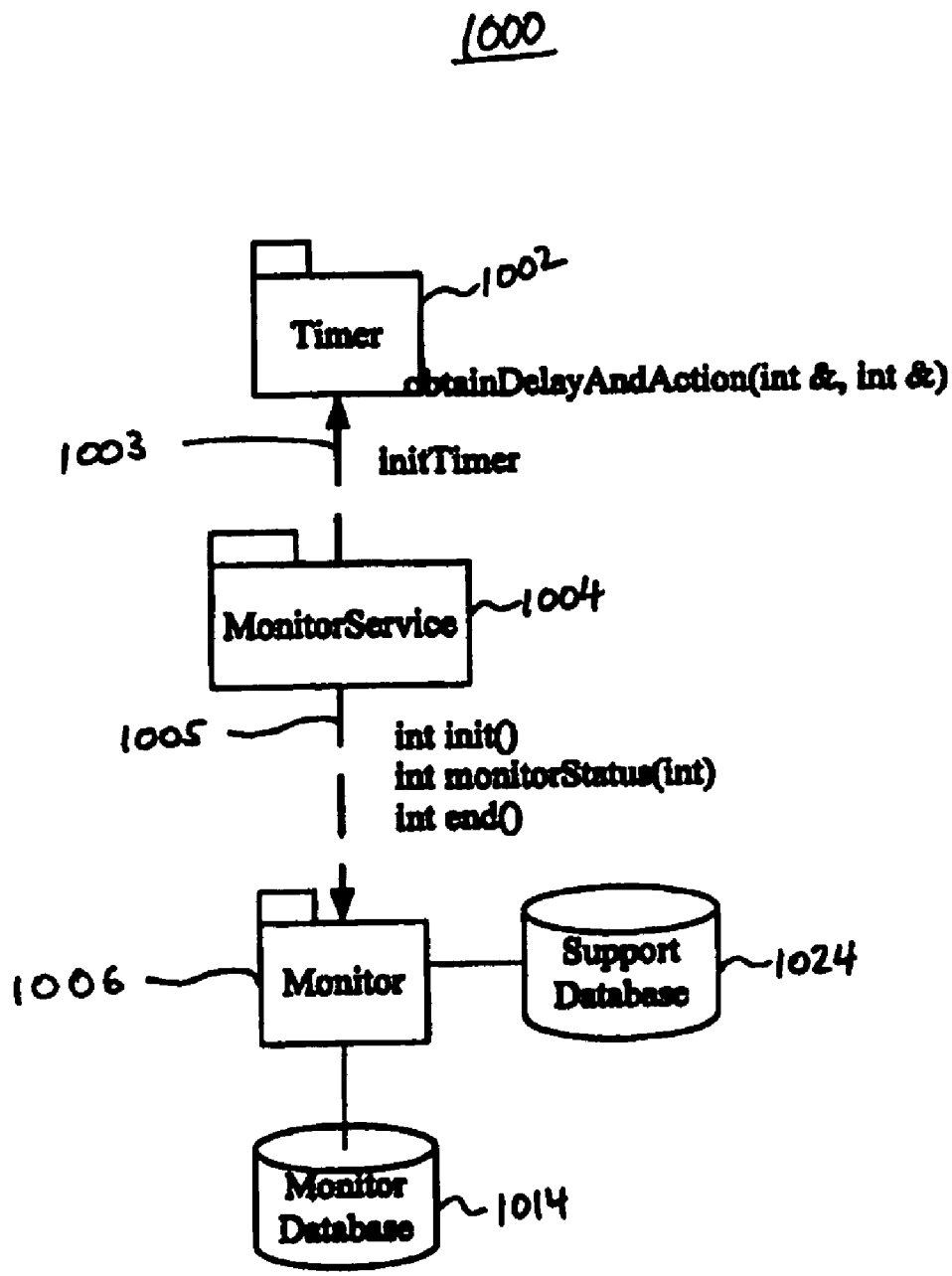
FIG. 10 illustrates modules used in the monitoring of the data and their interface functions in accordance with an exemplary embodiment of the present invention.
Figure 13:
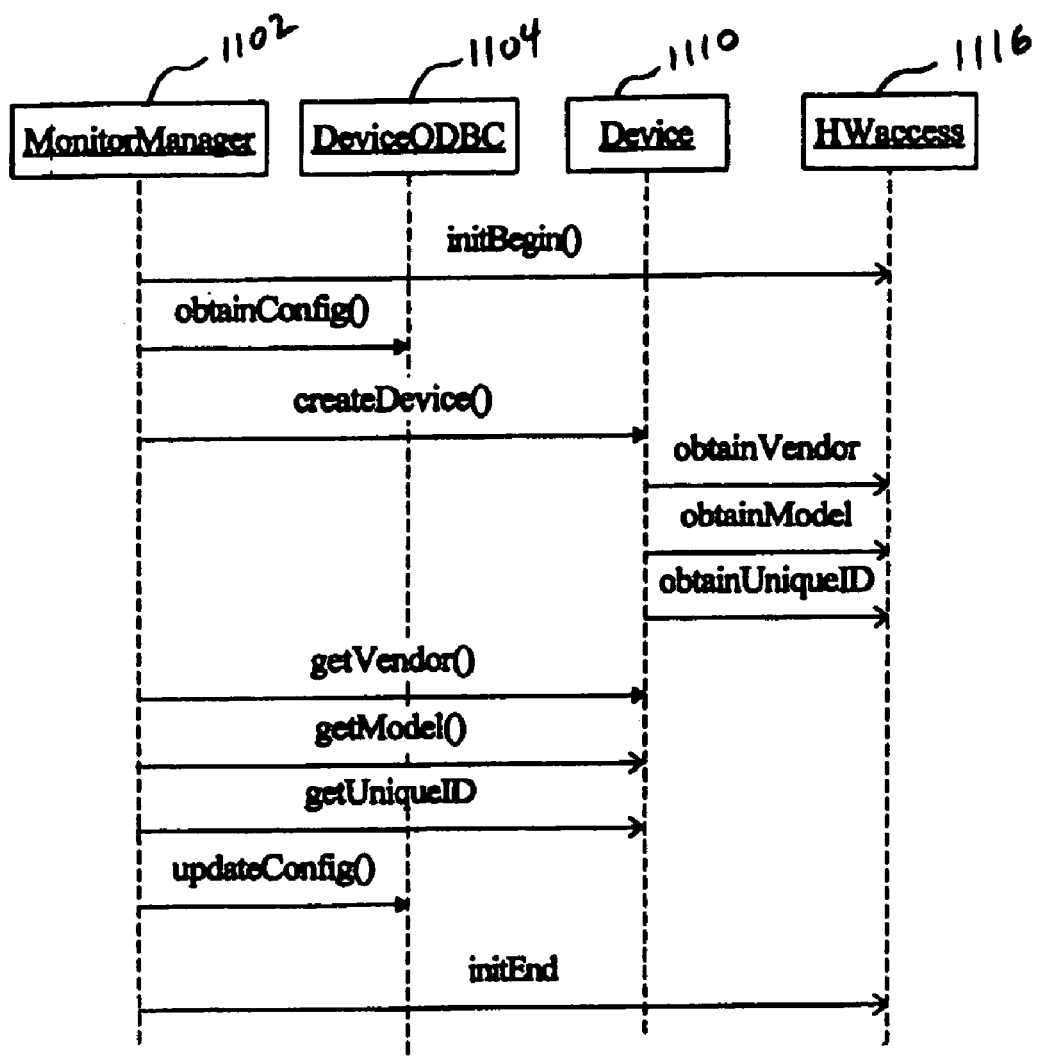
FIG. 13 shows the sequence of the init function of the Monitor module illustrated in FIG. 10.

FIG. 10 illustrates a monitoring system 1000 (and associated interface functions) used in the monitoring of data associated with remote devices according to an exemplary embodiment of the present invention. The monitoring system 1000 includes the software module MonitorService 1004, which is a computer resident program such as Service in NT or Windows 2000, and Daemon in Unix. In a preferred embodiment, the monitoring system is implemented using an objected-oriented software environment. Also included in the monitoring system 1000 are a Timer module 1002 and Monitor module 1006. Timer module 1002 and Monitor module 1006 are library functions to be called by the MonitorService module 1004. For example, MonitorService 1004 initializes the Timer module 1002 by calling the InitTimer 1003 function and obtains delay and action parameters by calling obtainDelayAndAction (int &, int &) function. The init( ) function is also called by the MonitorService module 1004 to initialize various modules in the Monitor module 1006, as illustrated in FIG. 13. The init( ) function can be used to obtain the IP address and parameter value assigned to a monitored device through an external source containing IP addresses, parameter names and values collected through known methods. The Monitor module 1006 is communicatively coupled to a support database 1024 and to a monitor database 1014, which are described in more detail below.

Once the IP address of a monitored device is obtained, the IP address is used by the monitoring system to contact the monitored device to obtain information such as, manufacturer (vendor) and model information. Some of the functions executed by the monitoring system 1000 include:

void initTimer(void)

This function initializes the Timer. In particular, this function triggers the Timer object to get the timing information from the registry.

void obtainDelayAndAction(int & out_nDelay, int & out_nAction)

This function returns the delay time in seconds for ::Sleep function (need to multiply 1000) and the action indicator. The action indicator is defined as follows: 0=event checking; 1=sending the monitored data; and 2=monitoring and storing the data into the local database.

int init(void)

This function initializes the Monitor. In addition, it creates the devices to be monitored. The return int is the error code in which zero is defined as no error.

int monitorStatus(int in_nAction)

This function monitors the preset information. The return int is the error code in which zero is defined as no error.

int end(void)

This function cleans up the Monitor before closing the objects. The return int is the error code in which zero is defined as no error.

Monitor Module

Figure 11:
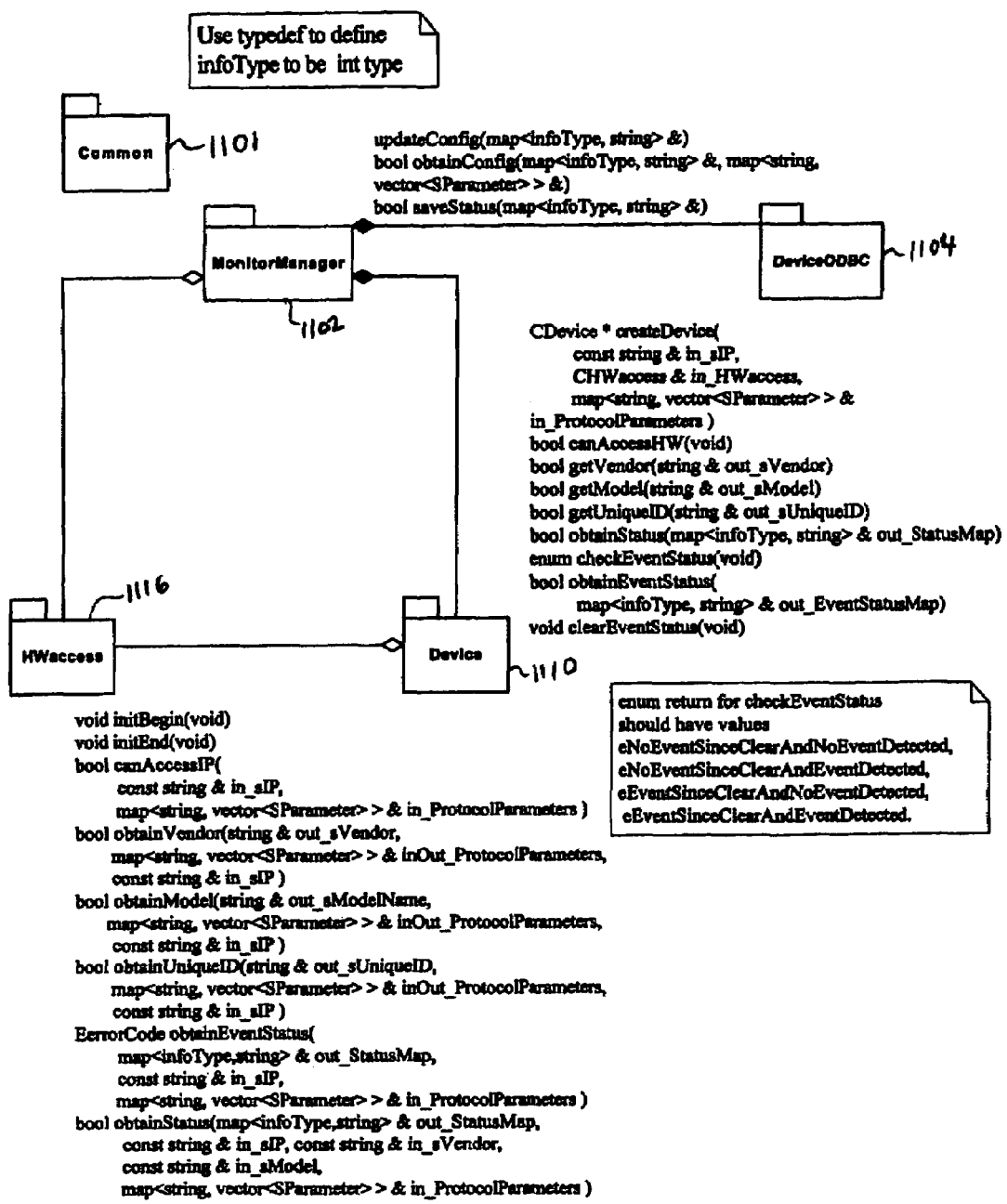
FIG. 11 shows details within the Monitor module and their calling functions between the sub-modules.

FIG. 11 shows the structural details of the Monitor module 1006, including the various software sub-modules, and the calling functions between the sub-modules of the Monitor module 1006. The Monitor module 1006 includes a Common module 1101 that contains classes used by many modules, a MonitorManager module 1102 that manages the other sub-modules (including the DeviceODBC module 1104, the Device module 1110, and the HWaccess module 1116) to complete the tasks defined by interface functions as illustrated in FIG. 10. Specifically, the DeviceODBC module 1104 is accessed in order to access external device information through the standard interface. The HWaccess module 1116 obtains vendor, model, unique ID, and status information from the monitored devices using a selected communication protocol from among a plurality of communication protocols (e.g., HTTP, SNMP, and FTP). Each of the Monitor software modules will be described in more detail below.

The following is a partial listing and description of the interfaces among the Monitor modules discussed above. For example, some modules may need to have "init" functions or additional functions in order to obtain the information in convenient formats.

void updateConfig(std::map<into Type, std::string>&)

Before this function is called, the calling function is preferred not to replace the vendor and model entries if obtain functions return a null string. This function updates the device information database of the current record in the DeviceODBC 1104. This function is most efficient when the ObtainConfig below is called initially. First, this function checks if the IP address is the same at the DeviceODBC 1104. If the IP address fields are not the same, the record with the correct IP address is obtained from the database. Then, the other fields are copied and the record is updated.

bool obtainConfig(std::map<infoType, std::string>&, std::map<std::string, std::vector<SParameter>>&)

This function obtains the map from DeviceODBC 1104 for the device information in the given format and the map of protocols and associated parameters. The function returns true if there is data returned, false if there is no more data.

bool saveStatus(std::map<infoType, std::string>&)

This function saves the status information into the Device-ODBC 1104. The function returns true when saving is successful, false otherwise.

CDevice*createDevice(const std::string & in_sIP, CHWaccess & in_HWaccess, std::map<std::string, std::vector<SParameter>>& in_ProtocolParameters)

This function creates the device based upon in_sIP and in_ProtocolParameters. The created device is connected to the hardware through CHWaccess. If the device can not be created, the function returns 0. Therefore, the calling object should check if the return object pointer is 0 or not.

bool canAccessHW(void)

This function returns true when the hardware can be accessed through the network, false otherwise.

bool getVendor(std::string & out_sVendor)

This function returns the vendor name. If the device is not supported by the system, but it can be accessed through one of the protocols, the string shall contain "GENERIC." If the error is detected in the process, the function returns false with null string. Otherwise, the function returns true.

bool getModel(std::string & out_sModel)

This function gets the model of the device. If the model is obtained, the function returns true. If the error is detected in the process, the function returns false with null string.

bool getUniqueID(std::string & out_sUniqueID)

This function returns the unique ID of the device. If the Unique ID is obtained, the function returns true. If the error is detected in the process, the function returns false with null string.

bool obtainStatus(map<infoType, std::string>& out_StatusMap)

This function returns the status map. The function returns true when the status is returned, false when status could not be obtained. Note that this function returns the different maps from the HWaccess and Device modules. In the Device module, event status information is added to the map returned from HWaccess and is cleared.

enum checkEventStatus(void)

This function triggers to obtain the event of the network device. The enum type and values should be defined in the classes. The enum values should include values eNoEventSinceClearAndNoEventDetected, eNoEventSinceClearAndEventDetected, eEventSinceClearAndNoEventDetected, eEventSinceClearAndEventDetected.

bool obtainEventStatus(std::map<infoType, std::string>& out_EventStatusMap)

This function obtains event status information. The function returns true when the status is returned, false when status could not be obtained.

void clearEventStatus(void)

This function clears the event status accumulated since the last obtainStatus function call or clearEventStatus.

void initBegin(void)

This function starts the initialization process through HWaccess, in particular, to create the software device objects.

void initEnd(void)

This function ends the initialization process through HWaccess signifying that the device object creation is finished.

bool canAccessIP(const std::string & in_sIP, std::map<std::string, std::vector<SParameter>>& in_ProtocolParameters)

This function returns true when the device can be accessed at the IP address, false otherwise.

bool obtainVendor(std::string & out_sVendor, std::map<std::string, std::vector<SParameter>>& inOut_ProtocolParameters, const std::string & in_sIP)

This function obtains the Vendor. The function returns true if the operation is successful, false with the empty string otherwise. During this function call, the protocols are examined and if a particular protocol can not be used for status monitoring, the protocol shall be deleted from the inOut_ProtocolParameters.

bool obtainModel(std::string & out_sModelName, std::map<std::string, std::vector<SParameter>>& inOut_ProtocolParameters, const std::string & in_sIP)

This function obtains the Model name. The function returns true if the operation is successful, false with the empty string otherwise. During this function call, the protocols are examined, and if a particular protocol can not be used for status monitoring, the protocol shall be deleted from the inOut_ProtocolParameters.

obtainUniqueID(std::string & out_sUniqueID, std::map<std::string, std::vector<SParameter>>& inOut_ProtocolParameters, const std::string & in_sIP)

This function obtains the Unique ID. The function returns true if the operation is successful, false with the empty string otherwise. During this function call, the protocols are examined and if a particular protocol can not be used for status monitoring, the protocol shall be deleted from the inOut_ProtocolParameters.

EerrorCode obtainEventStatus(std::map<infoType, std::string>& out_StatusMap, const std::string & in_sIP, std::map<std::string, std::vector<SParameter>>& in_ProtocolParameters)

This function obtains the event status. The EerrorCode is defined below.

bool obtainStatus(std::map<infoType, std::string>& out_StatusMap, const std::string & in_sIP, const std::string & in_sVendor, const std::string & in_sModel, std::map<std::string, std::vector<SParameter>>& in_ProtocolParameters)

This function obtains the status of the device. The function returns true if the operation is successful, false with the empty map otherwise.

Figure 12:
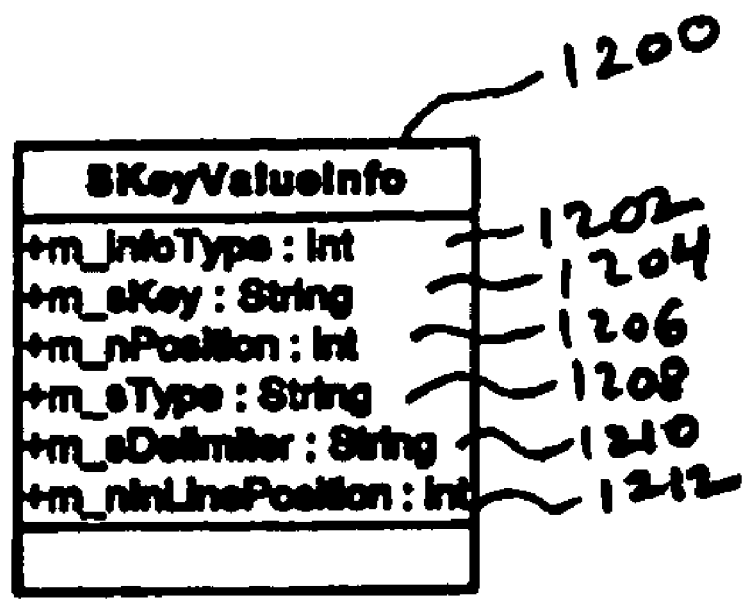
FIG. 12 shows a data structure used by HWaccess submodule as illustrated in FIG. 11.

FIG. 12 shows the data structure used by the HWaccess module 1116, as illustrated in FIG. 11, to exchange information for retrieval of values associated with key values received by the HWaccess module 1116. For example, the SKeyValueInfo data structure, as shown in FIG. 12, is used to determine how to obtain information corresponding to a particular information type (corresponding to m_infoType 1202) within a given web page. Typically, a multitude of vendors use vendor-specific identifiers and nomenclature to identify key information, displayed on their respective web pages, related to a monitored device. For example, to determine the number of pages printed by a printer device, Hewlett Packard uses the "Page Count" feature, while Xerox identifies the same using a "Total Sheet Delivered" feature. A feature of the present invention is to overcome the vendor-to-vendor variances and thereby provide a standardized and uniform method of identifying device-specific information and extract the value corresponding to the information by using a data structure/SKeyValueInfo structure 1200. The SKeyValueInfo data structure 1200 includes attributes that are public.

The SKeyValueInfo is typically a data structure created to identify value information from information that is received from a monitored device in the form of a data string or a key string. The SKeyValueInfo includes a plurality of fields, each field represented by information illustrated in FIG. 12. The SKeyValueInfo structure 1200 includes an m_sKey field 1204 that represents a string key, an m_nPosition field 1206, which is preferably a tag-based value indicating the number of positions in the string where value information could be located, and an m_nInLinePosition field 1212. For example, the Page Count of a printer device, subject to monitoring, may be found at a second position following a key word. m_sType 1208 represents the type of information one can retrieve from a displayed web page of a monitored device.

When the value, such as, for example, model name of the monitored device, is found within the same data line of the key (Product Name), the m_nPosition field is "0." m_sDelimiter 1210 indicates a specific delimiter used to extract the value associated with the key. The SKeyValueInfo data structure indicates how to extract the value information from information received from a monitored device in an HTML format.

FIG. 13 shows the sequence of the init( ) function to describe the calling sequence of Monitor module 1006 as illustrated in FIG. 10. The MonitorManager 1102 initializes the HWaccess module 1116 to start the initialization function. Subsequently, the MonitorManager 1102 obtains information about a monitored device and uses an IP address assigned to the monitored device to communicate with the monitored device. The MonitorManager 1102 accesses DeviceODBC 1104 to obtain configuration information of the monitored device. The configuration information returned to the MonitorManager 1102 includes, for example, an IP address of the monitored device, parameter names and associated values for each protocol, and vendor/manufacturer and model information of the monitored device. Once the IP address is obtained, the MonitorManager 1102 sets the IP address, parameter names and associated values for each protocol, to create a software object based on class structure of the Device module 1110 through the CDeviceFactory class 1302 of FIG. 35. When the device software object is successfully created, the HWaccess module 1116 is used to obtain Vendor, Model, and Unique ID from the monitored device to be stored in the created device software object.

Figure 24:
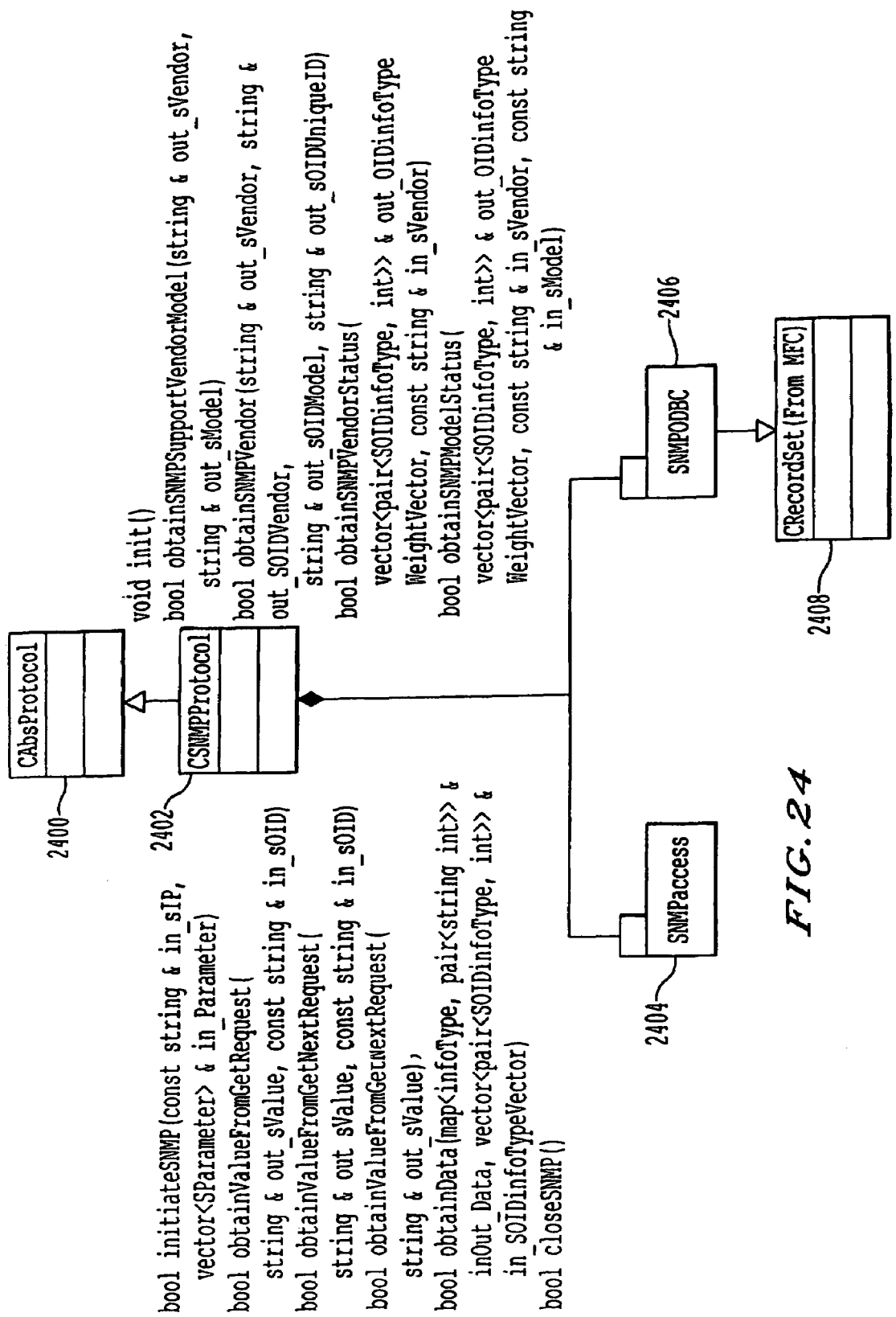
FIG. 24 illustrates the class structure of the SNMP module according to the present invention.
Figure 25:
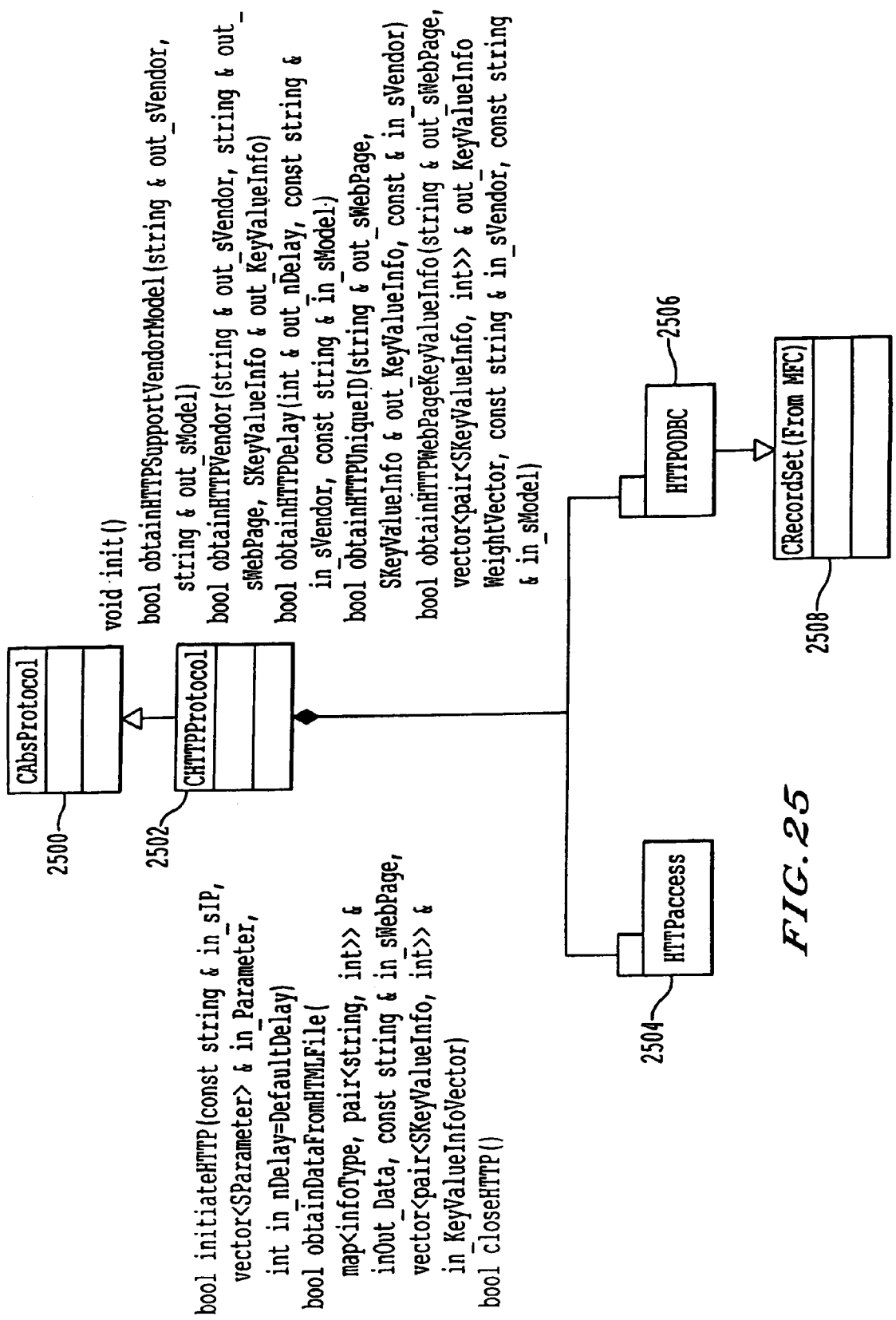
FIG. 25 illustrates the class structure of the HTTP module according to the present invention.
Figure 26:
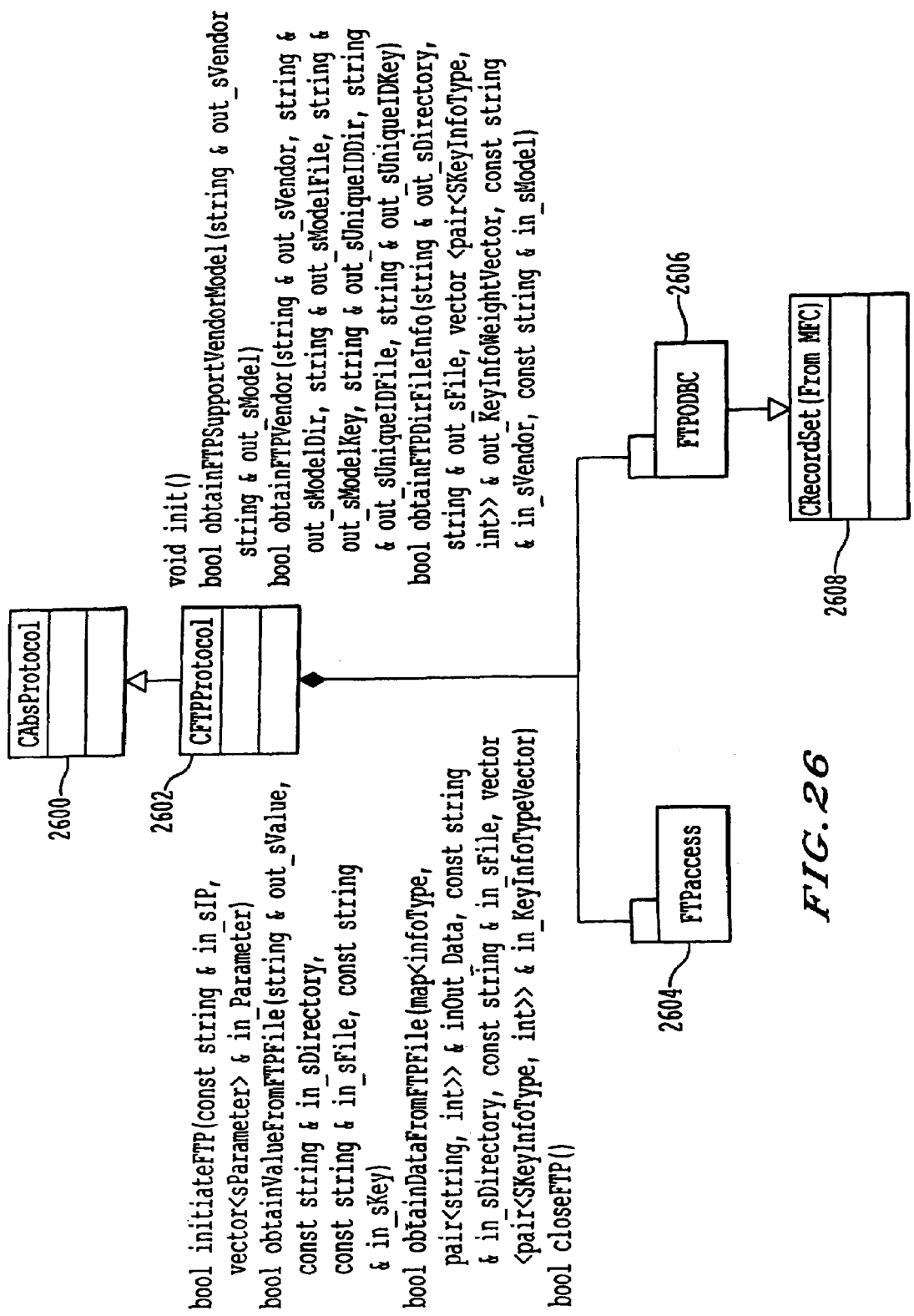
FIG. 26 illustrates the class structure of the FTP module according to the present invention.

Once the vendor, model information, and unique ID are obtained from the device software object, the MonitorManager 1102 updates the database (for example, DeviceODBC 1104) with information received from the monitored device. Although FIG. 13 shows one device, the steps from obtainConfig to updateConfig are repeated to cover all the devices specified in the external source. In addition, each protocol specified in FIGS. 23, 24, 25, and 26 is initialized. The database tables corresponding to ODBC in the FIGS. 24, 25, and 26 are accessed and necessary information for accessed devices are transferred from the external storage to the internal data structure so that the status information collection from the accessed devices is faster.

Figure 14:
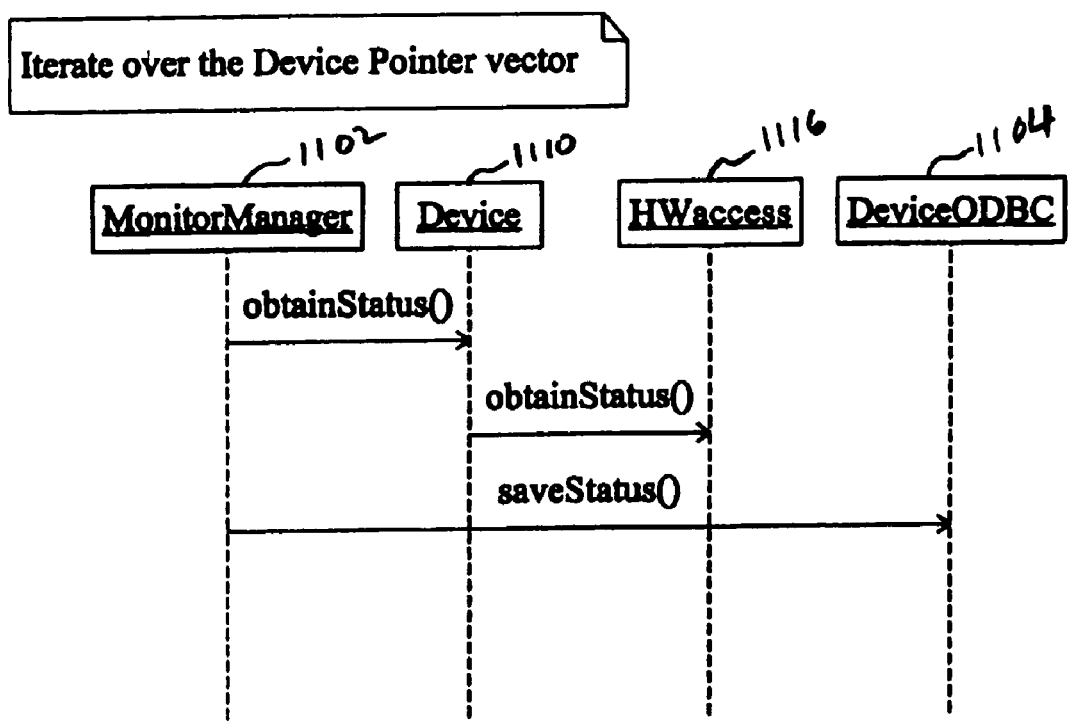
FIG. 14 shows an exemplary sequence of the status monitor function to determine the status of a monitored device by the MonitorManager, as shown in FIG. 11.

FIG. 14 shows the sequence of the status monitor function to determine the status of a monitored device by the MonitorManager module 1102, as illustrated in FIG. 11. When the obtainStatus function is issued from Device to HWaccess, the CHWaccess class in turn issues an obtainStatus function call to each protocol described in FIGS. 23 24, 25, and 26 through the abstract class, with different parameters, as described below. Each protocol module has already cached information necessary to extract the status information from the monitored devices, which have already been accessed once during the initialization time described in FIG. 13. Therefore, the status information can be quickly extracted from the monitored devices without accessing the external source during the status monitoring. This process is repeated over all the monitored devices stored in the vector as shown in FIG. 15.

Figure 15:
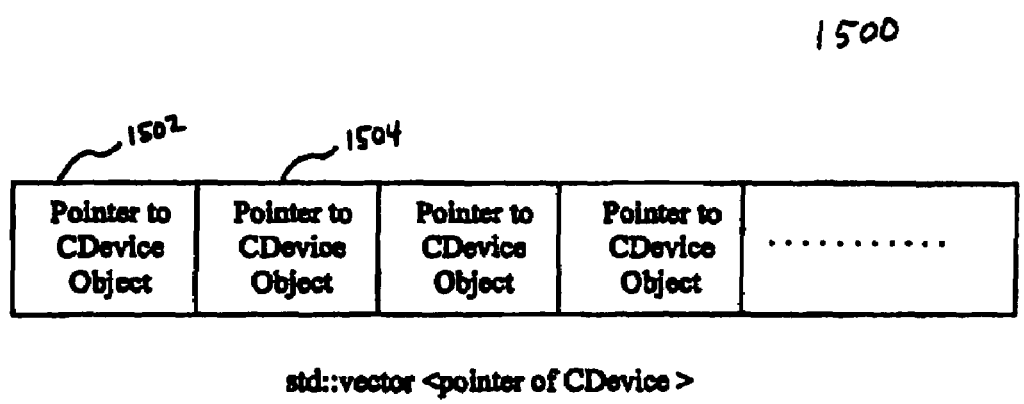
FIG. 15 shows a vector of the reference to the devices created by CDeviceFactory and used by the MonitorManager, as illustrated in FIG. 13.
Figure 35:
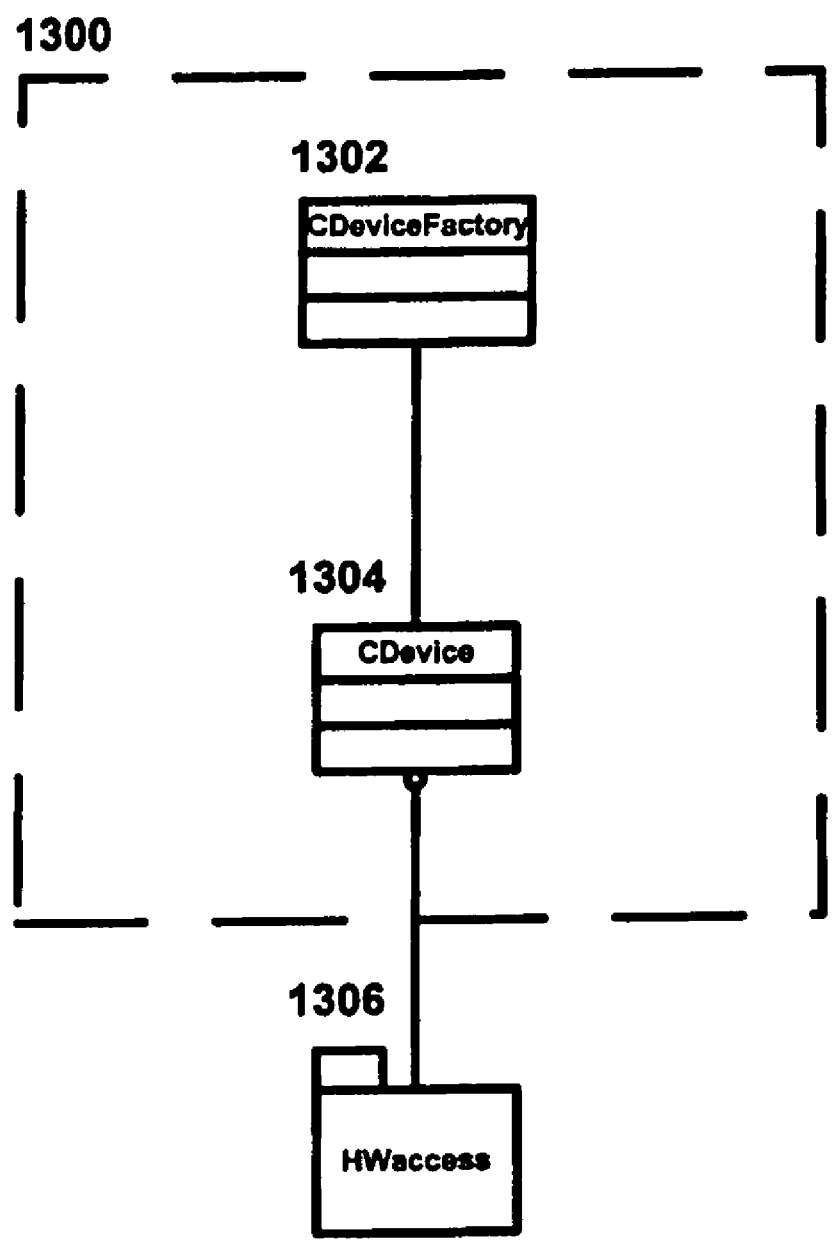
FIG. 35 shows the class structure of the Device module according to the present invention.

Referring to FIG. 15, there is shown a vector 1500 having reference to the devices created by the CDeviceFactory 1302 of FIG. 35 and used by the MonitorManager 1102, as illustrated in FIGS. 13 and 14. MonitorManager 1102 stores device pointers, such as for example, Pointer to CDevice Object 1502, and Pointer to CDevice Object 1504 created by CDeviceFactory 1302 of FIG. 35, in the vector. The vector sequence is iterated to obtain the status of a monitored device. Polling of monitored devices is performed over the device object by issuing an obtainStatus command. Once the status of each of the software objects is obtained, such status is updated through the DeviceODBC 1104. The status monitor sequence was described above at FIG. 14, and will not be repeated herein.

The DeviceInfo structure shown in Table I illustrates the information regarding one example monitored device. The DeviceInfo structure includes the e-mail address of the contact person, in addition to the telephone number.

TABLE 1

| Type | Name | Description |
| --- | --- | --- |
| std::string | m_sVendor | A string representing the vendor of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEmailAddress | A string representing the e-mail address of the contact person. |

Monitor Database

Figure 19:
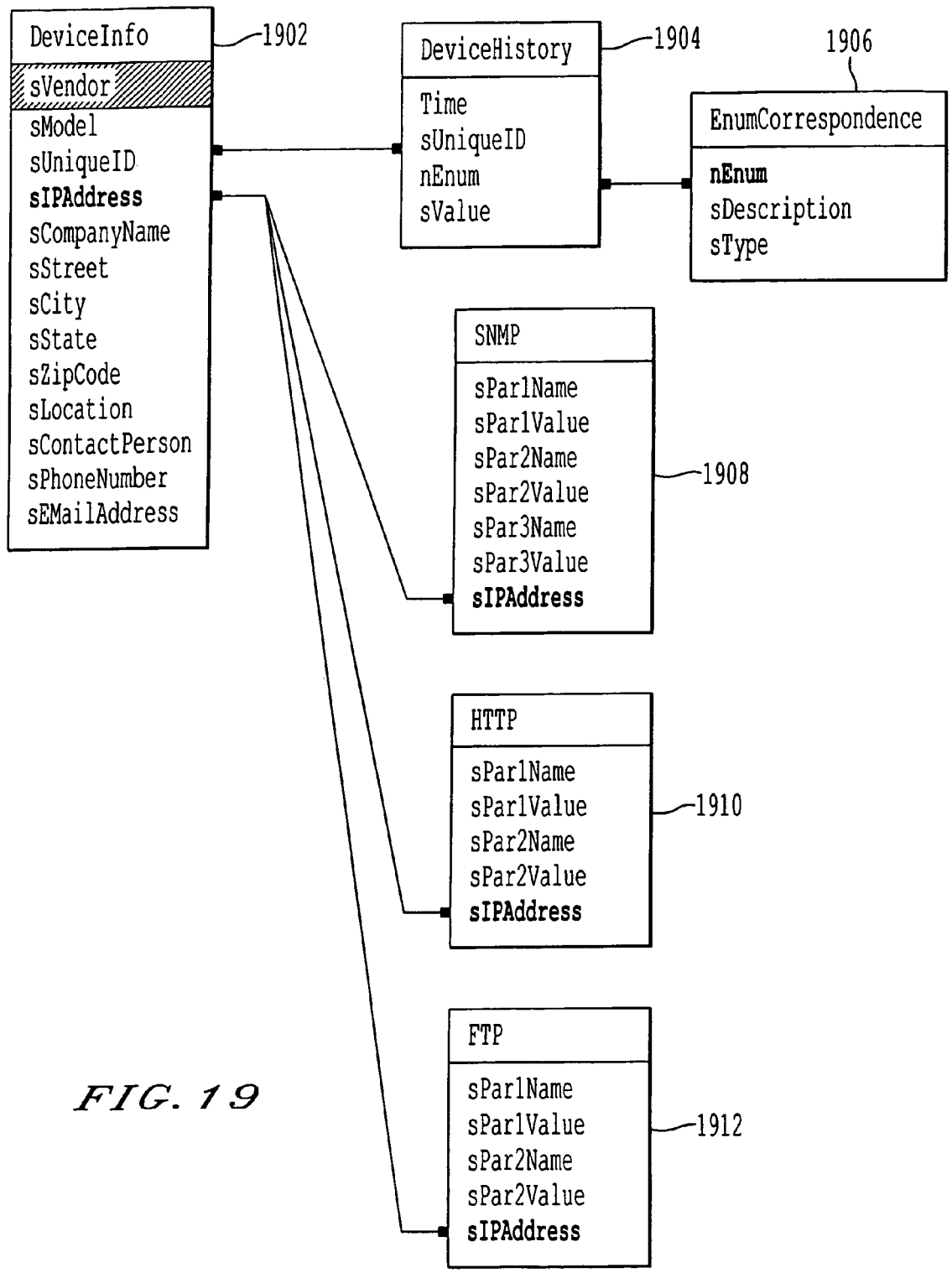
FIG. 19 illustrates the organization of the monitor database used in the present invention.

FIG. 19 illustrates the organization of the monitor database, which includes the device information for each monitored device (see also Table I). As shown in FIG. 19, a set of parameters, one set for each communication protocol (e.g., SNMP, HTTP, and FTP), is associated with the device information DeviceInfo 1902 for each monitored device. Moreover, each set of parameters for a particular protocol (e.g., SNMP 1908, HTTP 1910, and FTP 1912) is organized as a list of parameter name and value pairs, e.g., sPar1Name and sPar1Value. Note that the number of parameters for each protocol may be shorter or longer than the number shown in FIG. 19. For example, a username and password may be stored as FTP parameters, while a community name and a password may be stored as SNMP parameters for a given monitored device. As shown in FIG. 19, the monitor database also includes information related to the DeviceHistory 1904 and the EnumCorrespondence 1906.

Figure 17:
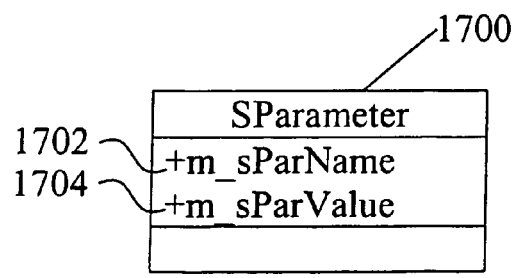
FIG. 17 illustrates the SParameter data structure used to store parameter values necessary to access monitored devices according to the present invention.

FIG. 17 illustrates the SParameter data structure 1700 used to pass the parameters used by the various communication protocols. SParameter includes two fields: m_sParName 1702 and m_sParValue 1704, which represent the name and value of the parameter, respectively.

Figure 18:
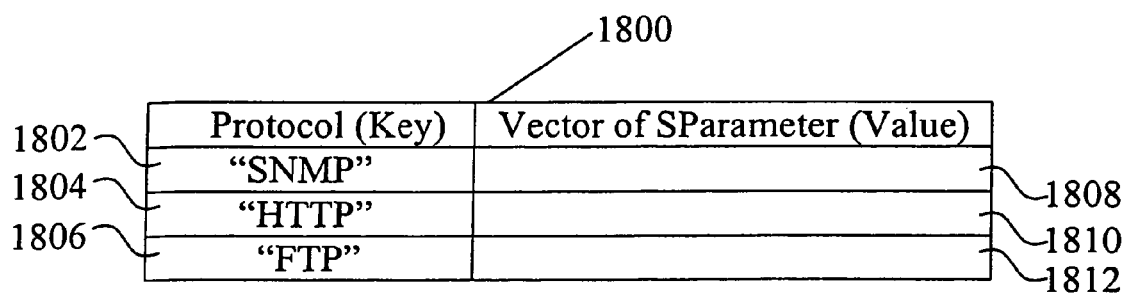
FIG. 18 illustrates a map structure used to store parameter values necessary to access monitored devices according to the present invention.

FIG. 18 illustrates the map structure 1800 used to pass a vector of parameters for each protocol obtained from the monitor database to a software object associated with each monitored device. The map structure 1800 associates each protocol/key field 1802, 1804, and 1806, with a corresponding vector of parameters 1808, 1810, and 1812, respectively, arranged according to the SParameter format shown in FIG. 17. For example, for the SNMP protocol 1802, the vector of parameters 1808 may include a list of parameter name, parameter value pairs that are used to access the monitored device with the SNMP protocol. For example, the SNMP parameter names stored in the vector 1808 might include "Community Name" and "Password", together with the corresponding parameter values. Note, however, that the organization of the map structure 1800 allows for any number of protocols and associated parameter vectors, and is not limited to the SNMP, HTTP, and FTP protocols shown in FIG. 18.

Support Database

Figure 20:
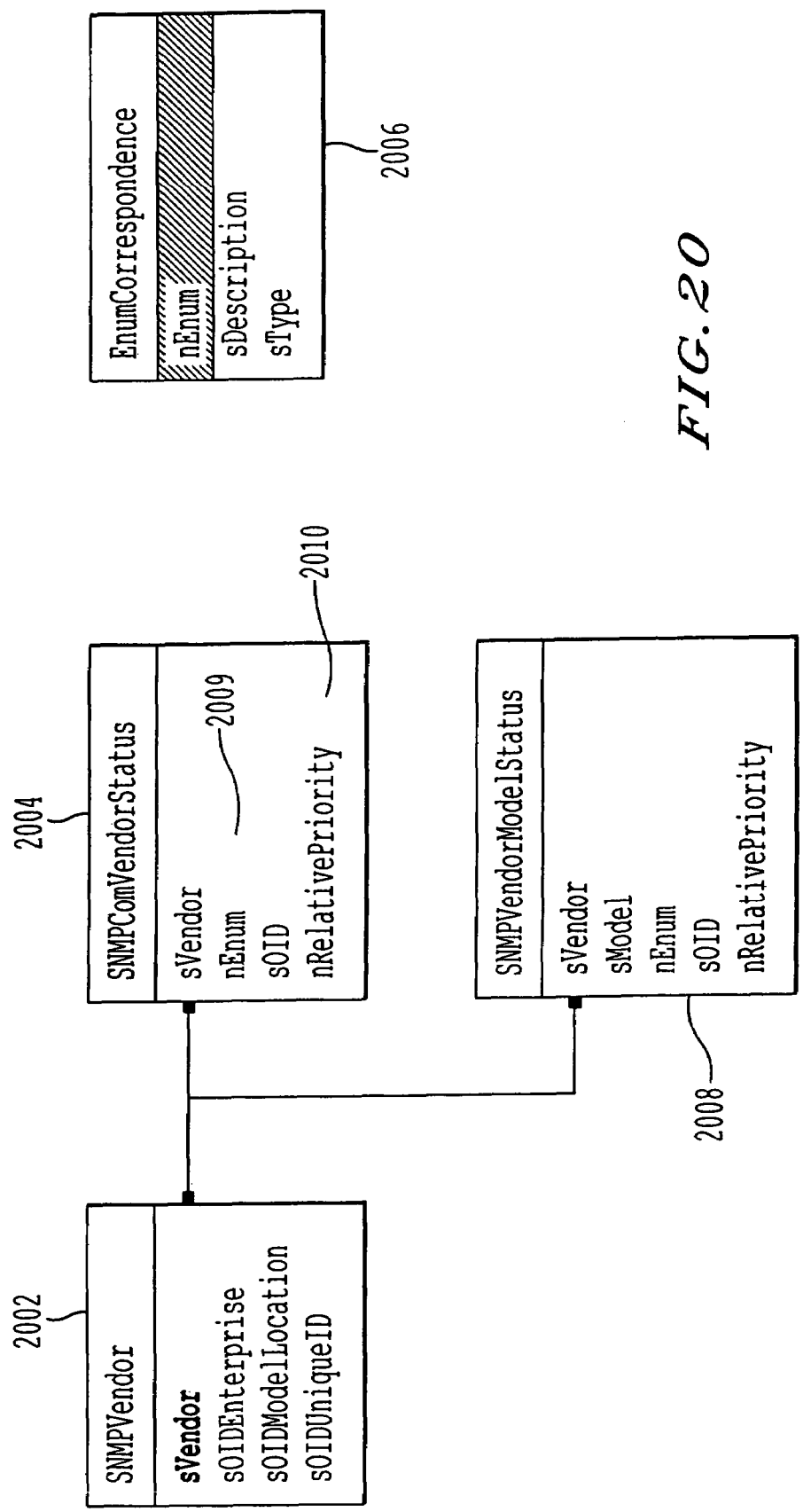
FIGS. 20-22 illustrate the organization of a support database arranged according to communication protocol according to the present invention.
Figure 21:
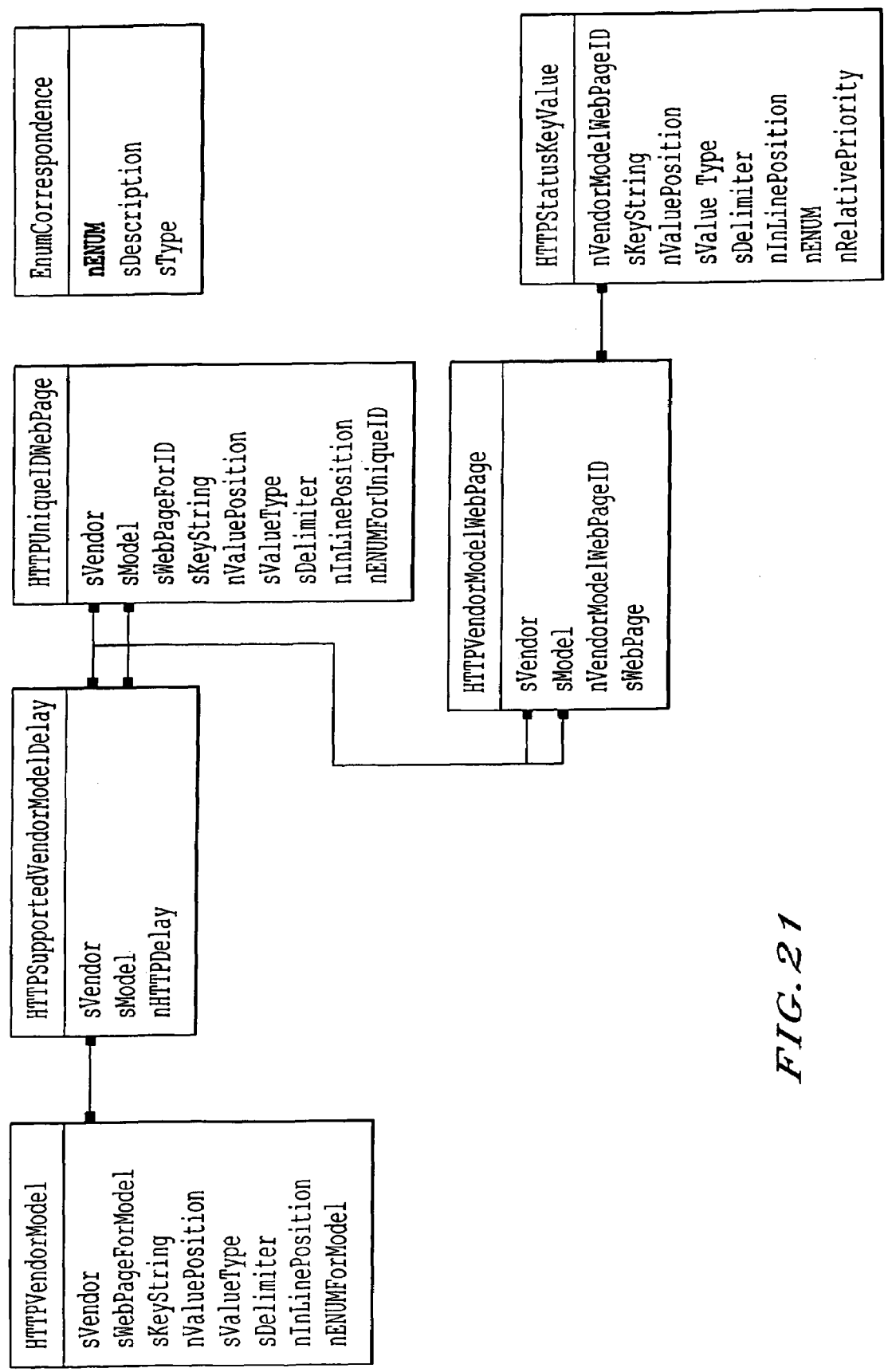
Figure 22:
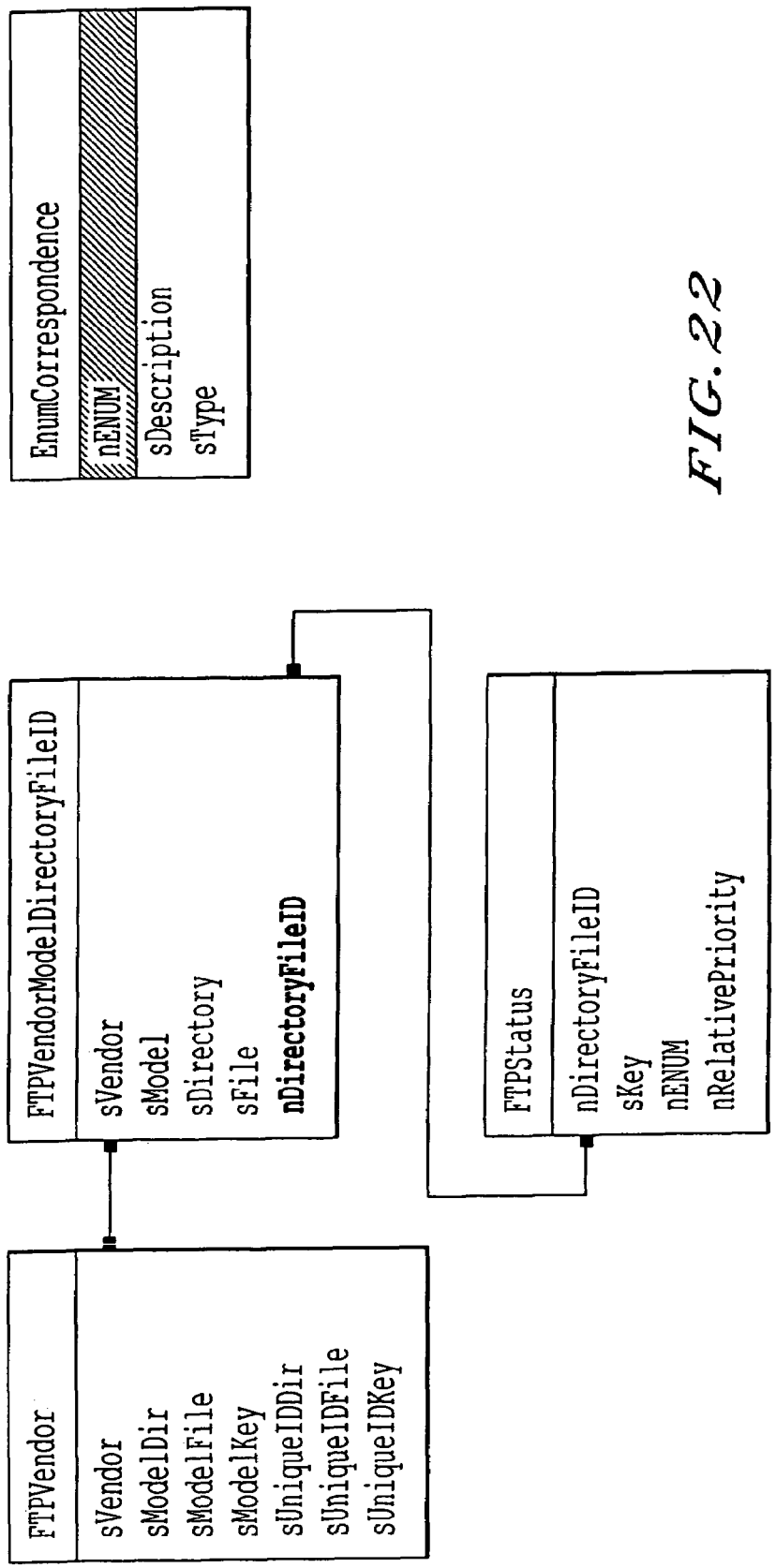

FIGS. 20-22 illustrate the organization of the support database 1024 shown in FIG. 10. The support database, which includes information necessary to extract status information from each monitored device, is organized by communication protocol. For example, FIG. 20, which illustrates the organization of the support database for SNMP-related support information used to extract information from a monitored device, includes SNMPVendor 2002, SNMPComVendorStatus 2004, EnumCorrespondence 2006, and SNMPVendorModelStatus 2008 data structures. A given data structure in the support database may include parameters that uniquely identify the type of status information to be extracted, along with parameters that control the extraction. For example, the SNMPComVendorStatus data structure 2004 include an nENUM field 2009, which identifies the type of information to be extracted (e.g., toner level), and an nRelativePriority field 2010, which indicates the weight or importance of the extracted information relative to other protocols. Thus, if the same information may be extracted from the monitored device using more than one protocol, the nRelativePriority value gives a relative indication of which protocol's extracted value should be used. For example, if HTTP is only able to extract information indicating whether the toner level is "high" or "low" while the SNMP protocol is able to extract the percentage level of toner remaining, the priority level for the toner level for SNMP would be higher than the corresponding value for HTTP. In addition, the support database may provide default priority values for an entire protocol. In one embodiment, the SNMP protocol is given a priority value of 10,000 in a system in which protocol values may range from 0 to 32,000.

FIGS. 21 and 22 illustrate the data structures included in the HTTP and FTP portions of the support database 1024 and includes data structures analogous to the data structures described above with regard to FIG. 20

Exemplary enum types used by the present invention is the infoType defined below. (The enum types are merely exemplary and therefore should not be construed as limiting the present invention.)

infoType (typedef int infoType)

This section describes the definition of the infoType (int). The value range 0 through 99 is assigned to the data type. The value range 100 to 499 is assigned to Device Information. The value range 500 to 1999 is assigned to the common parameters including standard MIB parameters. The range 2000 to 3999 is assigned to Ricoh-specific information. The range 4000 to 4999 is assigned to Xerox. The range 5000 to 5999 is assigned to Lexmark. The range 6000 to 6999 is assigned to HP. The values are defined as follows:

infoType {eNotDefine=0, eDeviceInformation=1, eStatusInformation=2, eVendor=100, eModel, eUniqueID, eIPAddress, eCompanyName, eStreet, eCity, eState, eZipCode, eLocation, eContactPerson, ePhoneNumber, eEMailAddress, eDateTime=500, eHrDeviceErrors, eLowPaper, eNoPaper, eLowToner, eNoToner, eDoorOpen, ejammed, eOffline, eServiceRequested, ePrtGeneralConfigChanges=600, ePrtLifeCount, ePrtAlertDesc1, ePrtAlertDesc2, ePrtAlertDesc3, ePrtAlertDesc4, ePrtAlertDesc5, eBlack=700, eMagenta, eCyan, eYellow, eTonerCollector=800, eBlackDeveloper=810, eColorDeveloper, eFuser=820, eDrum=830, eTransfer=840, eMaintenanceKit=850, eOilKit=860, eStationInfo=901, eStationInfo2, eStationIInfo3, eStationInfo4, eStationInfo5, eRicohEngineCounterTotal=2000, eRicohEngineCounterPrinter, eRicohEngineCounterFax, eRicohEngineCounterCopier}.

EerrorCode

The following codes are merely exemplary, and more codes may be added to the existing set. The range 0 -99 is reserved. The range 100-199 is for SMTP, 200-299 is for POP3, 300-399 is for Socket, and 400-499 is for HTTP, and 500-599 is for FTP. Other ranges not specified may be defined by a user, if needed.

enum EerrorCode(eNoError=0, eUnknownError=1, eSomeError, eCompleteFailure, eSomeDeviceCreationError=20, eCreateDeviceError, eNoDeviceCreated, eObtainConfigError, eSaveStatusError, eObtainUniqueIDError, eObtainStatusError, eStartSendError, eSomeDataSendError, eCompleteDataSendFailure, eEndSendError, eSendHeloCommandFailed=100, eSendMailCommandFailed, eSendRcptCommandFailed, eSendDataCommandFailed, eSendDataFailed, eSendQuitCommandFailed, eSendUserCommandFailed=200, eSendPassCommandFailed, eSendStatCommandFailed, eSendRetrCommandFailed, eSendDeleCommandFailed, eSendQuitPop3CommandFailed, eCreateSocketFailed=300, eConnectSocketFailed, eBadRequest=400, eUnauthorized, ePaymentRequired, eForbidden, eNotFound, eMethodNotAllowed, eNotAcceptable, eProxyAuthenticationRequired, eRequestTimeOut, eConflict, eGone, eLengthRequired, ePreconditionFailed, eRequestEntityTooLarge, eRequestURITooLarge, eUnsupportedMediaType, eRequestedRangeNotSatisfiable, eExpectationFailed, eInternalServerError=450, eNotImplemented, eBadGateway, eServiceUnavailable, eGatewayTimeOut, eHTTPVersion- NotSupported, eMultipleChoices=480, eMovedPermanently, eFound, eSeeOther, eNotModified, eUseProxy, eTemporaryRedirect).

Abstract Classes in the DeviceODBC Module

Figure 16:
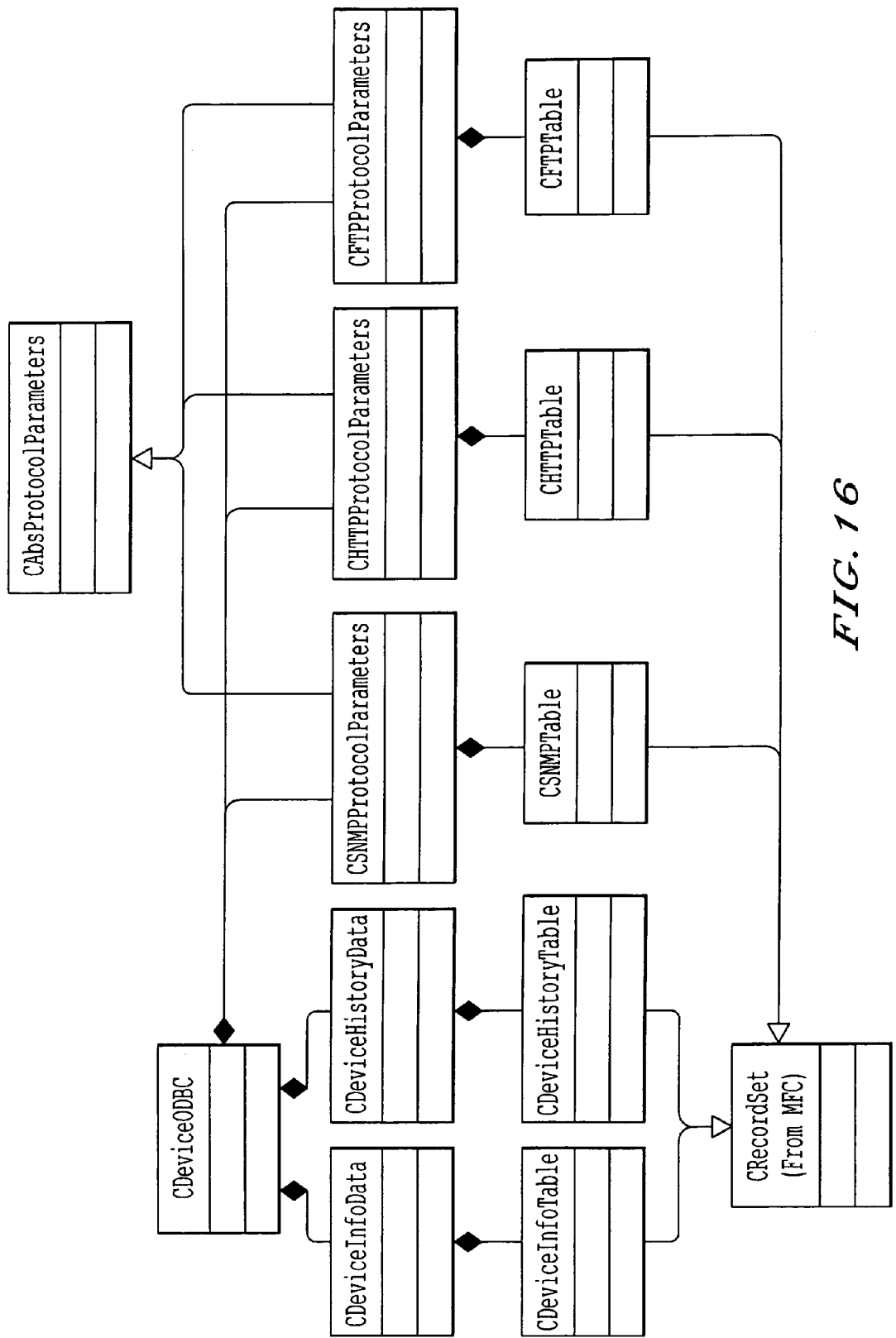
FIG. 16 shows the class structure of the DeviceODBC module including the abstract class CAbsProtocolParameters.

FIG. 16 illustrates the DeviceODBC module class structure according to the present invention, and shows how the CAbsProtocolParameters class structure is used within the DeviceODBC module. The CAbsProtocolParameters class is designed to interface with the monitor database 1014 and to obtain information for accessing the monitored devices using a particular communication protocol. The CAbsProtocolParameters class has two virtual functions which are protocol-independent:

(1) std::string obtainProtocolName(void); and
(2) bool obtainParameterVector(std::vector<SParameter>& out_ParameterVector, const std::string in_sIP).

Using these functions, the CDeviceODBC class can handle as many protocols and their associated parameter names and values through the pointer to the CAbsProtocolParameter type, without identifying the protocol. The obtained information for each device (e.g., IP Address) is stored in the data structure of FIG. 18 and passed to the MonitorManager module 1102 through the obtainconfig function. From the CDeviceODBC perspective, all the objects used to obtain the protocol name and the associated parameter names and values are considered to be a type of CAbsProtocol Parameters. When a new protocol is added, therefore, the new object should be created and stored in the vector of pointers to CAbsProtocolParameters class. The other functions do not need to be changed.

Abstract Classes in the HWaccess Module

Figure 23:
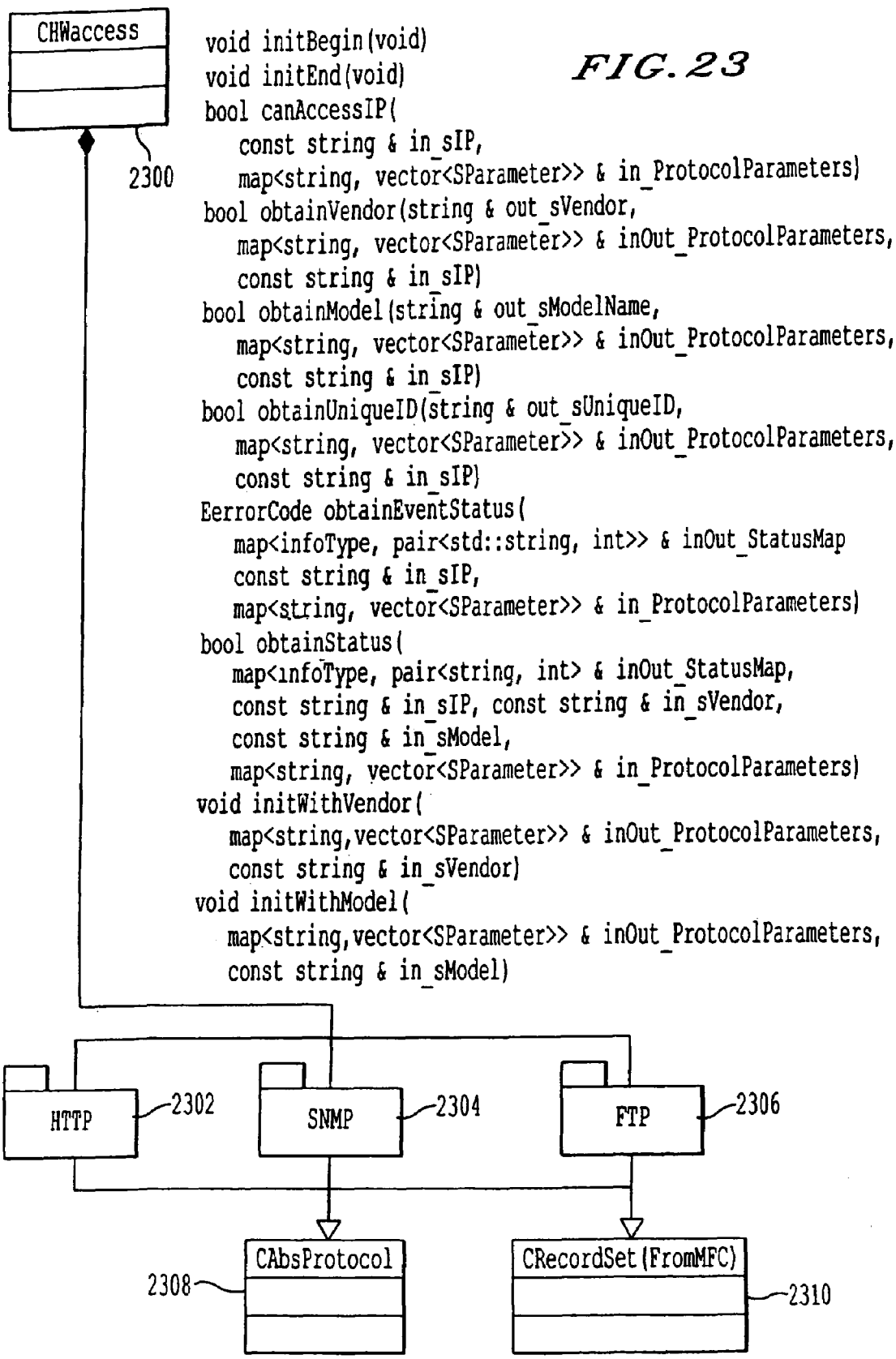
FIG. 23 illustrates the class structure of the HWaccess module according to the present invention.

FIG. 23 shows the package diagram for the HWaccess package. This package is responsible for identifying the network devices to be monitored and obtaining information about the network devices using various network protocols (e.g. SNMP, HTTP, and FTP). The package contains the packages HTTP 2302, SNMP 2304, and FTP 2306 and the classes CHWaccess 2300, CAbsProtocol 2308, and CRecordSet 2310. The packages HTTP 2302, SNMP 2304, and FTP 2306 implement the network protocols to access the network devices to obtain information from them. For example, the HTTP package 2302 implement the HTTP protocol to access the web pages of the network devices to obtain information from the web pages. The class CHWaccess 2300 manages all the protocol packages to obtain the necessary information from the network devices. The class CAbsProtocol 2308 is an abstract class representing any protocol. This class provides the interface between CHWaccess 2300 and the protocol packages. The class CAbsProtocol 2308 provides a set of common functions as shown in FIG. 23 to CHWaccess 2300 in which all protocols will provide CHWaccess 2300 the necessary information. The classes derived from CAbsProtocol 2308 as described in later figures will provide the method for each of the functions for the appropriate protocols. The class CRecordSet 2310 is a class of the Microsoft Foundation Class that provides each of the protocol package access to the database to obtain information about which vendor and model of network devices are supported and what information to obtain from those network devices.

FIG. 24 shows the package diagram for the SNMP package 2304. This package is responsible for determining the vendor and model of network devices supported by the SNMP protocol and the information to be obtained from the network devices by SNMP protocol, and for accessing the network device through the SNMP protocol to obtain information from the network devices. The package contains the packages SNMPaccess 2404 and SNMPODBC 2406 and the class CSNMPProtocol 2402 and uses the classes CAbsProtocol 2400 and CRecordSet 2408 as described in FIG. 23. The SNMPaccess package 2404 implements the SNMP protocol to access the network devices and to obtain information from the network devices. The SNMPODBC package 2406 accesses and obtains information from the database about vendor and model of network devices supported by the SNMP protocol and the information to be obtained from the network devices by SNMP protocol. The CSNMPProtocol class 2402 is a class derived from the CAbsProtocol class 2400. CSNMPProtocol 2402 obtains the necessary information from the network devices using the SNMP protocol. CSNMPProtocol 2402 provides the method for all the interface functions of CAbsProtocol 2400 as described in FIG. 23. FIG. 24 also shows the functions of the packages SNMPaccess 2404 and SNMPODBC 2406 that CSNMPProtocol 2402 uses. The SNMPODBC package 2406 uses the class CRecordSet 2408 to obtain information from the database.

FIG. 25 shows the package diagram for the HTTP package 2302. This package is responsible for determining the vendor and model of network devices supported by the HTTP protocol and the information to be obtained from the network devices by HTTP protocol, and for accessing the network devices through the HTTP protocol to obtain information from the network devices. The package contains the packages HTTPaccess 2504 and HTTPODBC 2506 and the class CHTTPProtocol 2502 and uses the classes CAbsProtocol 2500 and CRecordSet 2508 as described in FIG. 23. The HTTPaccess package 2504 implements the HTTP protocol to access the network devices and to obtain information from the network devices. The HTTPODBC package 2506 accesses and obtains information from the database about vendor and model of network devices supported by the HTTP protocol and the information to be obtained from the network devices by HTTP protocol. The CHTTPProtocol class 2502 is a class derived from the CAbsProtocol class 2500. CHTTPProtocol 2502 obtains the necessary information from the network devices using the HTTP protocol. CHTTPProtocol 2502 provides the method for all the interface functions of CAbsProtocol 2500 as described in FIG. 23. FIG. 25 also shows the functions of the packages HTTPaccess 2504 and HTTPODBC 2506 that CHTTPProtocol 2502 uses. The HTTPODBC package 2506 uses the class CRecordSet 2508 to obtain information from the database.

FIG. 26 shows the package diagram for the FTP package 2306. This package is responsible for determining the vendor and model of network devices supported by the FTP protocol and the information to be obtained from the network devices by FTP protocol, and for accessing the network devices through the FTP protocol to obtain information from the network devices. The package contains the packages FTPaccess 2604 and FTPODBC 2606 and the class CFTPProtocol 2602 and uses the classes CAbsProtocol 2600 and CRecordSet 2608 as described in FIG. 23. The FTPaccess package 2604 implements the FTP protocol to access the network devices and to obtain information from the network devices. The FTPODBC package 2606 accesses and obtains information from the database about the vendor and the model of network devices supported by the FTP protocol and the information to be obtained from the network devices by FTP protocol. The CFTPProtocol class 2602 is a class derived from the CAbsProtocol class 2600. CFTPProtocol 2602 obtains the necessary information from the network devices using the FTP protocol. CFTPProtocol 2602 provides the method for all the interface functions of CAbsProtocol 2600 as described in FIG. 23. FIG. 26 also shows the functions of the packages FTPaccess 2604 and FTPODBC 2606 that CFTPProtocol 2602 uses. The FTPODBC package 2606 uses the class CRecordSet 2608 to obtain information from the database.

Each of the protocol packages, HTTP 2302, SNMP 2304, and FTP 2306, as described in FIGS. 23 through 26, contain a class that manages the access to the network device to obtain information from the device. The class is derived from the abstract class CAbsProtocol 2308 which provides for the method of implementing the protocols to access information from the network device. An abstract class only provides the interface functions but does not perform any process. The classes derived from the abstract class provide the method to perform the process for the interface functions. There can be many derived classes of the abstract class so that the different derived classes can perform the process of the interface function differently. For example, an interface function of CAbsProtocol is obtainStatus( ). The derived class CSNMPProtocol 2402 will contain the function obtainStatus( ) which provides the method to obtain the status information of a network device using SNMP while the derived class CHTTPProtocol 2502 will contain the function obtainstatus( ) which provides the method to obtain the status information of a network device using HTTP. From the design of the HWaccess package, a new protocol can be added to the system by adding a new package that contains a derived class of CAbsProtocol that manages the new package to access the network device using the new protocol. The abstract class allows for the future expansion of the system.

FIGS. 27A-27D show the data structures that are used in the HWaccess package of FIG. 23 to maintain all the protocols to access and to obtain information from the network devices. In FIG. 27A, the data structure is a vector 500 of pointers to CAbsProtocol 2308. The class CHWaccess 2300 will contain and use this data structure. Even though the vector 500 will contain pointers to classes derived from CAbsProtocol 2308, CHWaccess 2300 will see the vector as containing pointers to CAbsProtocol 2308 and call the interface functions of CAbsProtocol 2308 through the virtual function call mechanism. In actuality, CHWaccess 2300 will call the interface functions of the derived classes of CAbsProtocol 2308. For example, the pointer to the CAbsProtocol 502 in the first entry in the vector may be a pointer to the derived class CSNMPProtocol 2402, the pointer to the CAbsProtocol 504 in the second entry in the vector may be a pointer to the derived class CHTTPProtocol 2502, and the pointer to the CAbsProtocol 506 in the third entry in the vector may be a pointer to the derived class CFTPProtocol 2602. So when CHWaccess 2300 calls the interface functions of CAbsProtocol 2308 in the vector, it is actually calling the interface functions of CSNMPProtocol 2402, CHTTPProtocol 2502, and CFTPProtocol 2602. The use of the abstract class CAbsProtocol 2308 in the vector 500 allows any protocol to be used to access and obtain information from the network devices. The abstract class CAbsProtocol 2308 hides the detail of what protocol is being used.

FIG. 27B shows the data structure that is used by CSNMPProtocol to maintain information about the vendor and model of network devices that are being monitored by SNMP and information used to obtain status information from them. The data structure is a map 510. The key to the map 510 is a string 512 representing the vendor name of the network device. The value to the map 510 is another map 514. The key to the map 514 is a string 516 representing the model name of the network device. The value to the map 514 is a vector 518 of pairs. The pairs contain the structure SOIDinfoType and an integer. The structure SOIDinfoType contain information used to obtain a single status information from the network device using SNMP. Therefore, the vector 518 of pairs contains information to obtain all the status information for the network device for a specific vendor and model. The map 510 will be initialized with information using the process described in FIG. 28. The map 510 shows sample entries for the string 512 for the vendor and the string 516 for the model.

FIG. 27C shows the data structure that is used by CHTTPProtocol to maintain information about the vendor and model of network devices that are being monitored by HTTP and the information used to obtain status information from them. The data structure is a map 520. The key to the map 520 is a string 522 representing the vendor name of the network device. The value to the map 520 is another map 524. The key to the map 524 is a string 526 representing the model name of the network device. The value to the map 524 is a vector 528 of SWebPageInfo. The structure SWebPageInfo contains information used to obtain all the status information from a web page of the network device using HTTP. Therefore, the vector 528 of SWebPageInfo contains information to obtain all the status information for the network device for a specific vendor and model from all of its web pages. The map 520 will be initialized with information using the process described in FIG. 28. The map 520 shows sample entries for the string 522 for the vendor and the string 526 for the model.

FIG. 27D shows the data structure that is used by CFTPProtocol to maintain information about the vendor and the model of network devices that are being monitored by FTP and the information used to obtain status information from them. The data structure is a map 530. The key to the map 530 is a string 532 representing the vendor name of the network device. The value to the map 530 is another map 534. The key to the map 534 is a string 536 representing the model name of the network device. The value to the map 534 is a vector 538 of SDirFileStatusInfo. The structure SDirFileStatusInfo contains information used to obtain all the status information from an FTP file of the network device using FTP. Therefore, the vector 538 of SDirFileStatusInfo contains information used to obtain all the status information for the network device for a specific vendor and model from all of its FTP files. The map 530 will be initialized with information using the process described in FIG. 28. The map 530 shows sample entries for the string 532 for the vendor and the string 536 for the model.

FIG. 28 shows a flowchart describing the process of initializing all the protocol objects with information about the vendor of a network device being monitored by the system. A similar process is used for initializing all the protocol objects with information about the model of a network device being monitored by the system. For a given network device being monitored, the vendor and model of the network device may need to be known in order to determine what information needs to be obtained from the network device. Each protocol object used to access and obtain information from the network device may need to know the vendor and model in order to determine what information and how to obtain the information from the network device. The protocol objects requiring initialization are those corresponding to the classes derived from CAbsProtocol 2308, which are CSNMPProtocol, CHTTPProtocol, and CFTPProtocol. Initialization of the protocol object involves adding information to the data structures described in FIGS. 27B, 27C, and 27D corresponding to the protocols. The design of the system shows that information added to the data structures of FIGS. 27B, 27C, and 27D comes from a database but they may come from other external sources such as a text file or a spreadsheet. The vector of pointers to CAbsProtocol 2308 described in FIG. 27A is used to initialize all the protocol objects. The process of the flowchart will step through the vector twice. The first time it steps through the vector, the protocol objects are used to find the vendor of the network device. If the vendor name is obtained from one of the protocol objects, all the protocol objects are initialized with the vendor name when the vector is stepped through a second time. In step 602, a protocol object is obtained from the vector of pointers to CAbsProtocol. The protocol object corresponds to one of the protocols to access the network device (e.g. SNMP, HTTP, and FTP). In step 604, a check is done to see if there are any more protocol objects that can be obtained from the vector. This check is done by determining if the end of the vector has been reached. If no more protocol objects can be obtained, then the system failed to obtain the vendor name of the network device. All the protocol objects failed to obtain the vendor name and the initialization of the protocol objects for the network device is completed in step 606. If there is a protocol object obtained from the vector, then the protocol object is used to obtain the vendor name of the network device in step 608. In step 610, a check is done to see if the protocol object is able to obtain the vendor name of the network device. The protocol objects obtain information from the database used to determine the vendor of the network device. If the vendor name cannot be obtained by the protocol object, then the process tries to obtain the vendor name using another protocol object in the vector by going back to step 602. If the vendor name can be obtained from the protocol object, then the process initializes the protocol object with the vendor name in step 612. The protocol object will be initialized with information about how to obtain status information from the network device of the obtained vendor name. Information will be added to the data structures as described in FIG. 27B, 27C, and 27D. In step 614, a protocol object is obtained from the vector of pointers to CAbsProtocol. In step 616, a check is done to see if there are any more protocol objects that can be obtained from the vector. If no more protocol objects can be obtained, then all the protocol objects have been initialized with the vendor name and the initialization of all the protocol objects is complete in step 606. All the protocol objects have updated information about the vendor. If there is a protocol object obtained from the vector, then initialize the protocol object with the vendor name in step 618. Just like in step 612, the protocol object will be initialized with information about how to obtain status information from the network device of the obtained vendor name. After initializing the protocol object with the vendor name, the process initializes another protocol object with the vendor name by going back to step 614.

In step 608 of FIG. 28, the protocol object obtains the vendor name of the network device. The SNMP, HTTP, and FTP protocol objects can access the network device to obtain the vendor name. Information about where the vendor name can be found is obtained from the database. Along with information about the vendor of the network device being supported by a protocol, the database provides the information to locate the vendor name of a network device. For SNMP, information about the enterprise object identifier associated with a vendor name and the object identifier used to locate the enterprise object identifier within the MIB of a network device are used by the SNMP protocol object to obtain the vendor name. For HTTP, information about the web pages and the location within the web pages are used by the HTTP protocol object to obtain the vendor name. For FTP, information about the FTP files and location within the FTP files are used by the FTP protocol object to obtain the vendor name.

FIGS. 29A-29D show the different data structures used to obtain the status information of a network device of a specific vendor and model for the different protocols. Different protocols may be used to obtain the same status information. However, the status information obtained by one protocol may provide more information than another so that the status information obtained from the protocol that provides more information should be used. For example, the toner level of a printer cartridge can be obtained from a network printer using SNMP and HTTP. The status information for the toner level obtained by SNMP may be "FULL", "OK", or "EMPTY" while the same status information obtained by HTTP may be the percentage of toner remaining. In this example, the status information obtained using HTTP is more informative so that the status information obtained by HTTP should be used. The data structures of FIGS. 29A through 29D make sure that the most informative status information is obtained. FIG. 29A shows the data structure used to obtain the status information for a network device of a specific vendor and model using the SNMP protocol. The data structure is a vector 700 of pairs (e.g. 702 and 704) where the pairs consist of the structure SOIDinfoType 706 and an integer. The structure SOIDinfoType 706 contains information used to obtain a specific status information from the network device using SNMP. The structure of SOIDinfoType 706 is shown in FIG. 29A. The integer in the pair determines the weight or priority of the status information. The larger the value for the integer, the more likely the status information obtained will be kept because it is more informative. The lower the value for the integer, the more likely that the same status information obtained from other protocols will be kept. CSNMPProtocol 2402 uses the vector 700 to determine what status information to obtain from the network device. The information placed into the vector 700 is obtained from the data structure in FIG. 27B for a specific vendor and model.

FIG. 29B shows the data structure used to obtain the status information for a network device of a specific vendor and model using the HTTP protocol. The data structure is a vector 708 of pairs (e.g. 710 and 712) where the pairs consist of the structure SKeyValueInfo 714 and an integer. The structure SKeyValueInfo 714 contains information used to obtain a specific status information from a web page of a network device using HTTP. The structure of SKeyValueInfo 714 is shown in FIG. 29B. The integer in the pair determines the weight or priority of the status information. CHTTPProtocol 2502 uses the vector 708 to determine what status information to obtain from the network device. The information placed into the vector 708 is obtained from the data structure in FIG. 27C for a specific vendor and model.

FIG. 29C shows the data structure used to obtain the status information for a network device of a specific vendor and model using the FTP protocol. The data structure is a vector 716 of pairs (e.g. 718 and 720) where the pairs consist of the structure SKeyInfoType 722 and an integer. The structure SKeyInfoType 722 contains information used to obtain a specific status information from an FTP file of a network device using FTP. The structure of SKeyInfoType 722 is shown in FIG. 29C. The integer in the pair determines the weight or priority of the status information. CFTPProtocol 2602 uses the vector 716 to determine what status information to obtain from the network device. The information placed into the vector 716 is obtained from the data structure in FIG. 27D for a specific vendor and model.

FIG. 29D shows the data structure used to maintain the status information obtained through the various protocols. It does not maintain information about which protocol was used to obtain the status information. The data structure is a map 724. The key 726 to the map 724 is an infoType. infoType is a number representing a type of information. The value 728 to the map 724 is a pair. The pair consists of a string and an integer. The string in the pair is the status information obtained from the network device that corresponds to the infoType. The integer in the pair is the weight or priority of the status information as obtained from a protocol. As an example, for the infoType of 700 that may represent the level of black toner in the printer cartridge, the pair may contain the string "75%" and integer 10000. The string "75%" indicates that 75% of the toner remains in the cartridge and the integer 10000 is the weight or priority of the status information. CSNMPProtocol 2402, CHTTPProtocol 2502, and CFTP-Protocol 2602 adds status information that it obtains from the network devices to the map 724.

FIG. 30 shows an example of how the data structures of FIGS. 27D, 29C, and 29D are used to obtain status information from a network device using the FTP protocol. The map 800 containing sample data corresponds to the data structure as described in FIG. 27D. The sample data in the map 800 provides information to access status information for the network device for the vendor Ricoh and the model Aficio 120 using FTP. Each of the structures in the vector, SDirFileStatusInfo1, SDirFileStatusInfo2, and SDirFileStatusInfo3, provides information to access status information from an FTP file in the network device. SDirFileStatusInfo1 802 contains information to access status information from the network device from the FTP file status.txt in the directory/pub. Five status information values can be obtained from the FTP file using the vector of pairs of SKeyInfoType and integer. Each of the SKeyInfoType in the vector pairs corresponds to different status information corresponding to the infoType as shown in FIG. 30. The map 804 contains sample data corresponding to the data structure as described in FIG. 29D. The map 804 contains status information obtained previously by other protocols. The map 804 contains three status information values corresponding to the infoType 600, 610, and 700. The status information for infoType 600 is "Low Paper" with the weight of 500. The status information for infoType 610 is "24321" with the weight of 10000.

The status information for infoType 70 is "OK" with the weight of 2500. To determine what status information will be obtained using the FTP protocol, a vector 806 is created to contain the status information to be obtained. The information to be added to the vector 806 is determined by the information in the map 800 (more specifically, the vector of pairs in the structure SDirFileStatusInfo1 802) and the status information in the map 804. If the status information to be obtained from the map 800 has not been already obtained in the map 804, then the process adds the information needed to obtain the status information in the vector 806. If the status information to be obtained from the map 800 has already been obtained in the map 804, then check if the status information to be obtained by the FTP protocol is more informative than the status information in the map 804 by comparing the weight. Add to the vector 806 information to obtain the status information only if the weight of the status information obtained by FTP is greater than weight of the status information already in the map 804. The status information to be obtained by FTP corresponding to SDirFileStatusInfo1 802 are the infoType 600, 610, 620, 700, and 710. The infoType 620 and 710 are not in the status information map 804 so that the status information needs to be obtained using FTP. Therefore the information used to obtain the status information corresponding to 620 (SKeyInfoType3) and 710 (SKeyInfoType5) are added to the vector 806. The infoType 600 and 700 are in the status information map 804. The weight of the status information obtained by FTP for these infoTypes as shown in 802 is greater than their weight in the status information map 804. So the status information obtained for these two infoTypes by FTP is more informative than the status information that exists in the map 804. Therefore, information to obtain the status information for infoType 600 (SKeyInfoType1) and 700 (SKeyInfoType4) are added to the vector 806. The infoType 610 is in the status information map 804. The weight of the status information obtained by FTP for this infoType as shown in 802 is less than its weight in the status information map 804. So the status information obtained for this infoType by FTP is less informative than the status information that exists in the map 804. Therefore, information to obtain the status information for infoType 610 (SKeyInfoType2) is not added to the vector 806. This vector 806 will be used by the FTP protocol to obtain the status information for infoType 600, 620, 700, and 710. Two status information values will be added to the status information map 804 and two status information values will be overwritten in the status information map 804 if FTP is successful in obtaining the status information. FIG. 30 shows an example of how the data structures are used to obtain the status information for the FTP protocol. A similar process in using the data structures of FIG. 27B, 27C, 29A, and 29B is used to obtain the status information for SNMP and HTTP.

Figure 31A:
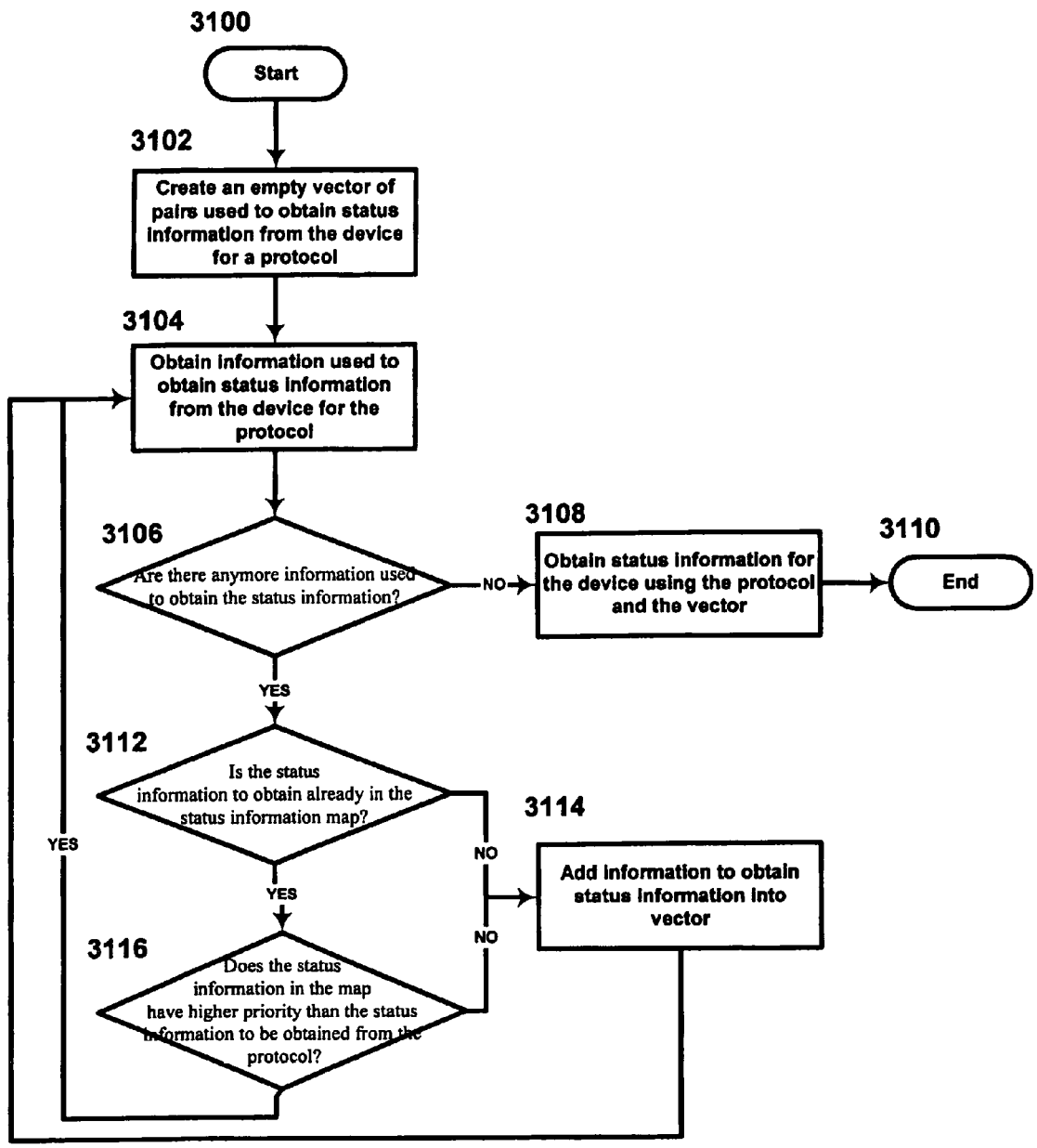
FIG. 31A shows a flowchart describing the process of obtaining status information from a monitored device for a communication protocol according to the present invention.

FIG. 31A is a flowchart describing the method of obtaining status information. All protocols use the same method described herein. Before a protocol object is used to obtain a specific status information, the protocol object checks to see if the status information has already been obtained by another protocol object. If the status information has already been obtained, it must check to see if the status information it will obtain is more informative than what has already been obtain from another protocol object. The most informative status information will be kept. The method of the flowchart makes sure that the most informative status information is obtained. The data structures 510, 520, and 530 of FIGS. 27B, 27C, and 27D are used by its corresponding protocol to determine which status information to obtain. In step 3102, a vector of pairs containing information used to obtain status information from the network device is created with no entries. The vector of pairs correspond to one of the data structures 700, 708, or 716 of FIGS. 29A through 29C depending on the protocol being used. In step 3104, information is obtained that is used to obtain one status information from the network device of a given vendor and model. All protocol objects maintain information about what status information to obtain for every vendor and model it supports. All protocol objects are initialized with this information by the initialization process described in FIG. 28. The information that is used to obtain one status information will be stored in one of the structures SOIDinfoType 706, SKeyValueInfo 714, or SKeyInfoType 722 of FIG. 29A, 29B, and 29C depending upon the protocol used. In step 3106, a check is made to determine if there is any more information that is used to obtain status information from the network device. If there is no more information, then the vector of pairs created in step 3102 contains all the information needed to obtain all the status information from the network device for the protocol. In step 3108, the protocol object will use the vector of pairs to obtain the status information from the network device and the status information will be placed into the status information map 724 described in FIG. 29D. The obtaining of status information by a protocol is completed in step 3110. If there is more information that is used to obtain status information from the network device, then in step 3112 check to determine if the status information has already been obtained. This is done by looking at the map that contains the status information as described in FIG. 29D to see if the status information already exists in the map. If the status information does not exist in the map, then add the information used to obtain the status information to the vector of pairs in step 3114. After adding the information to the vector of pairs, go back to step 3104 to obtain more information used to obtain status information. If the status information has already been obtained, then compare the weight of the status information that has already been obtained with the weight or priority of the status information that can be obtained through the protocol in step 3116. If the weight or priority of the status information in the map for the status information of the network device is greater than the weight or priority of the status information to be obtained by the protocol, then do not add the information used to obtain the status information to the vector of pairs. Instead, go back to step 3104 to obtain more information used to obtain status information. If the weight or priority of the status information in the map is not greater than the weight or priority of the status information to be obtained by the protocol, then add the information used to obtain the status information to the vector of pairs in step 3114. After adding the information to the vector of pairs, go back to step 3104 to obtain more information used to obtain status information.

Figure 31B:
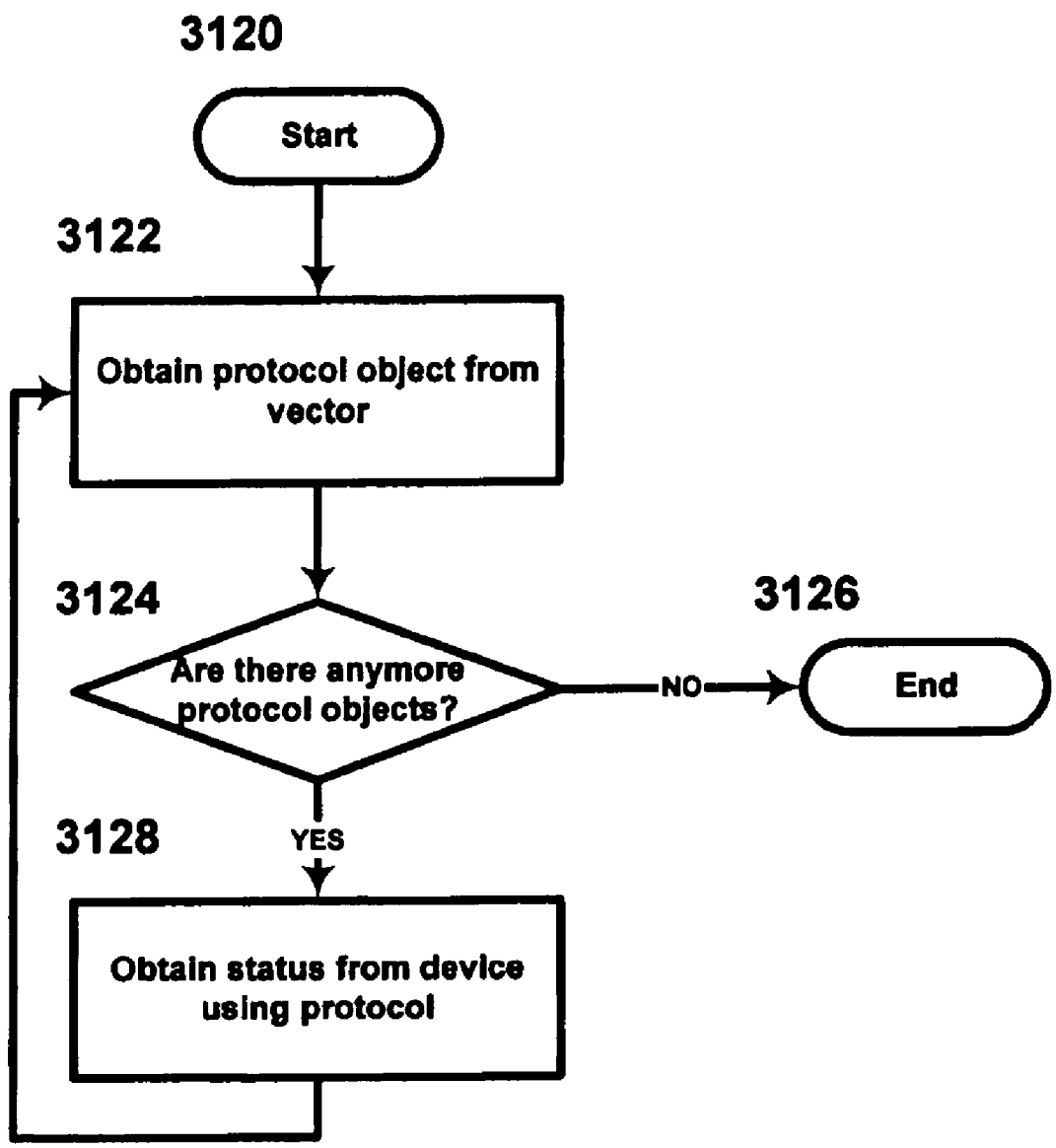
FIG. 31B shows a flowchart describing the process of obtaining status information from a monitored device using all of the communication protocols according to the present invention.

FIG. 31B shows a flowchart describing the process of obtaining status information about the network devices using the all the protocols. After the protocol objects have been initialized with information about the vendor and model of network devices it supports as described in FIG. 28, the protocol objects can be used to obtain status information from the network devices. The protocol objects contain information about how to obtain status information for given vendors and models using the data structures as described in FIG. 27B, 27C, and 27D. The vector of pointers to CAbsProtocol 2308 described in FIG. 27A is used to obtain the status information for all the protocol objects. The process of the flowchart will step through the vector once. In step 3122, a protocol object is obtained from the vector of pointers to CAbsProtocol. The protocol object corresponds to one of the network protocols to access the network device (e.g. SNMP, HTTP, and FTP). In step 3124, a check is done to see if there are any more protocol objects that can be obtained from the vector. This check is done by determining if the end of the vector has been reached. If no more protocol objects can be obtained, then the system is done in obtaining the status information from the network device using all the protocol objects in step 3126. If there is a protocol object obtained from the vector, then use the protocol object to obtain the status information of the network device in step 3128. After obtaining the status information using the protocol object, obtain more status information using another protocol object by going back to step 3122.

FIG. 32A shows the data structure used to maintain information about the vendors and models of network devices supported by a given protocol, while FIG. 32B shows an example of information used in the data structure. The organization of information in the database about the supported vendors and models and how to obtain the status information from them varies among protocols. Therefore obtaining the vendors and models supported from the database for different protocols will differ from one another. To simplify the access of vendors and models supported, a map structure can be used to store and access this information for all protocols. FIG. 32A shows the Vendor Model Support Map 3200. The key 3202 to the map 3200 is a string which contains information about the vendor and model supported by a protocol. The value 3204 to the map 3200 is an integer that can be used to represent information related to the vendor and model such as a vendor model identification number. The reason a map structure was chosen to contain information about the vendors and models supported by a protocol was because a map structure has a lookup mechanism to easily find a key in a map. Thus, it is easy to determine if a vendor and model is stored in the map. Though the discussion of FIG. 32A indicated information about the vendor and model for different protocols come from the database, the information can come from any external source such as a text file or a spreadsheet.

FIG. 32B shows a Vendor Model Support Map 3206 with sample entries in the map. The key 3208 to the map 3206 is a string containing the vendor name, a separator "%%%%%", and the model name. For example, for the vendor "Xerox" and model "NC60", the string for the key 3208 to the map 3206 is "Xerox %%%%% NC60". Though the separator "%%%%%" was used in the example, any separator can be used that would not be considered as part of the vendor name or model name such as "@@@@@". The reason a separator is used is to distinguish the vendor from the model so that the vendor and model can be easily obtained from the string. The value 3210 to the map 3206 is the integer 1. The value 3210 to the map 3206 can be any integer. Each protocol will maintain a Vendor Model Support Map 3200.

Figure 33:
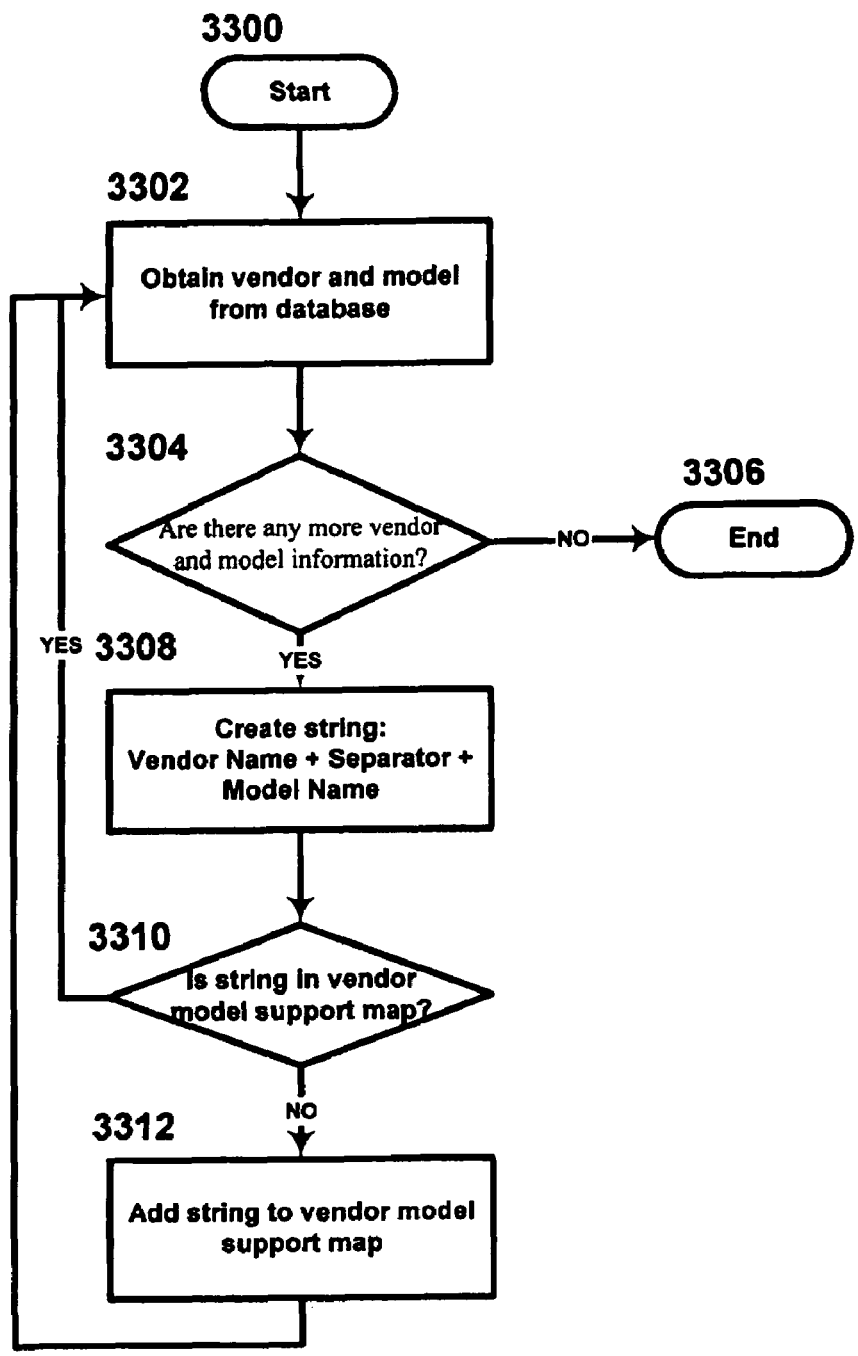
FIG. 33 shows a flowchart describing the method of adding vendors and models supported to the data structure of FIG. 32A according to the present invention.

FIG. 33 is a flowchart describing the method of adding vendors and models supported to the Vendor Model Support Map 3200 of FIG. 32A to contain all the vendors and models supported by a protocol. In step 3302, the vendor and model is obtained from the database. How the vendor and model are obtained from the database will differ among the protocols. This depends upon the tables in the database which contain the vendors and models supported. In step 3304, a check is made to determine if there are more vendor and model information to obtain from the database. If there are no more to obtain, then the method of populating the Vendor Model Support Map 3200 with vendors and models supported is completed in step 3306. The Vendor Model Support Map 3200 contains all the vendors and models supported by a protocol. No more access to the database is required to obtain the supported vendor and model information. If there is a vendor and model obtained from the database, then create a string to be used as a key for the Vendor Model Support Map 3200 in step 3308. The string consists of the vendor name, a separator, and the model name. As described previously, the separator can be any string that would not be considered as part of the vendor name or model name. In step 3310, a check is made to determine if the string made up of the vendor name, separator, and model name already exists in the Vendor Model Support Map 3200. If the string already exists in the map 3200, then obtain another vendor and model from the database in step 3302. If the string does not exist in the map 3200, then add the string and an integer to the map 3200. After the string has been added to the map 3200, then obtain another vendor and model from the database in step 3302.

Figure 34:
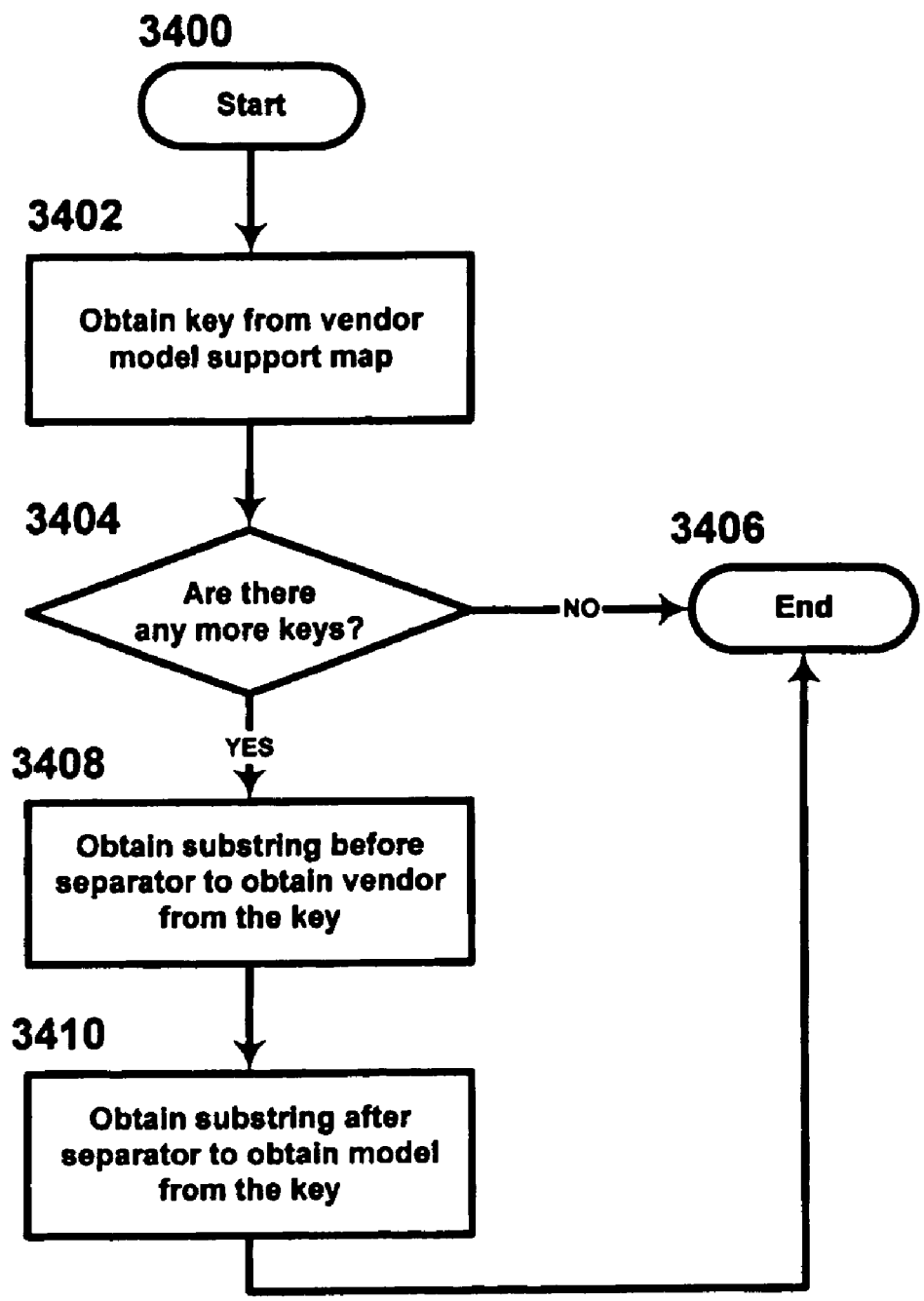
FIG. 34 shows a flowchart describing the method of obtaining the vendor and model supported by a protocol from the data structure of FIG. 32A according to the present invention.

FIG. 34 is a flowchart describing the method of obtaining the vendor and model supported by a protocol from the Vendor Model Support Map 3200 of FIG. 32A. In step 3402, a string for the key is obtained from the Vendor Model Support Map 3200. In step 3404, a check is made to determine if there are any more keys to obtain from the map 3200. If there are no more keys, then all the vendors and models supported by a protocol have been obtained and obtaining the vendor and model is complete in step 3406. If a string for the key was obtained from the map 3200, then obtain the substring before the separator to obtain the vendor name in step 3408. In step 3410, obtain the substring after the separator to obtain the model name. Then in step 3406, obtaining the vendor and model is complete. By going through all the entries in the map 3200, all the vendors and models supported by a protocol can be obtained.

FIG. 35 shows the package diagram of the Device Package. The package is responsible for creating the software objects representing the network devices. The Device Package 1300 consists of two classes, CDeviceFactory 1302 and CDevice 1304. The class CDeviceFactory 1302 is responsible for creating and initializing the software object for a network device. Initializing the software object includes determining the vendor, model, and unique identifier of the network device and setting the protocols that can be used to access the network devices. If the network device cannot be accessed, then a software object for the network device is not created. The class CDevice 1304 will represent the software object for a network device. CDevice 1304 will maintain information about the network device and obtain status information about the network device. CDevice 1304 will use the HWaccess package 1306, which is described in FIG. 23, to access the network device through various protocols to obtain information from the device.

FIG. 36A shows a data structure used by the software objects representing the network devices, CDevice 1304 as described in FIG. 35, to determine which protocols are used to access the network device. CDevice 1304 contains the Protocol Parameter Map 1400. The key 1402 to the map 1400 is a string representing the protocol (e.g. SNMP, HTTP, FTP). The value 1404 to the map 1400 is a vector of the structure SParameter. The structure SParameter 1406 contains information used to access the network device for a given protocol. The SParameter 1406 contains information that is characteristic of the network device rather than the characteristic of the vendor and model of the device. For example, the information may be the community name in order to access the network device by SNMP or the information may be the user name and password in order to access the network device by FTP. These are common information values used to access any network device by SNMP or FTP. Information from the database obtained through DeviceODBC package is added to the map so that the network device can be accessed through the various protocols. Entries in the map are removed for a protocol if the protocol cannot access the network device using the protocol and if the vendor and model is not supported by the protocol. Some protocols will access the network device even though the vendor and model may not be supported by the protocol. One such protocol is SNMP.

FIG. 36B shows sample data in the Protocol Parameter Map 1400 of FIG. 36A for a network device. The network device uses two protocols to obtain status information—SNMP and FTP. Therefore, the map 1410 for the network device contains two entries for the key "SNMP" and "FTP". To access the network device using SNMP, the community name is needed. The vector of SParameter for SNMP will contain information about the community name. The parameter name of COMMUNITY and a parameter value of "private" is used for one SParameter to allow access to the network device. To access the network device using FTP, the user name and password are needed. The vector of SParameter for FTP will contain information about the user name and password. The parameter name of USERNAME with a parameter value of "abc" is used for one SParameter and the parameter name of PASSWORD with a parameter value of "xyz" is used for another SParameter to allow access to the network device.

Figure 37:
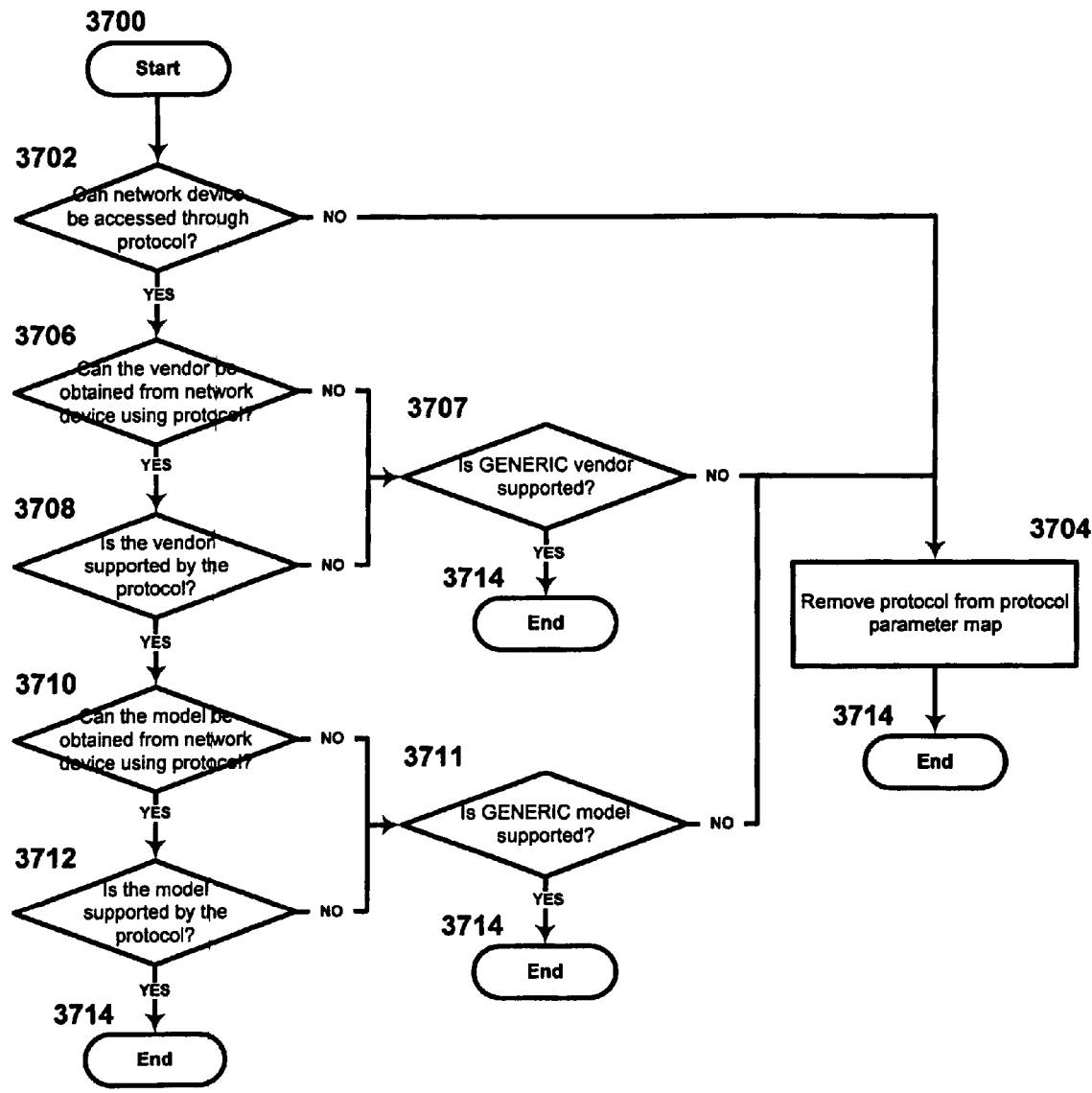
FIG. 37 shows a flowchart describing how the data structure of FIG. 36A is updated to determine which protocols are used to obtain status information for a monitored device according to the present invention.

FIG. 37 shows a flowchart describing how the Protocol Parameter Map 1400 of FIG. 36A is updated to determine which protocols are used to obtain the status information from a network device. The steps in FIG. 37 are performed to obtain the vendor name and the model name of a network device for a protocol. In step 3702, a check is made to determine if the network device can be accessed using a protocol. The network device is accessed through the protocol using the information in the map 1400. If the network device cannot be accessed through the protocol, the protocol is removed from the protocol parameter map 1400 in step 3704 and the updating of the map 1400 is completed in step 3714. If the network device can be accessed through the protocol, then in step 3706 a check is made to determine if the vendor of the network device can be obtained using the protocol. If the vendor cannot be obtained, then in step 3707 a check is made if GENERIC vendor is supported by the protocol. Support for GENERIC vendor for a protocol means that a protocol can obtain status information that is common to all devices (common status information) even if it cannot obtain or does not support the vendor of the devices. If GENERIC vendor is not supported by the protocol, then the protocol is removed from the protocol parameter map 1400 in step 3704 and the updating of the map 1400 is completed in step 3714. If GENERIC vendor is supported by the protocol, then the protocol remains in the protocol parameter map 1400 and the updating of the map is completed in step 3714. If the vendor can be obtained in step 3706, then in step 3708 a check is made to determine if the vendor of the network device is supported by the protocol. If the vendor is not supported by the protocol, then in step 3707 a check is made if GENERIC vendor is supported by the protocol. The sequence of steps following step 3707 is discussed above.

If the vendor is supported by the protocol, then in step 3710 a check is made to determine if the model of the network device can be obtained using the protocol. If the model cannot be obtained, then in step 3711 a check is made if GENERIC model is supported by the protocol. Support for GENERIC model for a protocol means that a protocol can obtain status information that is common to all devices of a vendor (vendor specific status information) even if it cannot obtain or does not support the model of the devices. If GENERIC model is not supported by the protocol, then the protocol is removed from the protocol parameter map 1400 in step 3704 and the updating of the map 1400 is completed in step 3714. If GENERIC model is supported by the protocol, then the protocol remains in the protocol parameter map 1400 and the updating of the map is completed in step 3714. If the model can be obtained in step 3710, then in step 3712 a check is made to determine if the model of the network device is supported by the protocol. If the model is not supported by the protocol, then in step 3711 a check is made if GENERIC model is supported by the protocol. The sequence of steps following 3711 is discussed above. If the model is supported by the protocol, then the protocol can be used to obtain status information for the network device and the updating of the protocol parameter map 1400 is completed in step 3714. If the vendor and model are not obtained or not supported, then the protocol is removed from the protocol parameter map 1400 and the protocol is not used to obtain status information. There are variations to the process shown in FIG. 37 depending on the protocol. Whereas HTTP and FTP follow the description in the flowchart, SNMP will be supported and used to obtain the status information even though the vendor is supported but the model and generic model are not supported.

As discussed above, status information can be obtained by SNMP from the network device even if the vendor and model are not obtained or supported. As long as the network device supports SNMP and can be accessed by SNMP, information can be obtained from the Management Information Base (MIB) of the network device. In step 3702, if the network device cannot be accessed through SNMP, then the SNMP protocol may be removed from the protocol parameter map 1400 in step 3704. However, if the network device can be accessed through SNMP, then the SNMP protocol remains in the protocol parameter map 1400 whether or not the vendor or model is obtained and supported. Network devices that support SNMP provide a MIB so that the remote system can always obtain information from the devices. However, the type and number of information that can be obtained from the network device depends upon if the vendor and model are obtained and supported. More information can be obtained from the network device by SNMP is the vendor and model are obtained and known. If the vendor and model cannot be obtained, SNMP is still able to obtain information that all devices can provide, such as the system description or the time the system has been running. SNMP can be used to obtain information from the network device under the three conditions: (1) vendor and model are supported, (2) vendor supported but model not supported, and (3) vendor and model are not supported. HTTP and FTP do not have the characteristics as SNMP. Where SNMP has a standard MIB that all network devices can follow so that information can be obtained, web pages and FTP files will vary among network devices of different vendors and models. There is no standard for web pages and FTP files which network devices follow to obtain information.

FIG. 39 shows an abstract class that defines the interface to the object used to process the extraction of the infoType and the corresponding value from the information obtained from the monitored device. The infoType is a non-zero integer value that shows the type of the information. For example, an infoType of 700 corresponds to information about the black toner level. Sample values of infoType were described above. The function transformData( ) and end( ) return an infoType and its corresponding value that is extracted from the lines of information from the monitored device. If it is possible to get more than one infoType and its corresponding value from the input string, the outputs of transformData( ) and end( ) can be defined to be a vector of value and infoType pairs. The function putParameters( ) provides information for the objects that will be used by transformData( ) and end( ) to extract the infoType and value. Similarly, putparameters( ) can be modified to allow more complex data extraction method through transformdata( ). The abstract class provides the interface functions to extract the infoType and value. The derived classes of CAbsDevDataProcess provide the actual methods for the functions to extract the infoType and value from the monitored devices. The abstract class allows for new classes to be added to the system for new methods of extracting the infoType and value.

Figure 40:
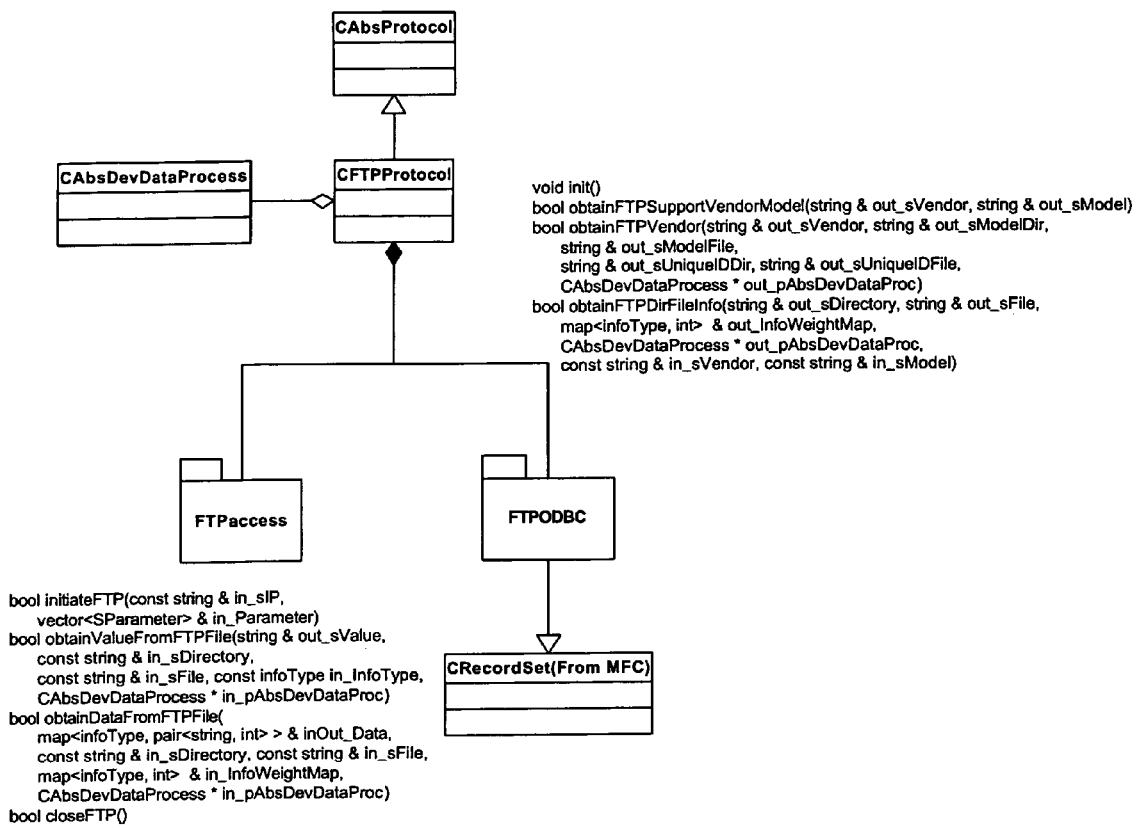
FIG. 40 shows an improvement of the class structure of the FTP module shown in FIG. 26.

FIG. 40 shows an improvement of the class structure of the FTP module shown in FIG. 26. Although function names are the same, the parameters for obtainFTPVendor( ), obtainFTPDirFileInfo( ), obtainValueFromFTPFile( ), and obtainDataFromFTPFile( ) are changed. Note that the main changes are in the pointer to CAbsDevDataProcess and the weight map to replace the information used to obtain information from the monitored devices. The information used to obtain the information from the device is encapsulated in the object of CAbsDevDataProcess. The weight map is used to determine if the information obtained from the devices by FTP is more informative than the same information that has been obtained through another protocol. Appendices 1 through 3 shows the specifications of the related classes in the figures, namely, CFTPProtocol, CFTPODBC, and CFTPaccess. CFTPProtocol manages the FTP module to obtain information from the devices. CFTPODBC manages the FTPODBC package which accesses the database to determine the vendor and model of devices that can be accessed via FTP to obtain information and how to obtain the information. CFTPaccess manages the FTPaccess package to provide the FTP sessions to access the devices. These appendices show the data structures and interface functions.

Figure 41:
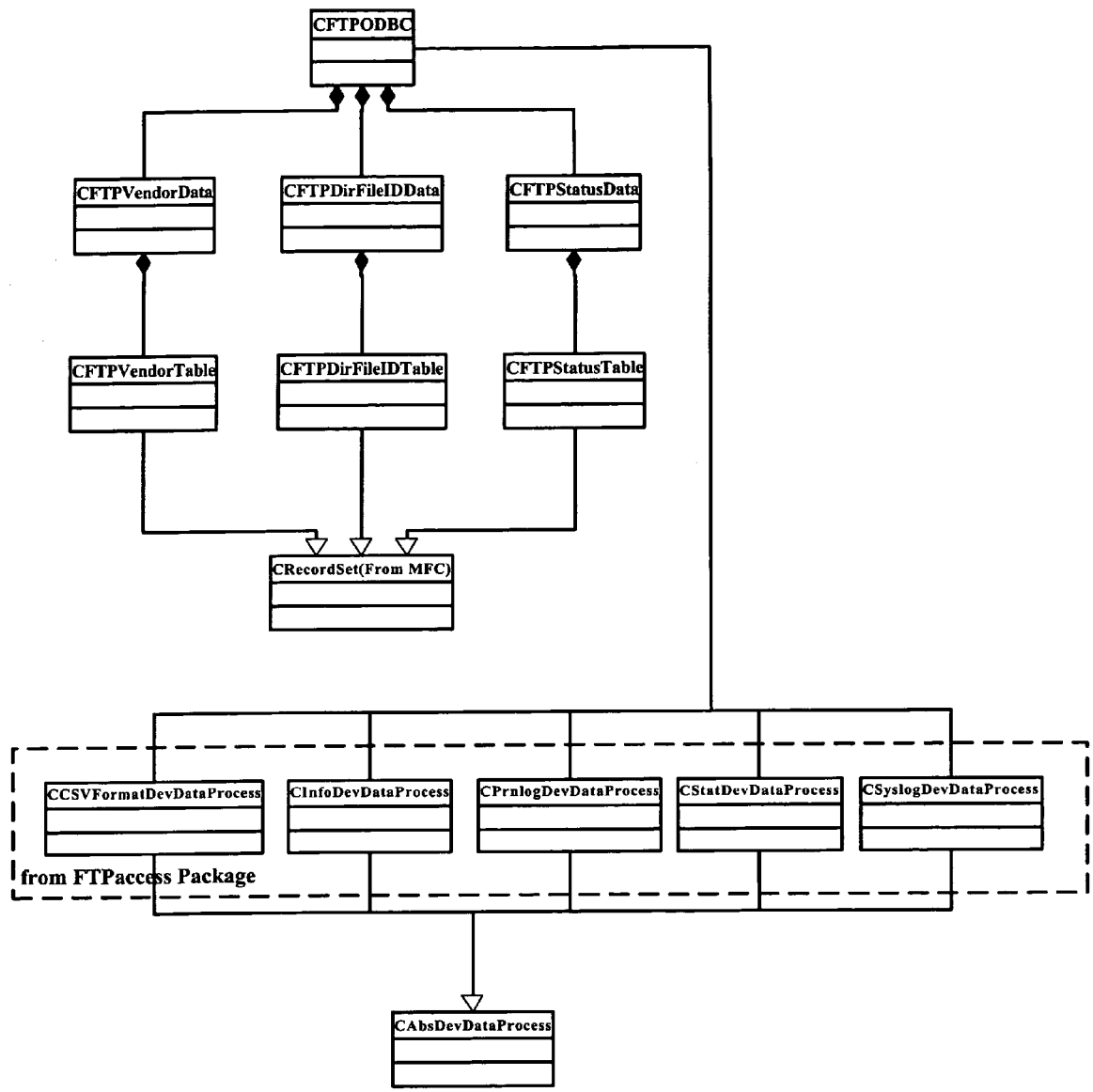
FIG. 41 shows the changes in the FTPODBC package, which uses the derived classes, CXXXDevDataProcess, of the FTPaccess package.

FIG. 41 shows the structure of the FTPODBC package, which uses the derived classes, CXXXDevDataProcess, of the FTPaccess package. Appendix 2 shows the functions createXXX( ) that create the objects of these added classes. In the constructor of CFTPODBC, the functions init( ) and setupCreateFunctionMap( ) are called. The function init( ) obtains information about the vendors and models in which there is FTP support from the database. The function setupCreateFunctionMap( ) populates the map m_createFunctionMap attribute that consists of a string (key of the map) and the pointer to the creation function (value corresponding to the key of the map). The key of the map is a string consisting of the vendor name, model name, directory name, and file name. The directory and file name correspond to the FTP file from which information is to be extracted from the device. The value is a pointer to a function that will create one of the derived classes of CAbsDevDataProcess that will be used to extract the infoType and value from the information extracted from the device. The map will include information regarding all the devices that support FTP.

Figure 42:
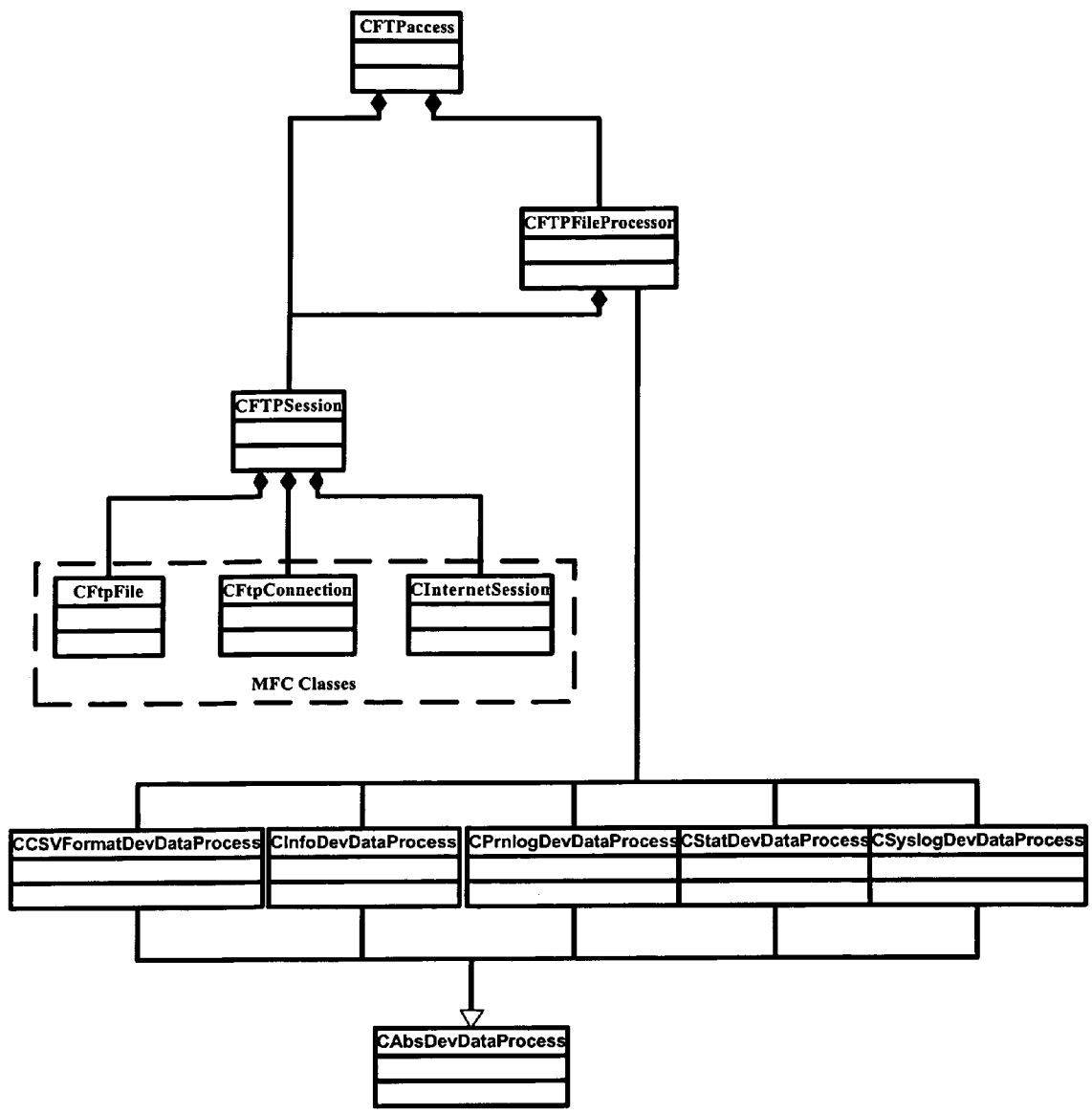
FIG. 42 shows the FTPaccess package in which derived classes, CXXXDevDataProcess are added in the package.

FIG. 42 shows the FTPaccess package in which derived classes, CXXXDevDataProcess are added in the package. The derived classes of CAbsDevDataProcess provide the different methods to extract the data from the information obtained from the devices. New classes can be added when there are new methods to extract the data i.e., new FTP files with different data format.

FIGS. 43 through 45 describe the data structures m_VendorModelSupportMap, mVendorInfoVector, and m_SupportStatusInfoMap, respectively, in the CFTPProtocol class. All the information in these data structures are obtained from the database through the ODBC package.

FIG. 43 show the vendors and models supported by the FTP protocol.

FIG. 44 shows a vector of SVendorInfo struct that is used by the CFTPProtocol class to obtain information about the vendor, model, and unique ID of the monitor device. The m_sXXXDir and m_sXXXFile indicates the directory and file name of the FTP file where the model name and unique ID can be extracted. The pointer to the CAbsDevDataProcess m_pAbsDevDataProcess provides the method to extract the model name and unique ID from the FTP file.

FIG. 45 shows a map structure used to extract information from the monitored devices. For a given vendor and model in the map structure there is a vector of SDirFileStatusInfo struct. A given vendor and model may have multiple FTP files in which to extract information. For each FTP file there corresponds an SDirFileStatusInfo struct. The m_sDirectory and m_sFile indicates the directory and file name of the FTP file where infoTypes and values can be extracted from the FTP file of the device. The pointer to the CAbsDevDataProcess m_pAbsDevDataProcess provides the method to extract the infoType and value from the FTP file. The map m_InfoTypeMap is the weight map used to determine if the infoType and value obtained from the FTP file is more informative than that obtained through another protocol.

FIGS. 46 through 51 describe the data structures used in CFTPODBC. These structures are populated with information obtained from the database as described in FIG. 22.

FIG. 46 is a map structure containing information about the directories and file names of the FTP files where infoType and value can extracted for all vendors and models for which there is FTP support. For each directory and file name there corresponds an identifier.

FIG. 47 is used to store one of the vector of SDirFileIDInfo of the map for a given vendor and model of FIG. 46. FIGS. 46 and 47 are used to handle the database structure of FIG. 22. FIG. 48 is similar to FIG. 32B.

Figure 56A:
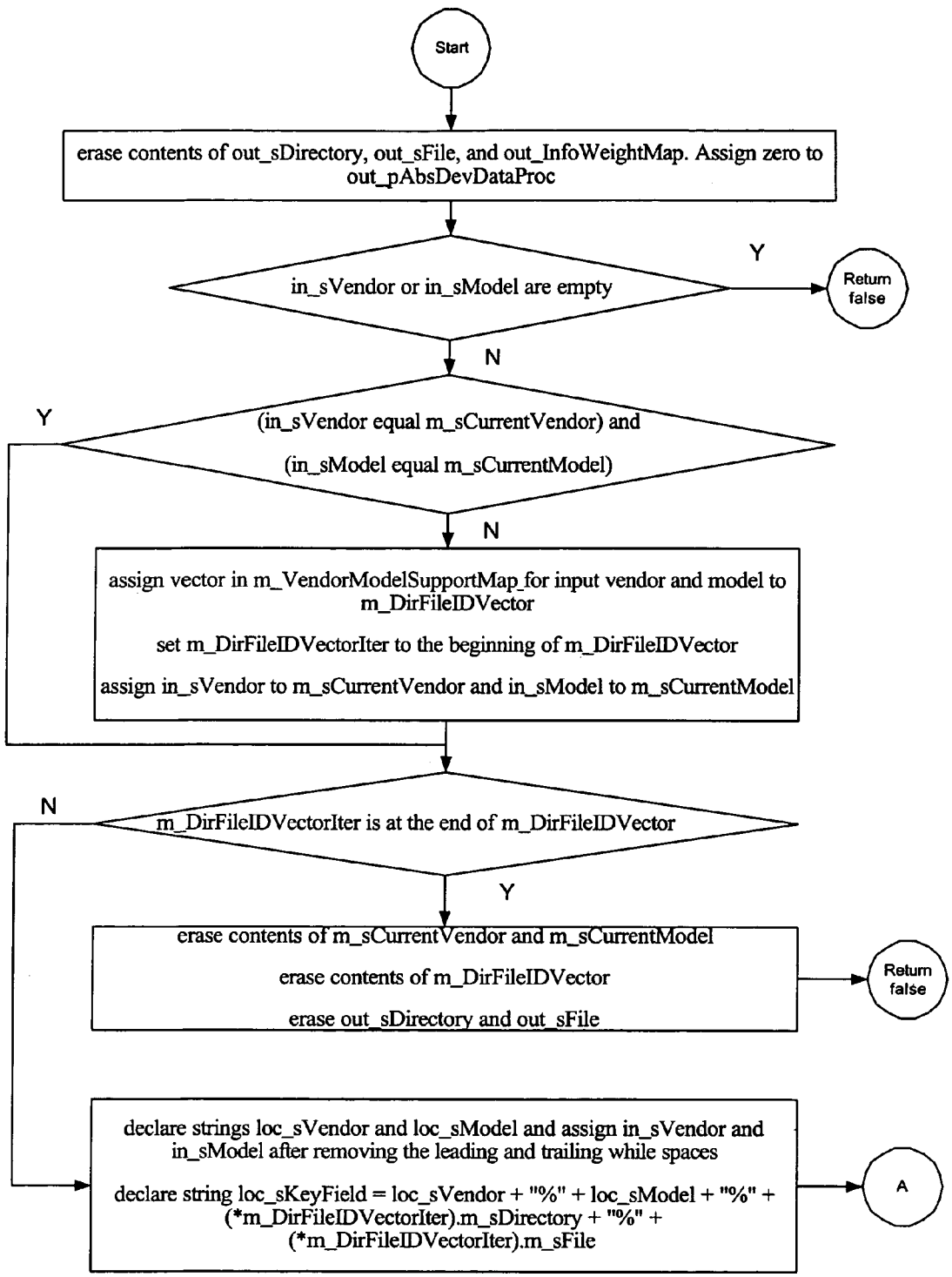
FIGS. 56A-56C show the flowchart of the public function obtainFTPDirFileInfo( ) of CFTPODBC.
Figure 56B:
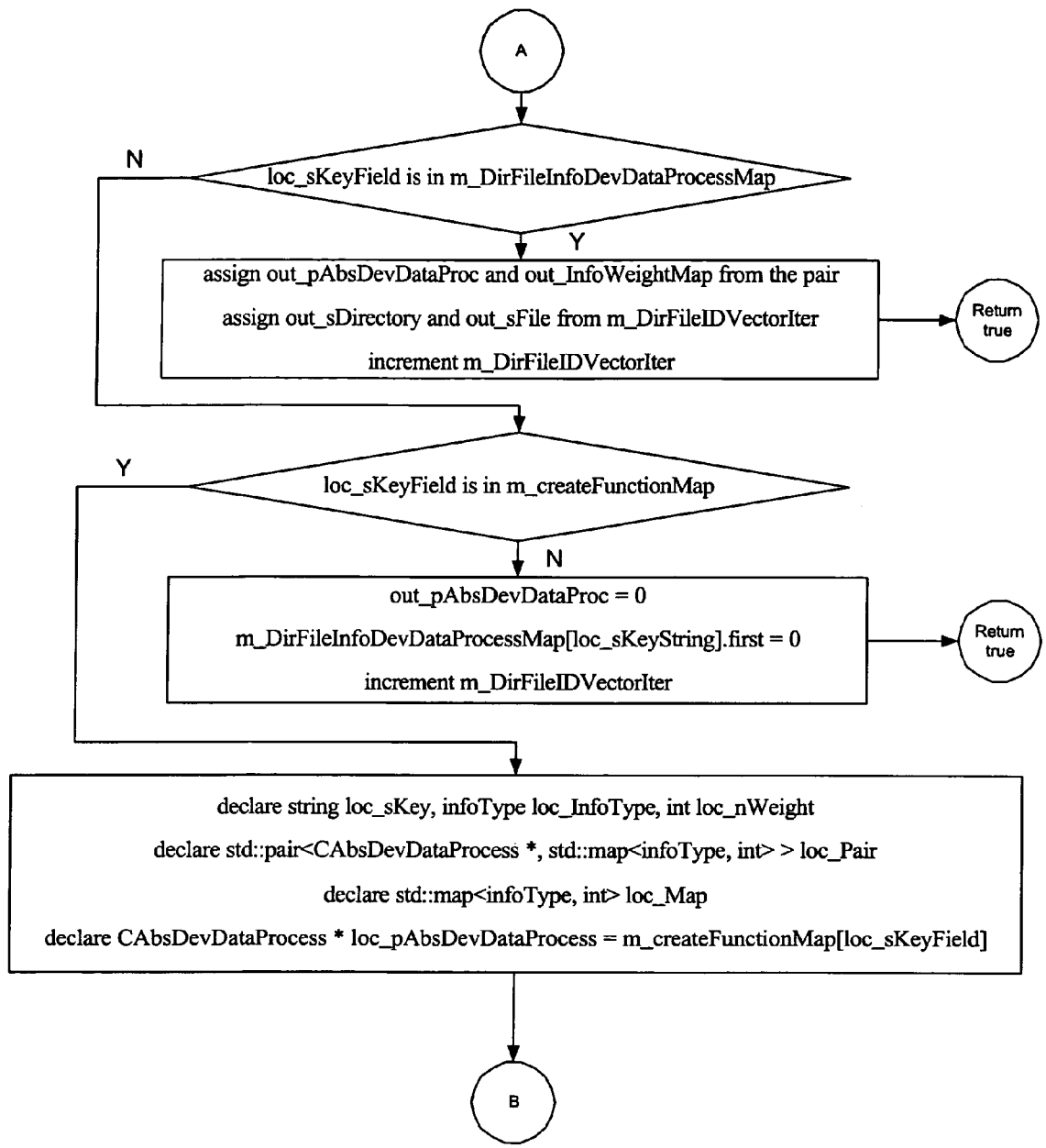
Figure 56C:
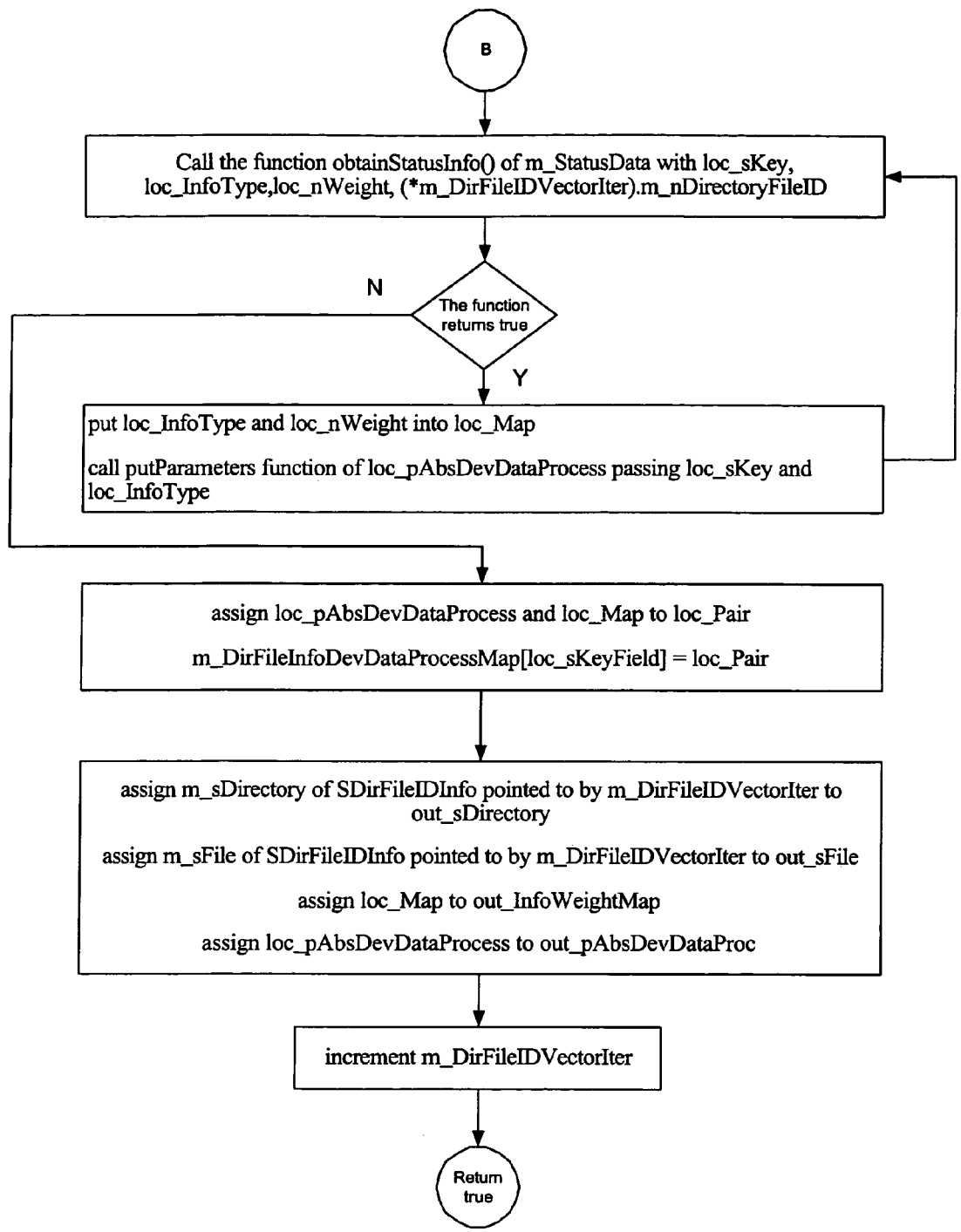

FIG. 49 shows a data structure of m_createFunctionMap with sample entries. The left-hand side of the table (key of the map) shows a string that consists of the vendor name, model name, directory name and file name with the character '%' separating them. Any character other than '%' can be used here as long as the character is not part of the vendor, model, directory, or file name. The string corresponds to an FTP file for which information can be extracted from. The left-hand side of the table can be a string that consists of the vendor name, directory name, file name, directory name, and file name separated with the character '%'. This string corresponds to the FTP files of a vendor that contains the model name and unique ID of the device. The right-hand side of the table (value of the map) contains pointers to the create XXX( ) functions. These functions create objects of CXXXDevDataProcess of FIG. 41 and 42. This table is populated by the function setupCreateFunctionMap( ) which is called in the constructor of CFTPODBC. This table is used to create the appropriate CXXXDevDataProcess object corresponding to the vendor, model, directory, and file name (or vendor, directory, file, directory, and file). For each combination of vendor, model, directory, and file name, there is a derived class of CAbsDevDataProcess to extract the information if the vendor and model supports FTP. Thus, for each combination of vendor, model, directory, and file name, there is a createXXX( ) function to create the derived class of CAbsDevDataProcess. For example, for RICOH GENERIC devices (all RICOH devices) having the FTP file syslog there is a pointer to createSyslog( ) function in m_createFunctionMap to create a CSyslogDevDataProcess to extract information from the device. The same is true for the key containing the vendor, directory, file, directory, and file. This map has to be hard coded when the constructor of CFTPODBC calls setupCreateFunctionMap( ). The data in this map does not come from another source FIG. 50 shows the data structure of m_DirFileInfoDevDataProcessMap of CFTPODBC. This data structure contains information that will be passed to the CFTPProtocol that will be used to obtain the status information from a monitored device. The left-hand side of the table (key to the map) is a string that consists of the vendor name, model name, directory name and file name with the character '%' separating them just as FIG. 49. However, the right-hand side of the table (value of the map) shows a pair consisting of a pointer to a CAbsDevDataProcess and a map. Even though the pointer is of type CAbsDevDataProcess class, the real type is one of the classes derived from CAbsDevDataProcess as shown in of FIG. 41 and 42. The derived class is created by one of the functions corresponding to the table in FIG. 49. The createXXX( ) fuinction corresponding to a key in the table in FIG. 49 will create a derived class of CAbsDevDataProcess that will be placed into the table of FIG. 50 corresponding to the same key. For example, the function createstat( ) corresponding to the key "RICOH%GENERIC%%stat" in the table of FIG. 49 will create a CStatDevDataProcess object and place it into the table of FIG. 50 corresponding to the same key. The map InfoTypeWeightMap of the pair in FIG. 50 shows the infoType and associated weights for the infoType. These values are obtained from FIG. 22 corresponding to nRelativePriority and nENUM. This map is used to check if the infoType of the status data that has already been obtained through other protocols has lower priority than the information obtained by FTP. This map structure is initialized with information from the database of FIG. 22. FIGS. 56A through 56C show how the table is populated. Note specifically how information in the database is passed into the CXXXDevDataProcess object through the putParameter( ) function so that the CXXXDevDataProcess object would know how to extract the infoType and value from the information obtained from the device.

Figure 55A:
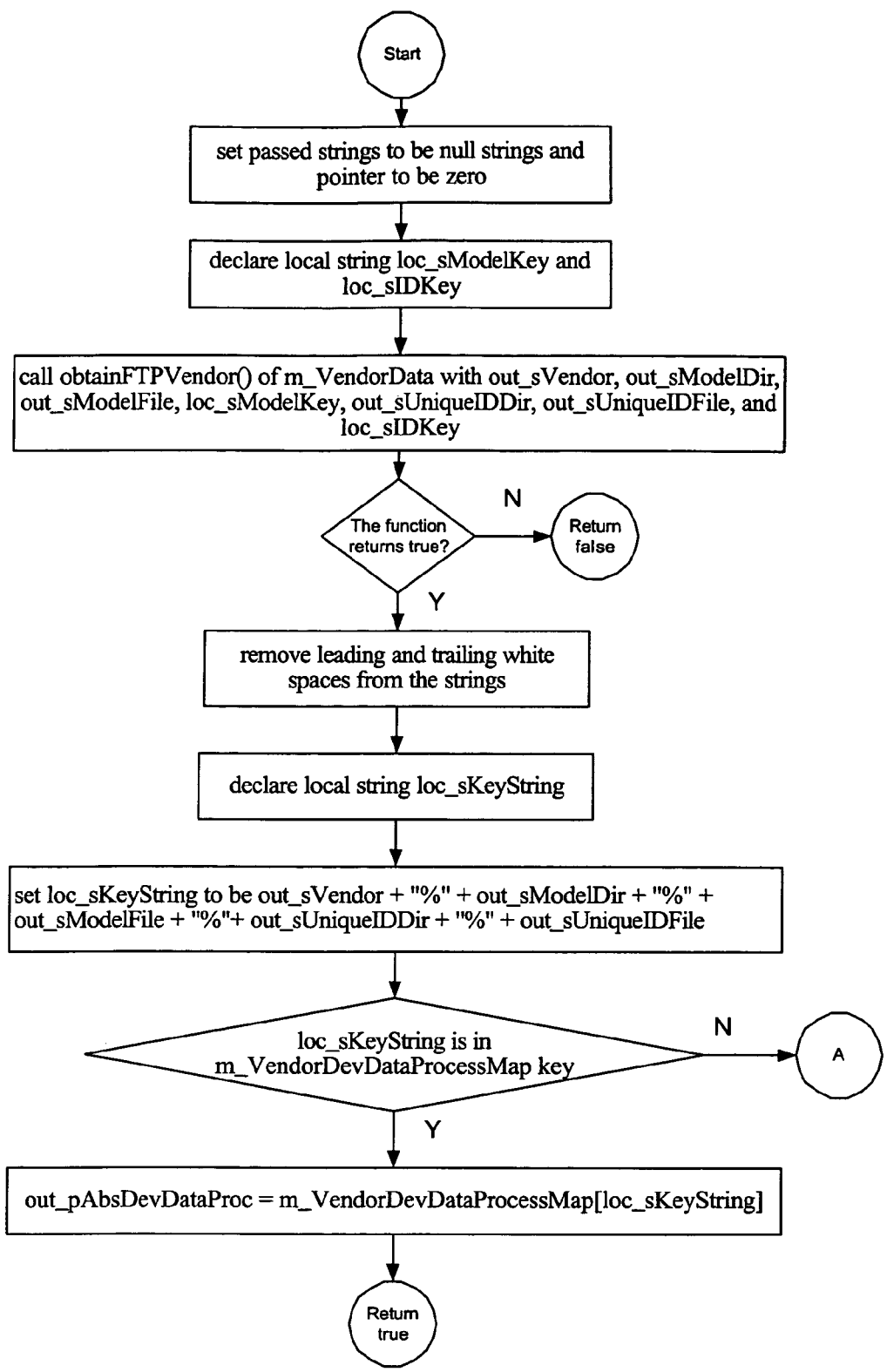
FIGS. 55A and 55B show the flowchart of the public function obtainFTPVendor of CFTPODBC.
Figure 55B:
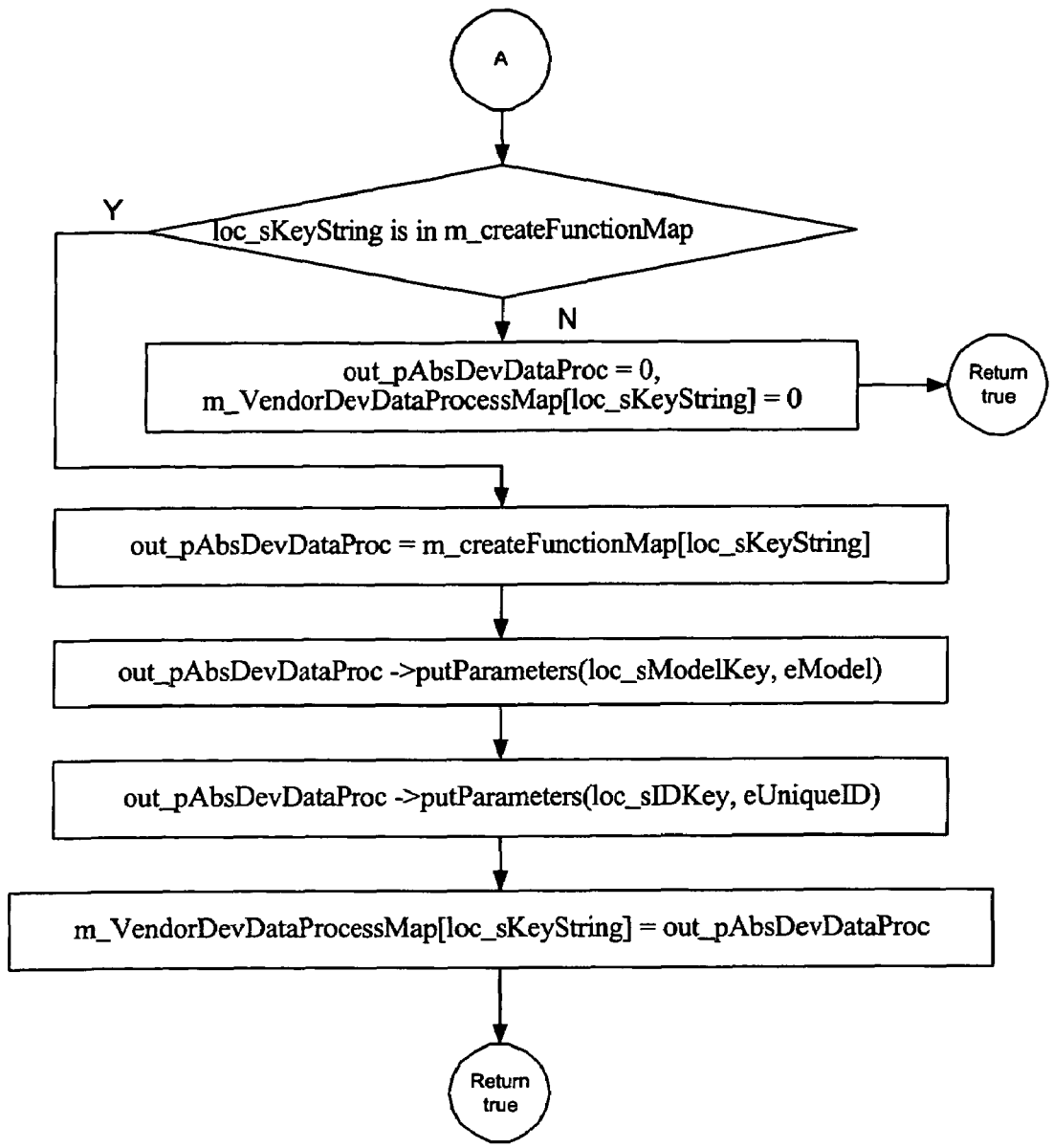

FIG. 51 shows the data structure of m_VendorDevDataProcessMap of CFTPODBC. This data structure contains information use to obtain the model and unique ID from a device. The left-hand side of the table is a string that consists of the vendor name, directory name, file name, directory name, and file name separated with the character '%'. The first directory and file name correspond to the FTP file that contains the model name of the device. The second directory and file name correspond to the FTP file that contains the unique ID of the device. The right-hand side is a pointer to the CAbsDevDataProcess type object. However, the actual type is a pointer to one of the derived classes of CAbsDevDataProcess of FIG. 41 and 42 and created by one of the createXXX( ) functions in the table of FIG. 49. This map structure is initialized with information from the database of FIG. 22. FIG. 55A and 55B show how the table is populated. Note specifically how information in the database is passed into the CXXXDevDataProcess object through the putParameter( ) function so that the CXXXDevDataProcess object would know how to extract the model name and unique ID from the device.

Figure 52A:
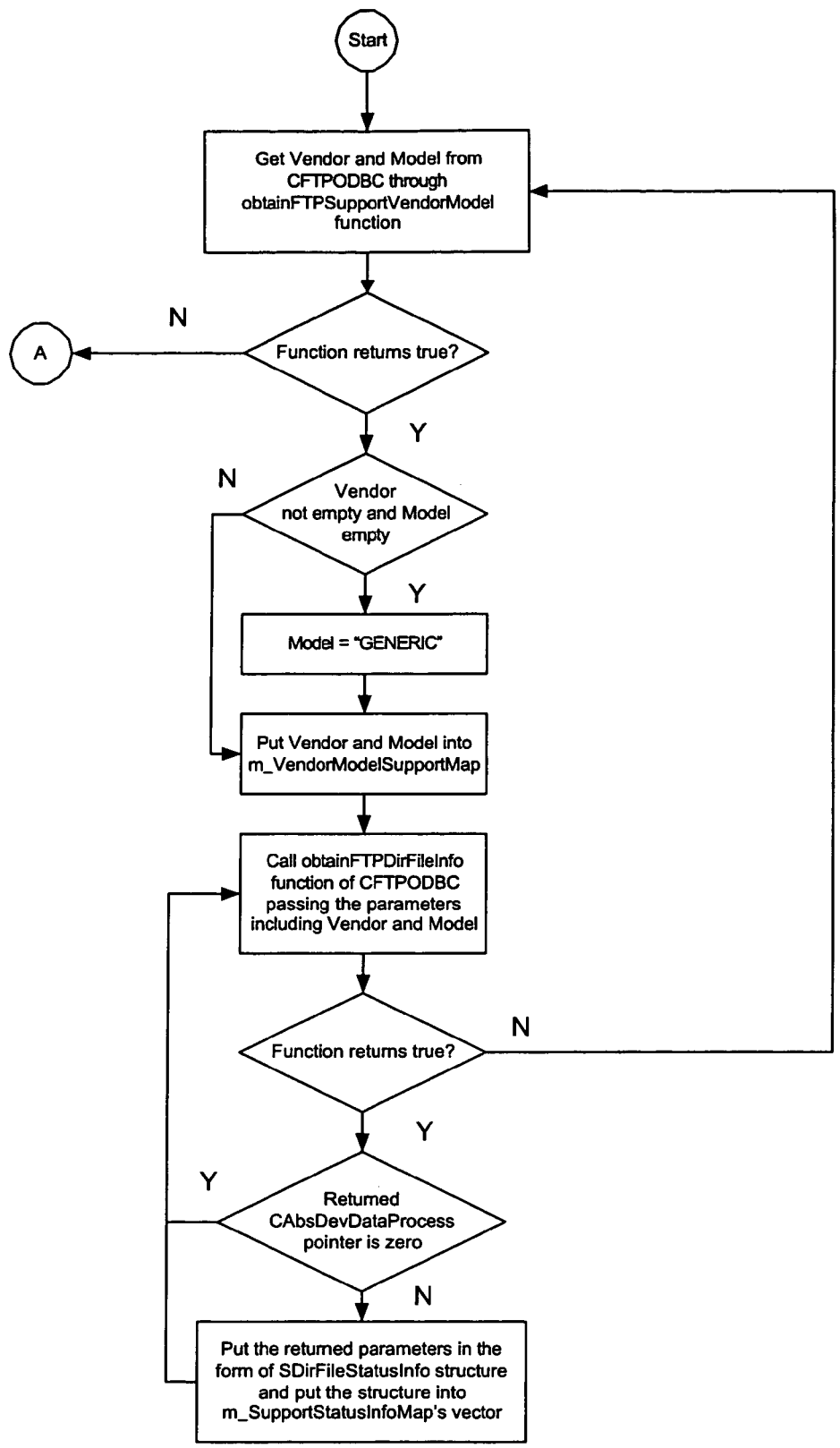
FIGS. 52A and 52B show the initialization of CFTPProtocol through the function, initBegin( )
Figure 52B:
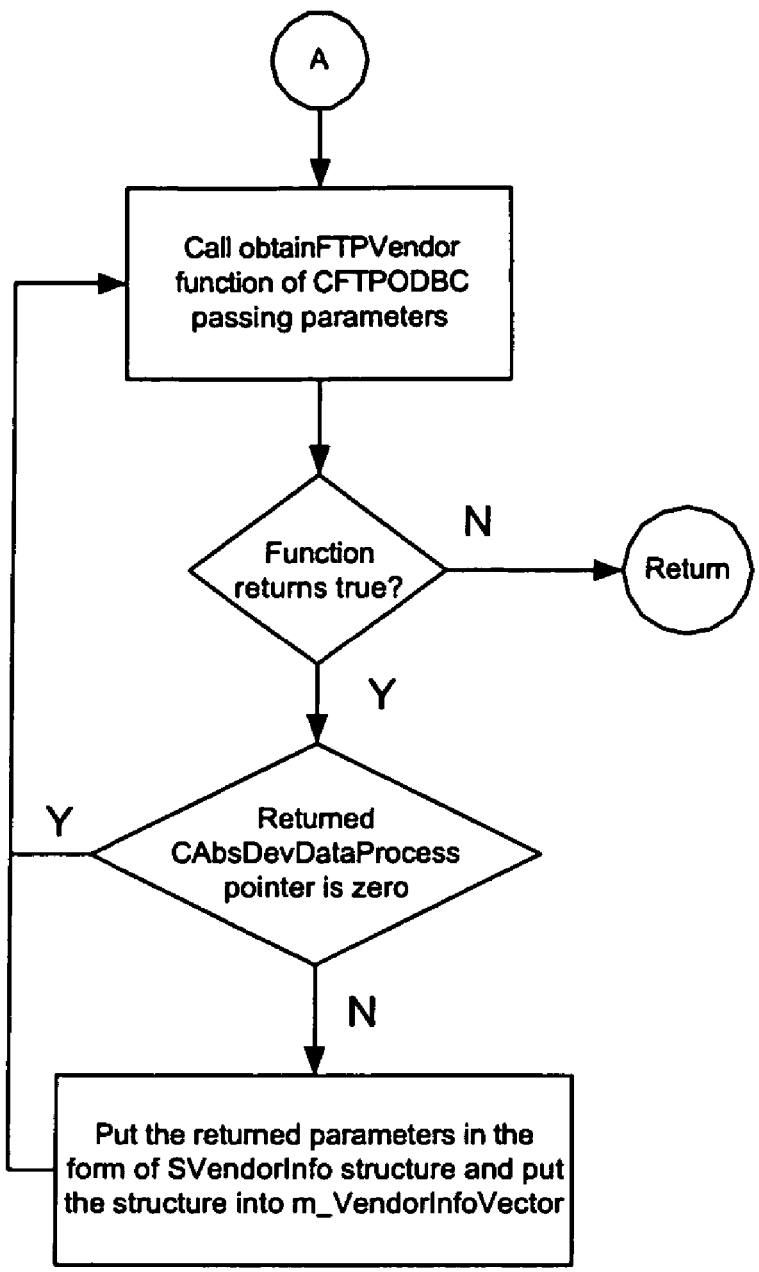

FIGS. 52A and 52B show the initialization of CFTPProtocol through the function, initBegin( ). First, this function obtains the vendors and models that have FTP support from the database through the FTPODBC package. CFTPProtocol calls obtainFTPSupportVendorModel( ) of CFTPODBC to obtain the vendor and model. CFTPProtocol maintains all the vendors and models that are supported. Next, for each vendor and model obtained from the database, the information used to extract the infoType and value from the device is obtained from database through the FTPODBC package. CFTPProtocol calls obtainFTPDirFileInfo( ) of CFTPODBC to obtain the directory, file, weight map, and the CXXXDevDataProcess object. All the information returned by this function is maintained by CFTPProtocol and is needed to obtain the information from the device. Finally, information about how to obtain the model name and unique ID for all vendors supporting FTP is obtained from the database through the FTPODBC package. CFTPProtocol calls obtainFTPVendor( ) of CFTPODBC to obtain the vendor, the directory, and file of where the model name is located, the directory and file of where the unique ID is located, and the CXXXDevDataProcess object. All the information returned by this function is maintained by CFTPProtocol and is used to obtain the model name and unique ID of the device.

Figure 53:
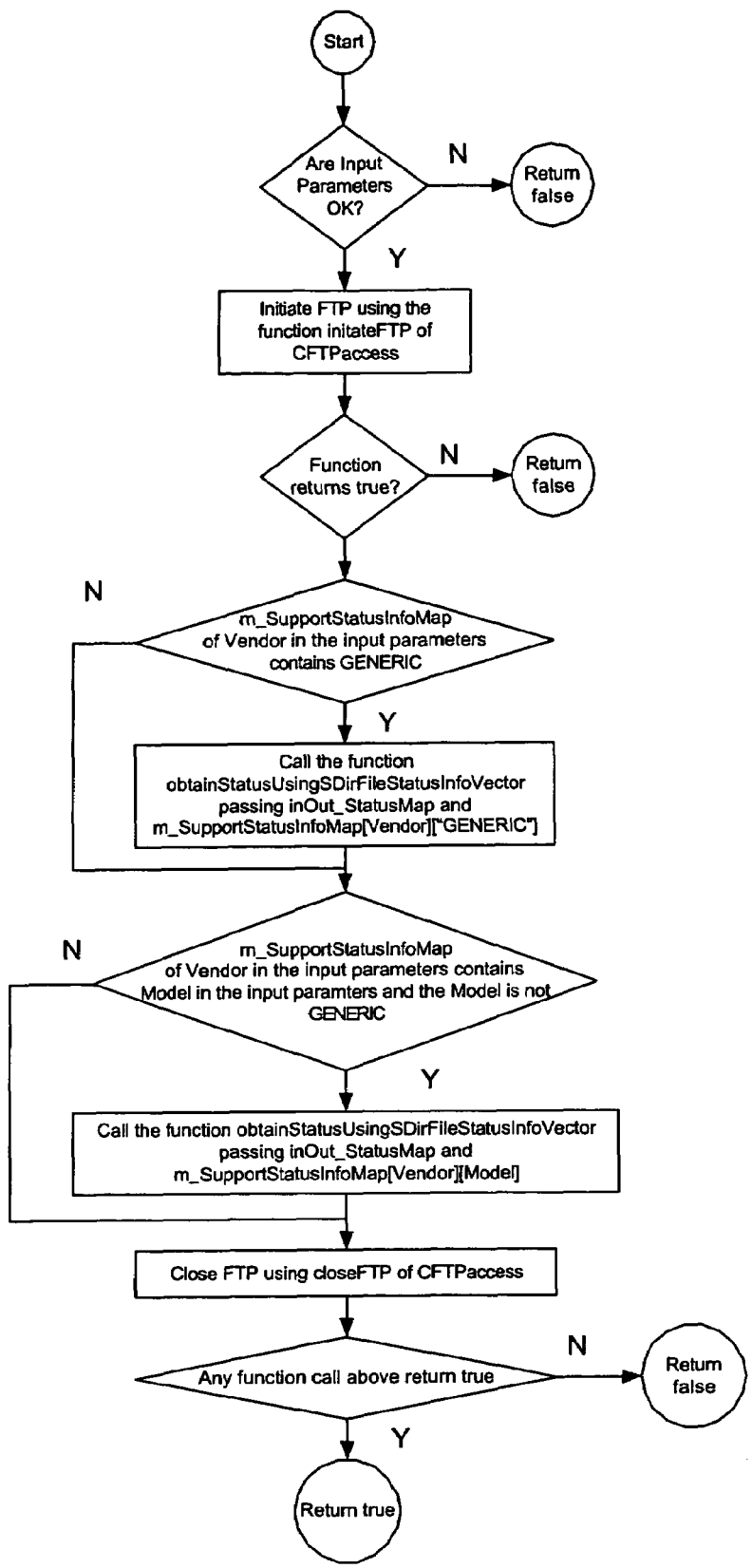
FIG. 53 shows the flowchart of the function obtainstatus( ) of CFTPProocol.

FIG. 53 shows the flowchart of the function obtainstatus( ) of CFTPProtocol to obtain the status information of a device of a specific vendor and model. First, CFTPProtocol initiates an FTP session with the device. Next, CFTPProtocol attempts to obtain vendor specific status information from the device by calling its private function obtainStatusUsingSDirFileStatusInfoVector( ). Vendor specific status information is information that can be obtained from any model of a specific vendor. "GENERIC" is used to indicate that information can be obtained from all models associated with the vendor. Next, CFTPProtocol attempts to obtain status information specific to the model of the device from the device by calling its private function obtainStatusUsingSDirFileStatusInfoVector( ). Finally, the CFTPProtocol closes the FTP session.

Figure 54:
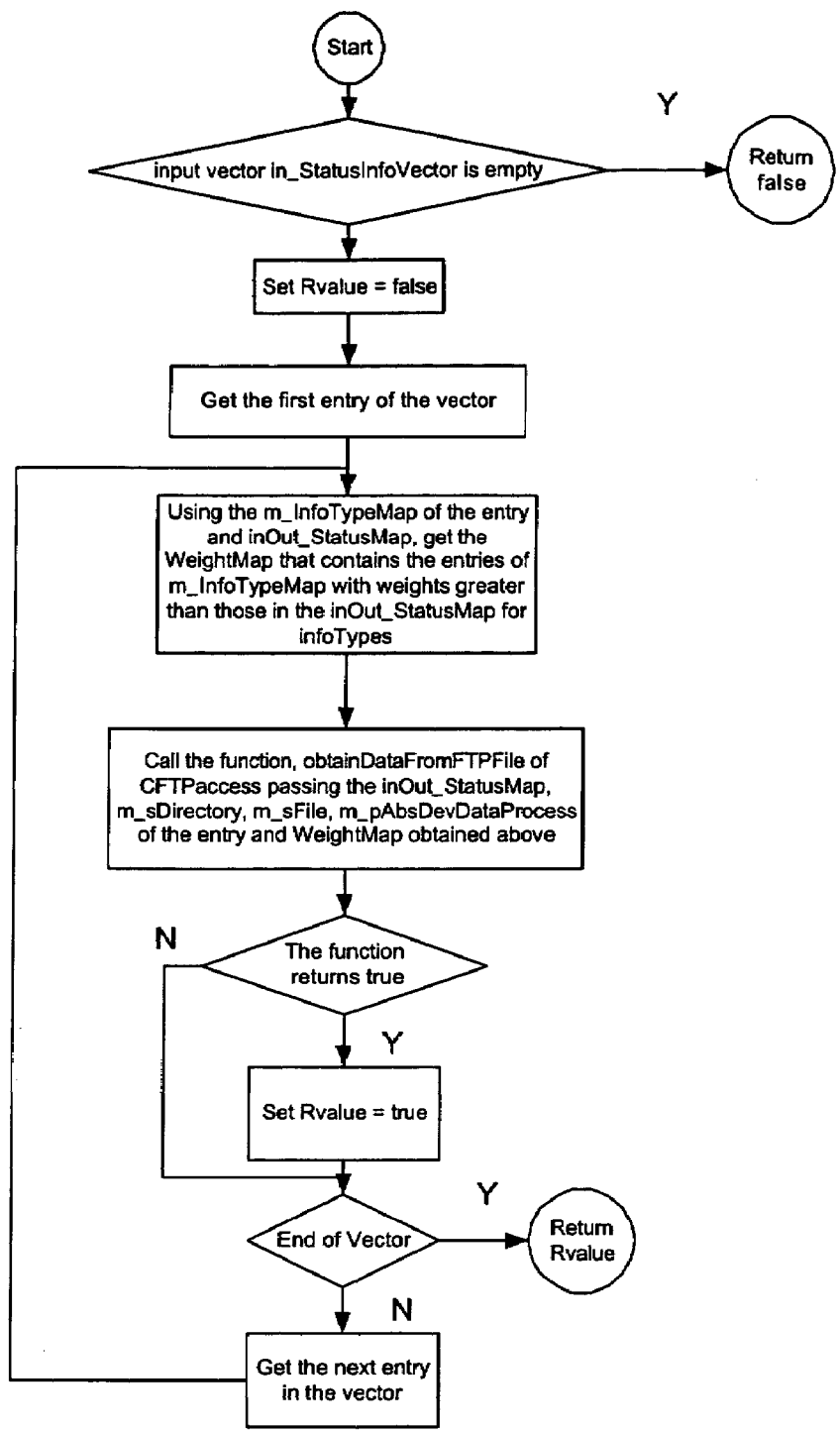
FIG. 54 shows the flowchart of the private function, obtainStatusUsingSDirFileStatusInfoVector( ), used by the obtainStatus( ) function.

FIG. 54 shows the flowchart of the private function, obtainStatusUsingSDirFileStatusInfoVector( ), used by the obtainStatus( ) function above. This flowchart also incorporate the private function selectInfoTypeMap( ) in the fourth steps after the Start. selectInfoTypeMap( ) will process the weight map and the status map, which contains all the status information obtained through all the protocols, to determine if the weight for a specific information obtain through FTP will be greater than that already obtained by another protocol. obtainStatusUsingSDirFileStatusInfoVector( ) first calls selectInfoTypeMap( ) to determine which information will be obtained by FTP based on the weight of each information. Then, obtainStatusUsingSDirFileStatusInfoVector( ) calls obtainDataFromFTPFile( ) to obtain all the status information from the FTP file. The directory name, file name, weight map and CXXXDevDataProcess object are passed into this function to obtain the status information from the FTP file.

FIGS. 55A and 55B show the flowchart of the public function obtainFTPVendor( ) of CFTPODBC. First CFTPODBC obtains the vendor, the directory name, file name, and key used to obtain the model name from the FTP file, and the directory name, file name, and key use to obtain the unique ID from the FTP file. Next, a string is formed from the vendor, directory, file, directory, and file names with '%' separating them. Next, with the string used as a key for the table m_createFunctionMap of FIG. 49, one of the createXXX( ) functions is called to create one of the derived classes of CAbsDevDataProcess. The keys used to find the model and unique ID from the FTP files are put into the derived class of CAbsDevDataProcess through the putparameter( ) function. The derived class of CAbsDevDataProcess is put into the table m_VendorDevDataProcessMap of FIG. 51 so that CFTPODBC can provide this information to CFTPProtocol.

FIGS. 56A-56C show the flowchart of the public function obtainFTPDirFileInfo( ) of CFTPODBC. For the vendor and model name as input, this function returns the directory and file name of the FTP file, the weight map, and the CXXXDevDataProcess used to obtain the infoType and value from the device. A vendor and model may have more than one FTP file in which status information can be obtained. Thus, this function can be called multiple times for the same input vendor and model to obtain information about all the FTP files in which status information can be obtained and how to extract the status information from the device. This function uses the map m_VendorModelSupportMap of FIG. 46 to obtain all the FTP files for the input vendor and model. This function uses the map m_createFunctionMap of FIG. 49 to use the appropriate createXXX( ) function to create the CXXXDevDataProcess object for the vendor, model, directory, and file name that will be used to obtain the status information from the device. Once the CXXXDevDataProcess object is created, information to obtain status information from the FTP file is obtained from the database and put into the CXXXDevDataProcess object through the putparameters( ) function and into a weight map. All the information used to obtain the status information from an FTP file of input vendor and model is put into the map m_DirFileInfoDevDataProcessMap of FIG. 50 as well as returned by this function.

Figure 57:
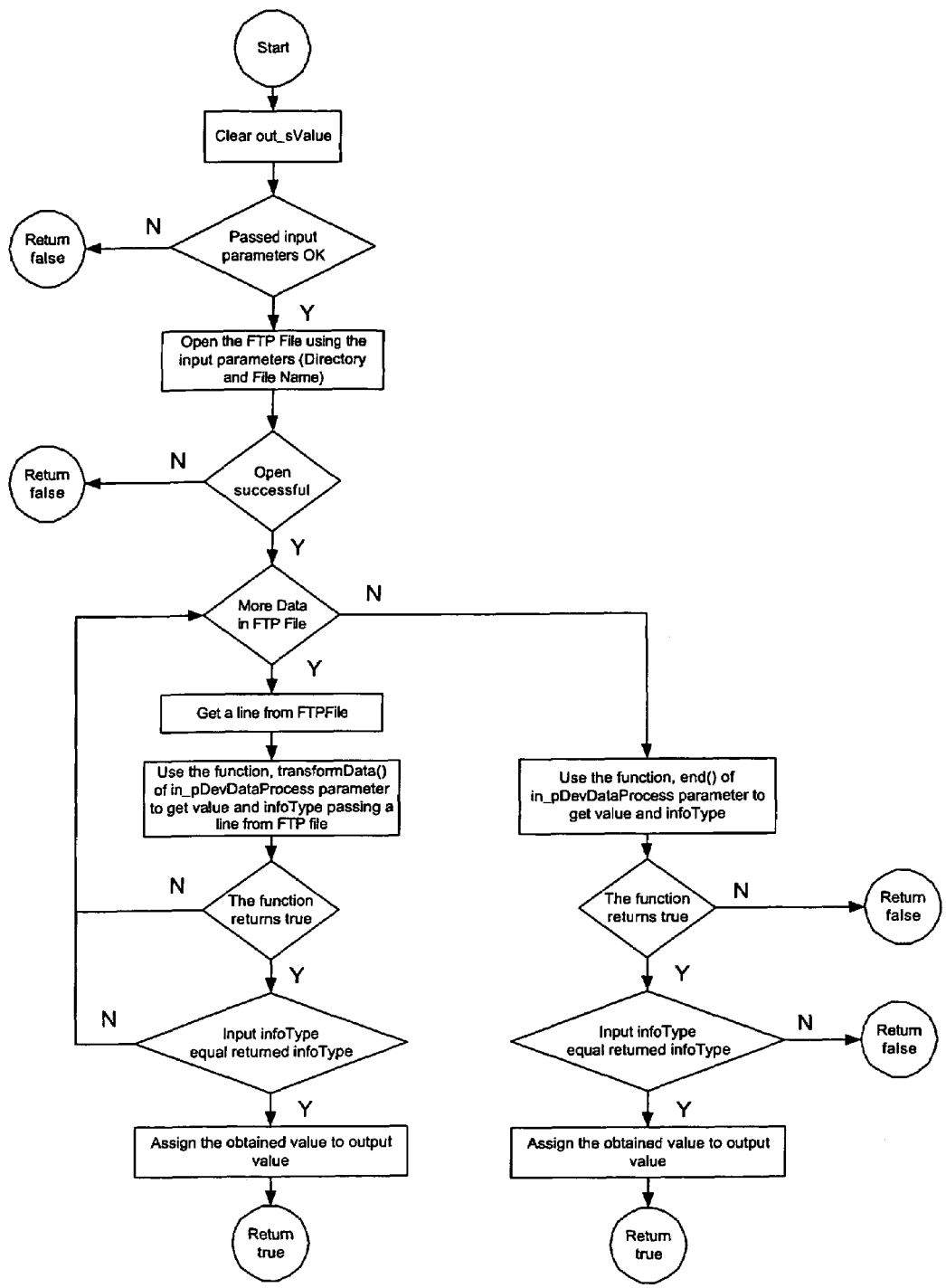
FIG. 57 shows the flowchart of the function obtainValueFromFTPFile( ) of CFTPaccess.

FIG. 57 shows the flowchart of the function obtainValueFroniFTPFile( ) of CFTPaccess. This function obtains a single value from the FTP file corresponding to the input infoType (in_InfoType). In this system, this function is used to obtain the model name and unique identifier of the device though it can be used to obtain any other type of information. The flowchart incorporates the function of obtainValueFromFTPFile( ) of m_FTPFileProcessor. In this function, the FTP file of the device is opened first. Then a line is obtained from the FTP file. The line is put into the CXXXDevDataProcess object that corresponds to the FTP file through the transformData( ) function. An infoType and value is returned by transformData( ) if they are extracted from the line. The infoType is checked to see if the desired infoType is obtained. If the infoType is not the desired infoType, the function will continually obtain a line from the FTP file and put it into the transformData( ) function of the CXXXDevDataProcess object until the desired infoType is obtained. If the end of the FTP file is encountered, then the end( ) function of the CXXXDevDataProcess object is called to obtain the infoType and value and to check to see if it is the desired infoType.

Figure 58:
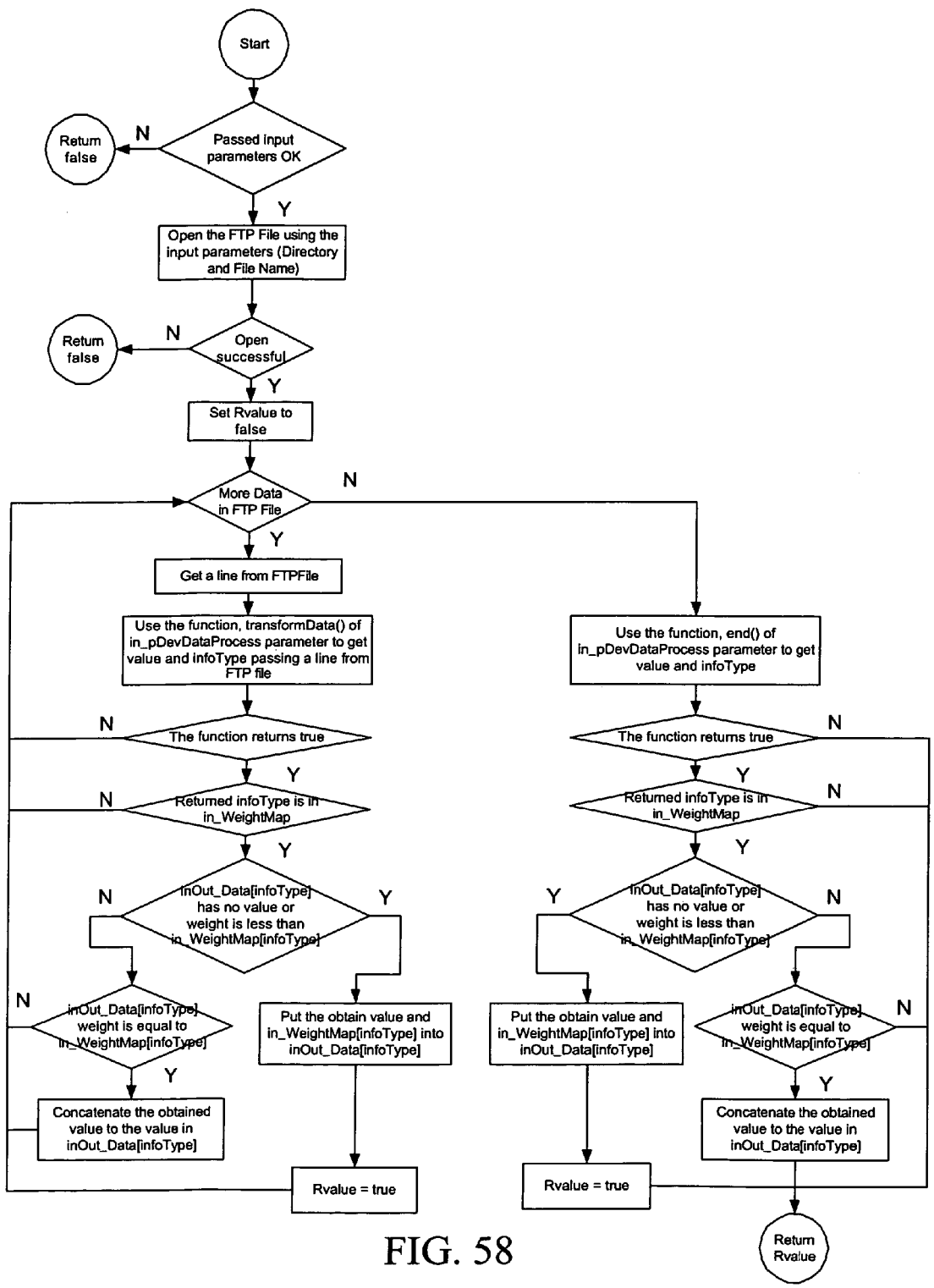
FIG. 58 shows the flowchart of the function obtainDataFromFTPFile( ) of CFTPaccess.

FIG. 58 shows the flowchart of the function obtainDataFromFTPFile( ) of CFTPaccess. This function obtains one or more information from the FTP file. In this system, this function is used to obtain status information of the device specified in the map (in_WeightMap) that contains infoType and weight. The flow chart incorporates the functioning of obtainDataFromFTPFile( ) of m_FTPFileProcessor. In this function, the FTP file of the device is opened first. Then a line is obtained from the FTP file. The line is put into the CXXXDevDataProcess object that corresponds to the FTP file through the transfornData( ) function. An infoType and value is returned by transformData( ) if they are extracted from the line. The infoType is checked to see if it is one of the infoTypes in the weight map. If it is, then the infoType and value is added to the data map only if the weight of the infoType is greater than that in the data map. If the infoType is not a desired infoType, the function will continually obtain a line from the FTP file and put it into the transformData( ) function of the CXXXDevDataProcess object to obtain any of the desired infoType in the weight map. If the end of the FTP file is encountered, then the end( ) function of the CXXXDevDataProcess object is called to obtain the infoType and value and to check to see if it is the desired infoType.

Although the present invention is shown to include a few devices, which require monitoring, connected to a network, it will be appreciated that any number of devices may be connected to the network without deviating from the spirit and scope of the invention. Also, the present invention may also be applied in a home environment wherein various devices need to be monitored and controlled.

The present invention enables the monitoring of the various devices in a multi-vendor environment and further facilitates retrieving and displaying detailed information in a user-comprehensible or user-friendly manner even without having specific private management information base (MIB) information.

The method described in the present invention can be applied to the other protocols, even though the FTP protocol is used in the example embodiments.

The controller of the present invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product residing on a storage medium including instructions that can be used to program a computer to perform a process of the invention. The storage medium can include, but is not limited to, any type of disk including floppy disks, optical discs, CD-ROMs, and magneto-optical disks, ROMS, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

Appendix 1. CFTPProtocol Class Specification
1. Base Class
    public CAbsProtocol
2. Function List 3. Defined Type

```
public:
  struct SVendorInfo {
    std::string m_sVendor;
    std::string m_sModelDir;
    std::string m_sModelFile;
    std::string m_sUniqueIDDir;
    std::string m_sUniqueIDFile;
    CAbsDevDataProcess * m_pAbsDevDataProcess;
  };
  struct SDirFileStatusInfo {
    std::string m_sDirectory;
    std::string m_sFile;
    std::map<infoType, int> m_InfoTypeMap;
    CAbsDevDataProcess * m_pAbsDevDataProcess;
  };
private:
  enum ESupported {eSupported = 0, eNotSupported, eDoNotKnow}
```

```
public:
  CFTPProtocol( );
  ~CFTPProtocol( );
  void initBegin(void);
  void initEnd(void);
  bool canAccessIP(const std::string& in_sIP,
      std::map<std::string, std::vector<SParameter> >&       in_ProtocolParameters);
  bool obtainVendor(std::string& out_sVendor,
      std::map<std::string, std::vector<SParameter> >& inOut_ProtocolParameters,
      const std::string& in_sIP);
  bool obtainModel(std::string& out_sModelName,
      std::map<std::string, std::vector<SParameter> >& inOut_ProtocolParameters,
      const std::string& in_sIP);
  bool obtainUniqueID(std::string& out_sUniqueID,
      std::map<std::string, std::vector<SParameter> >& inOut_ProtocolParameters,
      const std::string& in_sIP);
  EerrorCode obtainEventStatus(std::map<infoType, std::pair< std::string, int> >&
      inOut_StatusMap, const std::string& in_sIP,
      std::map<std::string, std::vector<SParameter> >& in_ProtocolParameters);
  bool obtainStatus(std::map<infoType, std::pair<std::string, int> >& inOut_StatusMap,
      const std::string& in_sIP, const std::string& in_sVendor, const std::string& in_sModel,
      std::map<std::string, std::vector<SParameter> >& in_ProtocolParameters);
  void initWithVendor(std::map<std::string, std::vector<SParameter> >& inOut_ProtocolParameters,
      const std::string& in_sVendor);
  void initWithModel(std::map<std::string, std::vector<SParameter> >& inOut_ProtocolParameters,
      const std::string& in_sModel);
private:
  bool initiateFTPWithDefaults(const std::string& in_sIP);
  bool obtainDeviceInfo(const std::string& in_sIP,
      std::vector<SParameter>& in_FTPParameter);
    CFTPProtocol::ESupported obtainVendorModelSupported(std::string&
    inOut_sVendor,
            std::string& inOut_sModel);
    void selectInfoTypeMap(std::map<infoType, int> & out_InfoTypeMap,
        std::map<infoType, std::pair< std::string, int> >& in_StatusMap,
        std::map<infoType, int> & in_InfoTypeMap);
    bool obtainStatusUsingSDirFileStatusInfoVector(
        std::map<infoType, std::pair< std::string, int> >& inOut_StatusMap,
        std::vector<SDirFileStatusInfo> & in_StatusInfoVector);
    void cleanUpCAbsDevDataProcessPointers(void);
```

4. Class Attribute
private:

| Type | Attribute Name | Description |
| --- | --- | --- |
| CFTPaccess | m_FTPaccess | This attribute member provides FTP access to the devices. |
| std::map<std::string, std::vector<std::string>> | m_VendorModelSupportMap | This attribute member contains information about the vendors and models supported by the system |
| std::vector<SVendorInfo> | m_VendorInfoVector | This attribute member contains information used to obtain the model and unique ID from the device. |
| std::map<std::string, std::map<std::string, std::vector<SDirFileStatusInfo>>> | m_SupportStatusInfoMap | This attribute member contains information about status information that can be obtained from all supported devices. |
| std::string | m_sVendor | This attribute member contains the vendor obtained from the device for the current IP address |
| std::string | m_sModel | This attribute member contains the model obtained from the device for the current IP address. |
| std::string | m_sUniqueID | This attribute member contains the unique ID obtained from the device for the current IP address. |
| std::string | m_sCachedIP | This attribute member contains the IP address corresponding to a previous successful call to the obtain functions. |
| std::string | m_sCachedVendor | This attribute member contains the vendor obtained corresponding to the previous IP address. |
| std::string | m_sCachedModel | This attribute member contains the model obtained corresponding to the previous IP address. |
| std::string | m_sCachedUniqueID | This attribute member contains the unique ID obtained corresponding to the previous IP address. |

Appendix 2. CFTPODBC Class Specification
This class requires
typedef CAbsDevDataProcess*(*createFunc)(void);
first before using createFunc as a type.
Also, the following functions should be declared on the top of .cpp file as global functions.
   CAbsDevDataProcess*createCSVFormat(void);
   CAbsDevDataProcess*createInfo(void);
   CAbsDevDataProcess*createPmlog(void);
   CAbsDevDataProcess*createStat(void);
   CAbsDevDataProcess*createSyslog(void);
1. Base Class
   None.
2. Function List

```
public:
    CFTPODBC( );
    ~CFTPODBC( );
    void init( );
    bool obtainFTPSupportVendorModel(std::string& out_sVendor,
        std::string& out_sModel);
    bool obtainFTPVendor(std::string& out_sVendor, std::string&
        out_sModelDir, std::string& out_sModelFile,
```

-continued

```
        std::string& out_sUniqueIDDir, std::string& out_sUniqueIDFile,
        CAbsDevDataProcess * & out_pAbsDevDataProc);
    bool obtainFTPDirFileInfo(std::string& out_sDirectory, std::string&
        out_sFile, std::map<infoType, int> & out_InfoWeightMap,
        CAbsDevDataProcess * & out_pAbsDevDataProc,
        const std::string& in_sVendor, const std::string& in_sModel);
private:
    void setupCreateFunctionMap(void);
```

3. Defined Type

```
            private:
                private:
                struct SDirFileIDInfo {
                    std::string m_sDirectory;
                    std::string m_sFile;
                    int m_nDirectoryFileID;
                };
```

4. Class Attribute private:

| Type | Attribute Name | Description |
| --- | --- | --- |
| CFTPVendorData | m_VendorData | This attribute member accesses the database table containing information used to obtain the model and unique ID of the network device. |

-continued

| Type | Attribute Name | Description |
|---|---|---|
| CFTPDirFileIDData | m_DirFileIDData | This attribute member accesses the database table containing information used to determine the location of information in the network device. |
| CFTPStatusData | m_StatusData | This attribute member accesses the database table containing information used to obtain the status information from the network device. |
| std::map<std::string, std::map<std::string, std::vector< SDirFileIDInfo>>> | m_VendorModelSupportMap | This attribute member contains information about the vendors and models supported. |
| std::vector<SDirFileIDInfo> | m_DirFileIDVector | This attribute member contains information about the directories and files where the status information is located for a given vendor and model. |
| std::vector<SDirFileIDInfo>::iterator | m_DirFileIDVectorIter | This attribute member iterates through the vector m_DirFileIDVector. |
| std::string | m_sCurrentVendor | This attribute member is the vendor for which information is being obtain. |
| std::string | ms_CurrentModel | This attribute member is the model for which information is being obtain. |
| std::map<std::string, int> | m_VendorModelMap | This attribute member is a map that contains the key "vendor + separator + model" string and a value of 1. |
| std::map<std::string, int>::iterator | m_VendorModelIter | This attribute member iterates through the map m_VendorModelMap. |
| std::map<std::string, createFunc> | m_createFunctionMap | This map consists of the key with unique string such as Vendor%Model%Directory%File and the pointer to creation function to get the pointer to CAbsDevDataProcess. Objects that are used by CFTPProtocol are destroyed in the destructor of CFTPProtocol. |
| std::map<std::string, std::pair<CAbsDevDataProcess*, std::map<infoType, int>>> | m_DirFileInfoDevDataProcessMap | This map caches the CAbsDevDataProcess pointers and map used to extract the information from the device. |
| std::map<std::string, CAbsDevDataProcess*> | m_VendorDevDataProcessMap | This map caches the CAbsDevDataProcess pointers |

Appendix 3. CFTPaccess Class Specification
1. Base Class
   None.
2. Function List public:

```
    CFTPaccess( );
    ~CFTPaccess( );
    bool initiateFTP(const std::string& in_sIP,
        std::vector<SParameter>&
            in_Parameter);
bool obtainValueFromFTPFile(std::string& out_sValue, const std::string&
        in_sDirectory,
        const std::string& in_sFile, const infoType in_InfoType,
        CAbsDevDataProcess * in_pDevDataProcess);
bool obtainDataFromFTPFile(std::map<infoType,
        std::pair<std::string, int> >& inOut_Data,
        const std::string& in_sDirectory, const std::string& in_sFile,
        std::map<infoType, int> & in_WeightMap,
        CAbsDevDataProcess * in_pDevDataProcess);
bool closeFTP( );
```

3. Defined Type
   None.
4. Class Attribute private:

| Type | Attribute Name | Description |
|---|---|---|
| CFTPSession | m_FTPSession | This attribute member is used to obtain an FTP session with a device. Note: this attribute member must be declared before m_FTPFileProcessor so that the constructor of m_FTPSession will be executed before it is passed into m_FTPFileProcessor. |
| CFTPFileProcessor | m_FTPFileProcessor | This attribute member processes an FTP file to obtain the desired information |

The invention claimed is:

1. A method of initializing at least one data processing object associated with a communication protocol used to extract status information related to a monitored device communicatively coupled to a network, comprising:
   storing a vector identifying a plurality of communication protocols useable to access the monitored device;
   accessing the monitored device to obtain a vendor of the monitored device directly from the monitored device using a first communication protocol of the plurality of communication protocols, determining whether the first communication protocol failed to obtain the vendor, and repeating the accessing and determining until the vendor is obtained, each repetition of the accessing and determining cycles through the plurality of communication protocols in the vector;
   obtaining, from a support memory, information used to extract the status information using one of the plurality of communication protocols from an FTP file on the monitored device, the FTP file having been formatted in one of a plurality of different formats, and the information used to extract the status information includes information for extracting data from each of the plurality of different formats of the FTP file;
   storing the vendor and the information used to extract the status information in a respective data processing object of the at least one data processing object; and
   accessing, using the stored vendor and the information used to extract the status information in the respective data processing object, the monitored device to obtain the status information.

2. The method of claim 1, wherein the accessing step comprises:
   retrieving, from a monitor memory, information for accessing the monitored device using the first communication protocol;
   accessing the device using the first communication protocol and the information retrieved from the monitor memory to obtain the vendor of the monitored device.

3. The method of claim 2, further comprising:
   accessing the monitored device using the first communication protocol and the information retrieved from the monitor memory to obtain model information related to the monitored device.

4. The method of claim 1, further comprising:
   using an abstract class to extract the status information.

5. The method of claim 4, wherein the abstract class defines an interface to an object used to extract the status information.

6. A system for initializing at least one data processing object associated with a communication protocol used to extract status information related to a monitored device communicatively coupled to a network, comprising:
   means for storing a vector identifying a plurality of communication protocols useable to access the monitored device;
   means for accessing the monitored device to obtain a vendor of the monitored device directly from the monitored device using a first communication protocol of the plurality of communication protocols;
   means for determining whether the first communication protocol failed to obtain the vendor;
   means for repeating the accessing by the means for accessing and the determining by the means for determining until the vendor is obtained, each repetition of the accessing and the determining cycles through the plurality of communication protocols in the vector;
   means for obtaining, from a support memory, information used to extract the status information using one of the plurality of communication protocols from an FTP file on the monitored device, the FTP file having been formatted in one of a plurality of different formats, and the information used to extract the status information includes information for extracting data from each of the plurality of different formats of the FTP file;
   means for storing the vendor and the information related to the access function in a respective data processing object of the at least one data processing object; and
   means for accessing, using the stored vendor and the information used to extract the status information in the respective data processing object, the monitored device to obtain the status information.

7. The system of claim 6, wherein the means for accessing comprises:
   means for retrieving, from a monitor memory, information for accessing the monitored device using the first communication protocol;
   means for accessing the device using the first communication protocol and the information retrieved from the monitor memory to obtain the vendor of the monitored device.

8. The system of claim 7, further comprising:
   means for accessing the monitored device using the first communication protocol and the information retrieved from the monitor memory to obtain model information related to the monitored device.

9. A computer readable storage medium encoded with instructions, which when executed by a computer causes the computer to implement a method of initializing at least one data processing object associated with a communication protocol used to extract status information related to a monitored device communicatively coupled to a network, comprising:
   storing a vector identifying a plurality of communication protocols useable to access the monitored device;
   accessing the monitored device to obtain a vendor of the monitored device directly from the monitored device using a first communication protocol of the plurality of communication protocols, determining whether the first communication protocol failed to obtain the vendor, and repeating the accessing and determining until the vendor is obtained, each repetition of the accessing and determining cycles through the plurality of communication protocols in the vector;
   obtaining, from a support memory, information used to extract the status information using one of the plurality of communication protocols from an FTP file on the monitored device, the FTP file having been formatted in one of a plurality of different formats, and the information used to extract the status information includes information for extracting data from each of the plurality of different formats of the FTP file;

storing the vendor and the information related to the access function in a respective data processing object of the at least one data processing object; and accessing, using the stored vendor and the information used to extract the status information in the respective data processing object, the monitored device to obtain the status information.

10. The computer readable storage medium of claim 9, wherein the accessing comprise:

retrieving, from a monitor memory, information for accessing the monitored device using the first communication protocol; and accessing the device using the first communication protocol and the information retrieved from the monitor memory to obtain the vendor of the monitored device.

11. The computer readable storage medium of claim 10, wherein the method further comprises:

accessing the monitored device using the first communication protocol and the information retrieved from the monitor memory to obtain model information related to the monitored device.

* * * * *